US009300201B2

(12) United States Patent  (10) Patent No.: US 9,300,201 B2
Yu  (45) Date of Patent: Mar. 29, 2016

(54) GREEN POWER CONVERTER

(76) Inventor: Baichou Yu, Wuhan (CN)

(*) Notice: Subject to any disclaimer, the term of this patent is extended or adjusted under 35 U.S.C. 154(b) by 605 days.

(21) Appl. No.: 13/636,100

(22) PCT Filed: Mar. 16, 2011

(86) PCT No.: PCT/CN2011/000420
§ 371 (c)(1),
(2), (4) Date: Sep. 19, 2012

(87) PCT Pub. No.: WO2011/113307
PCT Pub. Date: Sep. 22, 2011

(65) Prior Publication Data
US 2013/0009484 A1   Jan. 10, 2013

(30) Foreign Application Priority Data

Mar. 19, 2010 (CN) .......................... 2010 1 0130192

(51) Int. Cl.
*H02M 1/42* (2007.01)
*H02M 3/07* (2006.01)
*H02M 3/335* (2006.01)

(52) U.S. Cl.
CPC .............. *H02M 1/4208* (2013.01); *H02M 3/07* (2013.01); *H02M 3/33592* (2013.01); *Y02B 70/126* (2013.01); *Y02B 70/1475* (2013.01); *Y10T 307/685* (2015.04)

(58) Field of Classification Search
None
See application file for complete search history.

(56) References Cited

U.S. PATENT DOCUMENTS

| 6,429,723 | B1* | 8/2002 | Hastings | 327/536 |
| 7,596,009 | B2* | 9/2009 | Matsumoto | H02M 3/33592 363/127 |
| 7,598,792 | B2* | 10/2009 | Liu | H02M 1/08 327/494 |
| 2009/0323380 | A1* | 12/2009 | Harrison | 363/126 |
| 2010/0046259 | A1* | 2/2010 | Ho et al. | 363/126 |

* cited by examiner

*Primary Examiner* — Thienvu Tran
*Assistant Examiner* — David Shiao
(74) *Attorney, Agent, or Firm* — Wayne Edward Ramage; Baker Donelson

(57) ABSTRACT

The invention discloses a green power converter which omits the pulse width modulation (PWM) technique in the traditional power converter, does not have high-frequency power device, does not generate EMI interference, simultaneously adopts the symmetry basic primitive (SBP) technique, the amplitude high modulate (AHM) technique and the dynamic rectification (DR) technique, and only needs to perform traditional power conversion on a small part of the input power so as to acquire the whole output power, namely that a large part of the output power neither need traditional power conversion nor need to pass through a magnetic core transformer. The input AC voltage neither needs to be rectified and filtered nor has large inductance and large capacitance, thus the power factor is 1, and the total harmonic distortion (THD) is 0. A transformer secondary side adopts dynamic rectification, can acquire a DC circuit, and can also acquire an AC voltage. The circuit complexity, the power consumption and the failure rate of the whole green power converter are greatly lowered, and the power converter can be applied in all the fields to replace the traditional power converter.

3 Claims, 45 Drawing Sheets

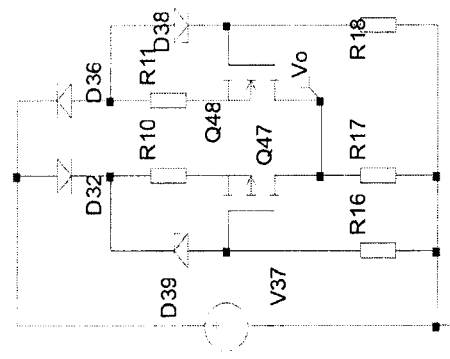
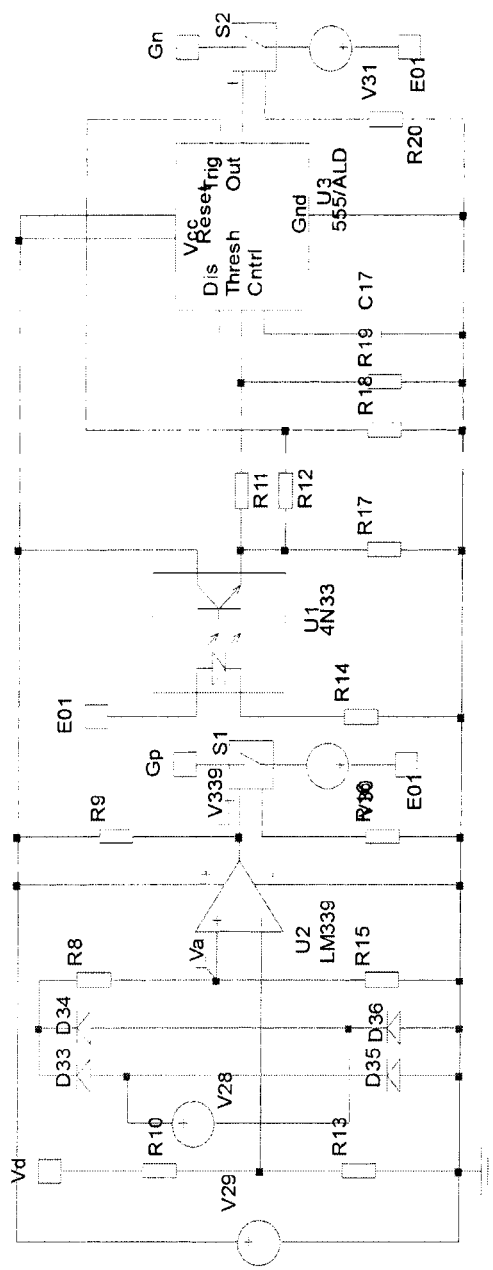
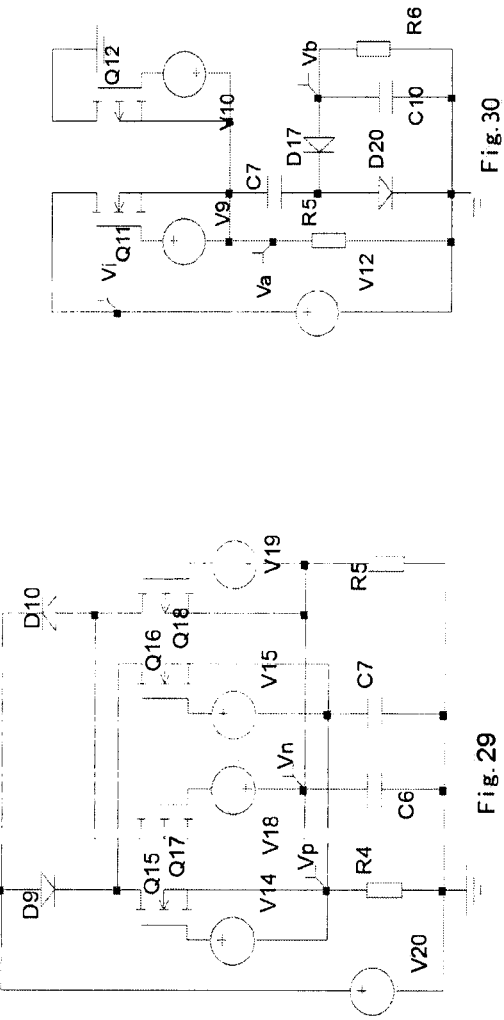
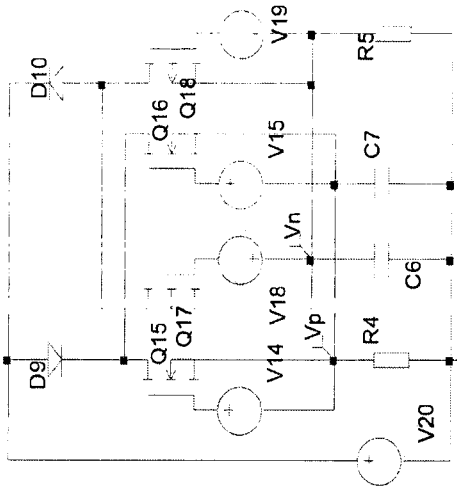
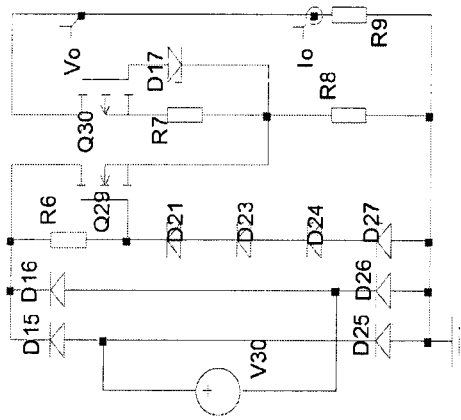

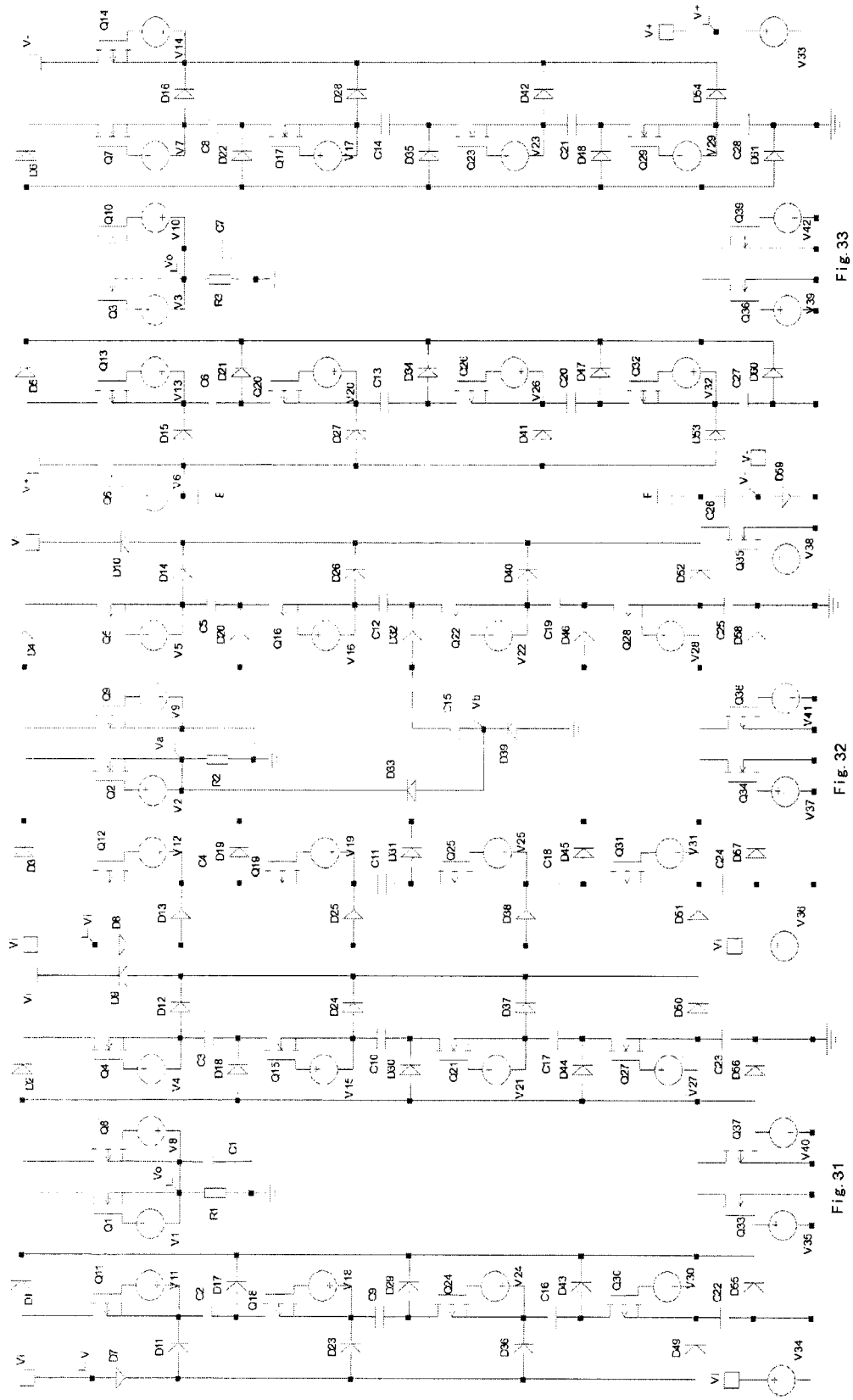

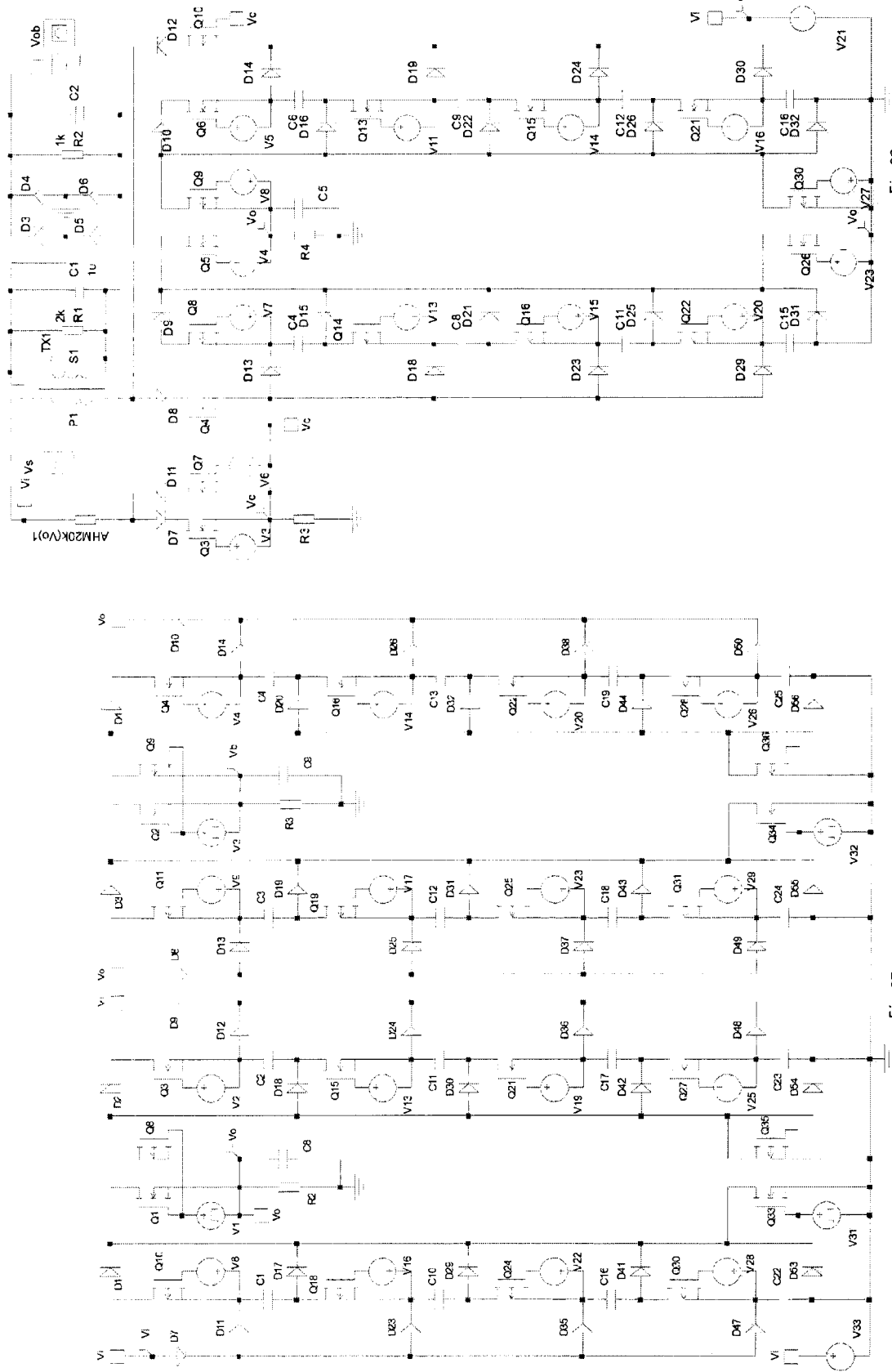

GREEN POWER CONVERTER

This application is a national stage application of PCT/CN2011/000420, filed Mar. 16, 2011, which claims priority to CN 201010130192.X201, filed Mar. 19, 2010, and is entitled to those filing dates for priority.

TECHNICAL FIELD

The invention relates to a power converter.

BACKGROUND TECHNOLOGY

Traditional power conversion adopts the pulse width modulation (PWM) technique, the circuit is complex and difficult to adjust, all power devices work at high-frequency range, an intense EMI interference is generated, so that the sine wave voltage output by the power grid is seriously distorted, and the intense EMI interference is the greatest pollution source to the power grid. If there is no traditional power converter, and the power grid world is a blue sky. Besides the investment or disconnection of electric equipment, there is no other pollution source any more.

The whole input power by traditional power conversion must be subject to power conversion before becoming an output power. The whole converted power must pass through a magnetic core transformer to reach the output end. The input power is subject to traditional power conversion, which means more investment and payment on cost, size, weight and power consumption of the equipment. The converted power passes through the magnetic core transformer, which means the loss in electric power.

The complete efficiency of the traditional power converter is about 85%, and the power factor (PFC) is about 60%. A low efficiency is the inevitable result of traditional power conversion, and a low power factor means the severity of pollution. Facts illustrate the traditional power converter has large power consumption and low efficiency and is unfriendly to environment and is unsafe.

SUMMARY OF THE INVENTION

The traditional power conversion can not be performed in order to make sure that the power grid is prevented from being polluted. If the traditional power conversion is not performed, there is no computer, no television even no street lamps, and our world becomes grey dark. The modern society is civilized, advanced and colorful, and it is impossible to not perform power conversion. Therefore, we sacrifice the blue sky in the power grid world to exchange for colorful modern society. The invention has the purposes of not only maintaining the civilized, advanced and colorful modern society, but also returning the blue sky to the power grid world, not only performing the power conversion, but also not polluting the power grid. The conversion efficiency can reach above 98%.

The complete power converter is composed of a basic circuit (2), the basic circuit (2) is composed of a unit circuit (1), the basic circuit (2) comprises a dynamic rectification circuit (3) and an amplitude height modulation circuit (4), and the dynamic rectification circuit (3) is also composed of a unit circuit (1).

The invention omits the pulse width modulation (PWM) technique in the traditional power converter, no high-frequency power device exists in the main circuit, no EMI interference is generated, and meanwhile, the unit circuit, the amplitude height modulation circuit and the dynamic rectification circuit are adopted. Only a small part of the input power needs to undergo traditional power conversion so as to acquire the whole output power, namely that a large part of the output power neither need traditional power conversion nor need to pass through the magnetic core transformer. The input AC voltage neither needs to be rectified and filtered nor has large inductance and large capacitance, thus the power factor is 1, and the total harmonic distortion (THD) is 0. A transformer secondary side can acquire a DC circuit, and can also acquire an AC voltage by adopting dynamic rectification. The circuit complexity, the power consumption and the failure rate of the whole power converter are greatly reduced.

The invention can replace the application of the traditional power converter in all fields. The application range is only limited to the imaginary space and the comprehensive ability of each person, including:

1) Switching power source
2) Module power source
3) Linear power source
4) Consumer power source
5) Military industry/industry power source
6) LED power source
7) Lighting power source
8) Medical power source
9) Charger
10) Voltage stabilization/rectification/purification
11) Inverter power source
12) Vehicle-mounted power source
13) UPS power source
14) AC/DC power source
15) Variable-frequency power source
16) High-frequency power source
17) EPS power source
18) Laser/pulse power source
19) Electroplating/heating/welding
20) Communication power source
21) Electric power source
22) IT power source
23) Customized/special power source
24) LCD/PDP backlight power source
25) Ultrahigh-voltage power transmission and distribution
26) Special power source for high-energy physics
27) Special power source for aerospace
28) Ultrahigh-voltage power source
29) Ultralow-voltage power source
30) Other power sources In the matter of the traditional power converter, there are four main categories, AC-AC, AC-DC, DC-AC and DC-DC, and circuit topologies of all categories of power converters are completely different. As for the same category of power converters, such as DC-DC power converter, there are various topological forms, such as sing-ended, half-bridge, push-pull, full-bridge, forward, flyback, etc. The invention deals with the four categories of power converters, and further deals with various circuit topologies in each category of power converters. Only one circuit form exists, namely unit circuit, or three types of basic circuits composed of the unit circuit.

In the traditional power converters, no matter single-ended circuits or bridge circuits are used and no matter what the duty ratio of operating waveform is, if no direct current flows across the transformer, the area of pulsed square wave at the transformer primary side and the area of pulsed square wave at the transformer secondary side are always symmetrical about time axis. Here, the area of pulse square wave means voltage, current or power contained in the pulse square wave. The forward converter rectification has the meaning of transmitting the area above the time axis to the load and discarding the area below. The flyback converter rectification has the meaning of transmitting the area blow the time axis to the load and discarding the area above. The bridge converter rectification has the meaning of transmitting the area above the time axis in two secondary side windings to the load and discarding the area blow. Here, "discarding" means increase in power consumption and circuit complexity and decrease in efficiency.

The rectification of the invention, namely the dynamic rectification, has the meaning of transmitting the whole voltage, current or power transmitted into the transformer to the load no matter the area is above the time axis or below the time axis.

Brief Description of the Drawings

FIG. 26: AC and Battery Detection Circuit of DC Uninterrupted Power Source (UPS);
FIG. 27: Embodiment 9: AC Constant-Current Power Source;
FIG. 28: Embodiment 10: DC Constant-Current Constant-Voltage Power Source;
FIG. 29: Embodiment 11: Auxiliary Power Source;
FIG. 30: Embodiment 12: Polarity Reversing Power Source;
FIG. 31: Embodiment 13: AC-AC N-stage Step-Up Power Source;
FIG. 32: Embodiment 14: AC-DC N-stage Step-Up Power Source;
FIG. 33: Embodiment 15: DC-AC N-stage Step-Up Power Source;
FIG. 37: Embodiment 19: DC-AC N-stage High-Frequency High-Voltage Power Source;
FIG. 38: Embodiment 20: AC-AC N-stage Step-Up Voltage-Stabilized Power Source.

Brief Description of the Drawings

Figure 83:
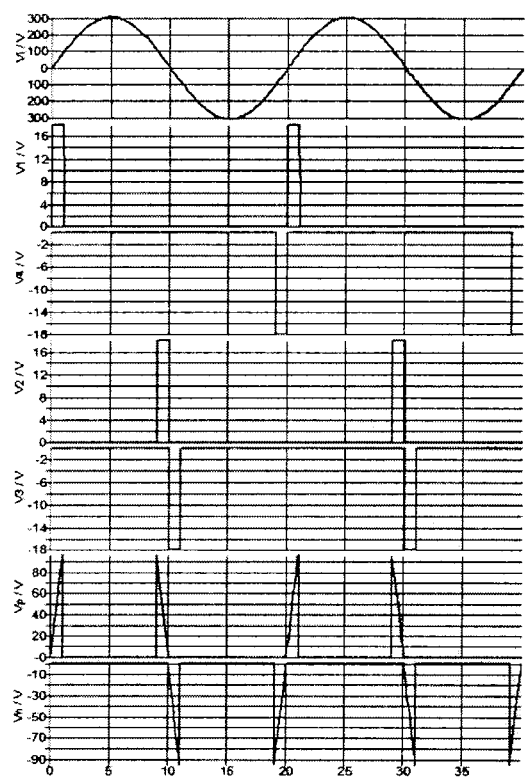
Figure 84:
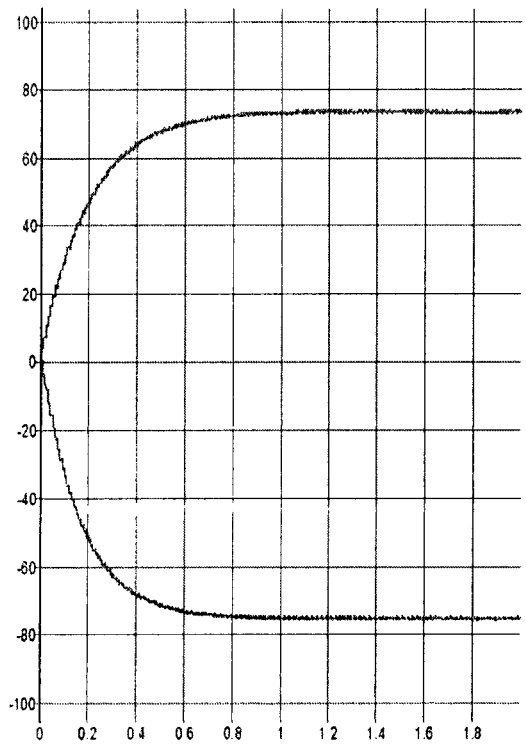
Figure 85:
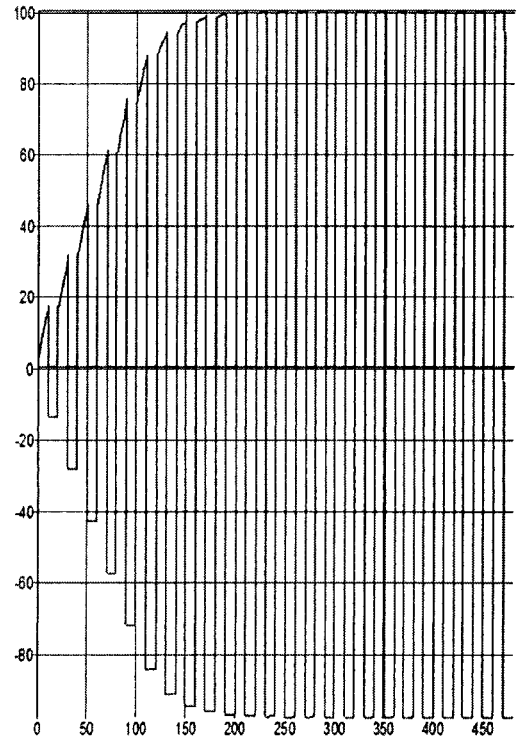
Figure 86:
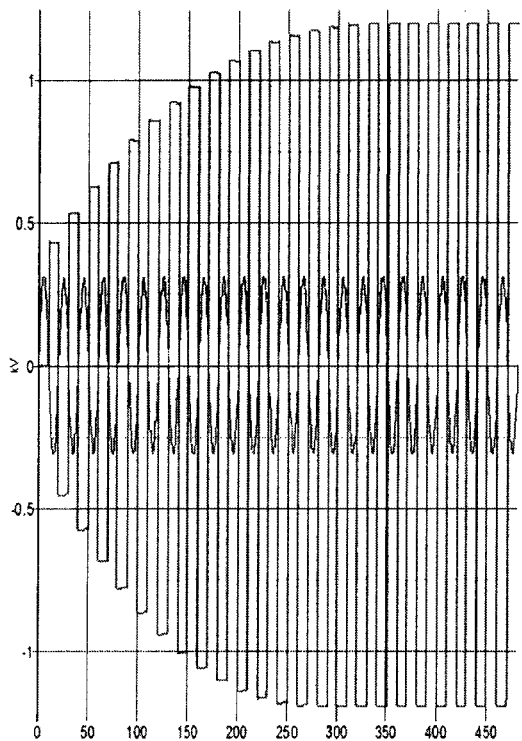
Figure 87:
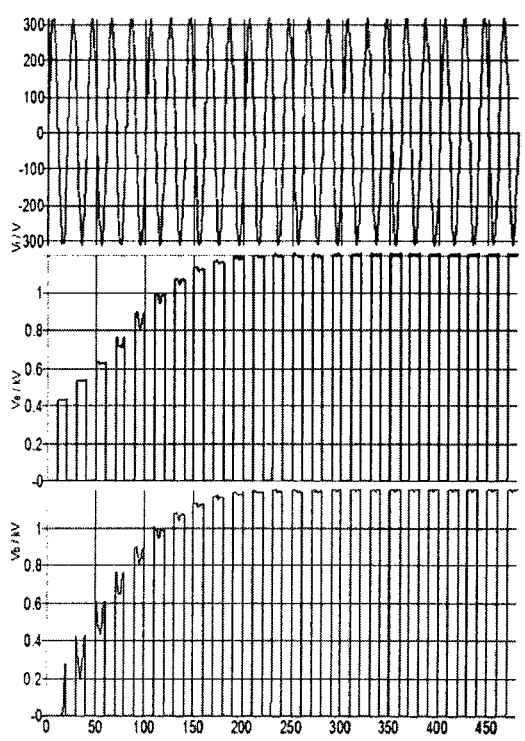
Figure 88:
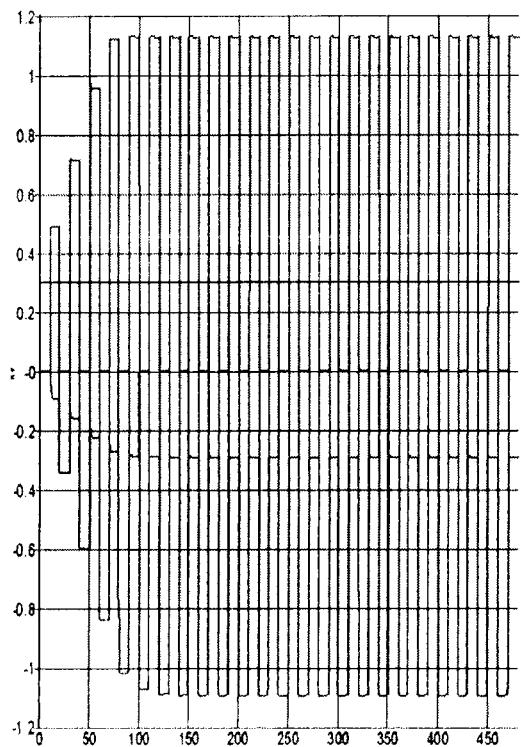
Figure 89:
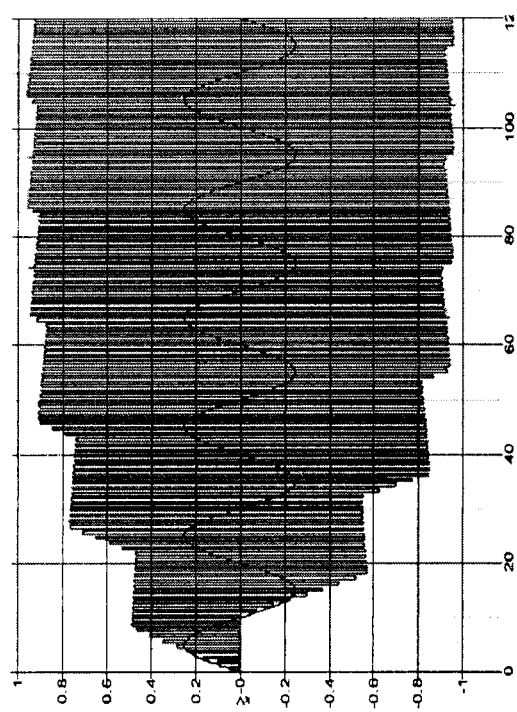
Figure 90:
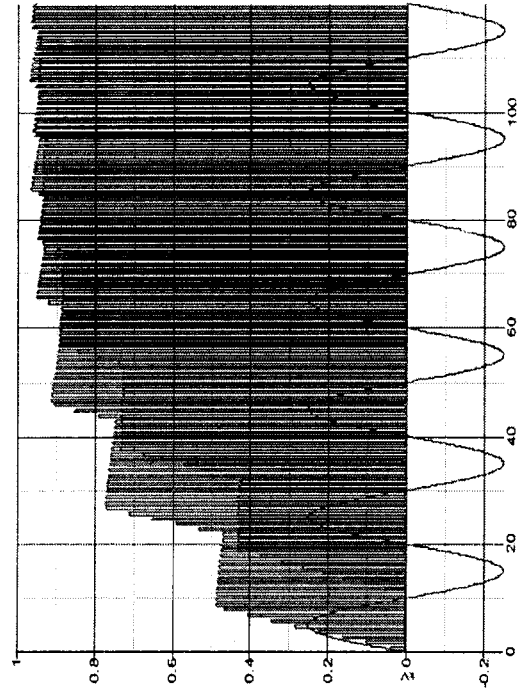
Figure 91:
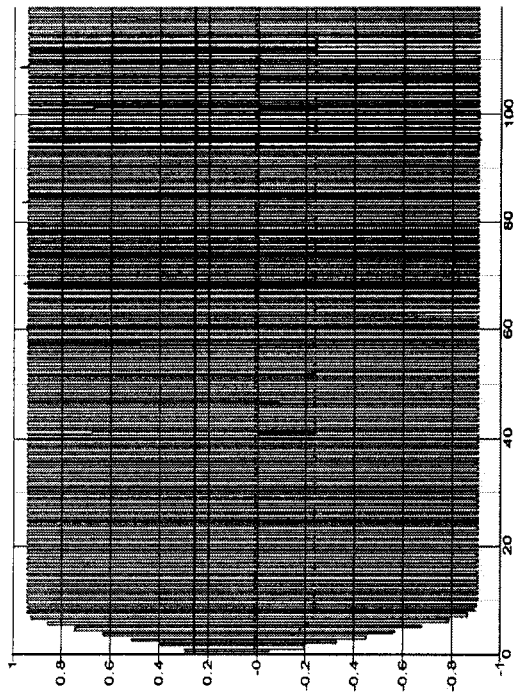
Figure 92:
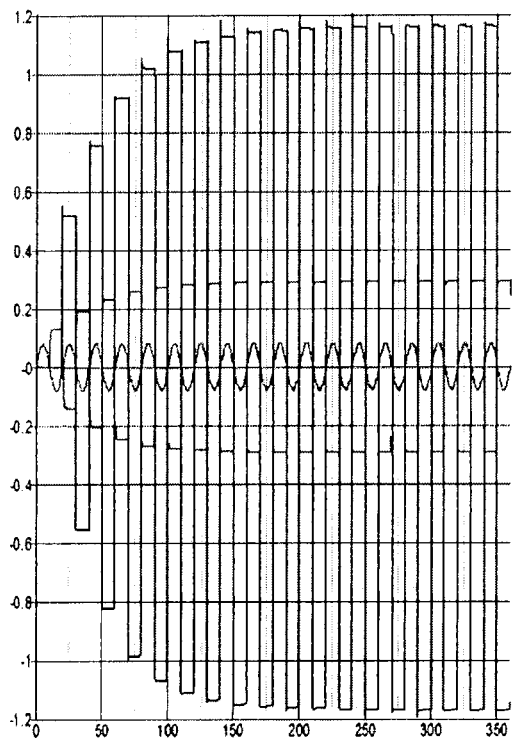
Figure 93:
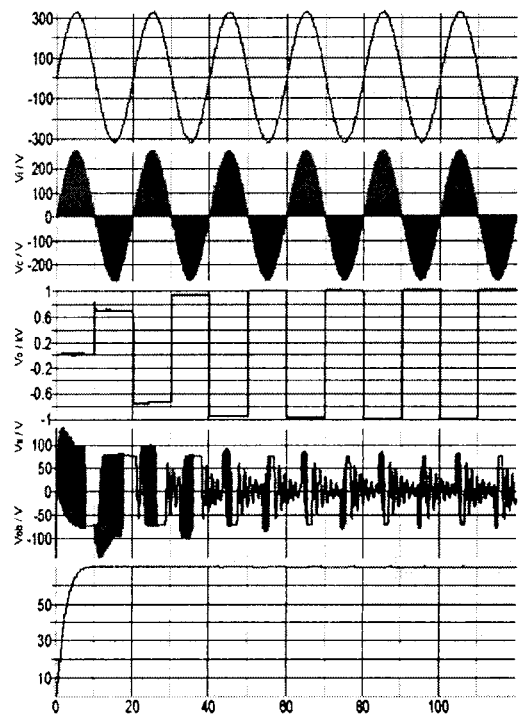
Figure 94:
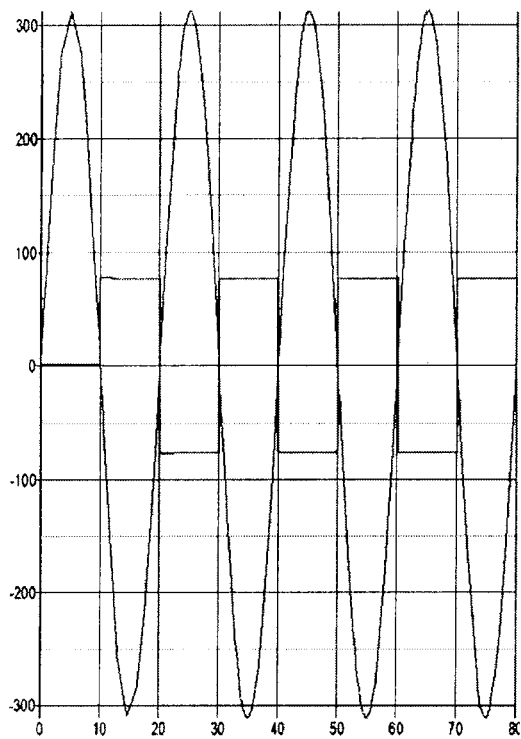
Figure 95:
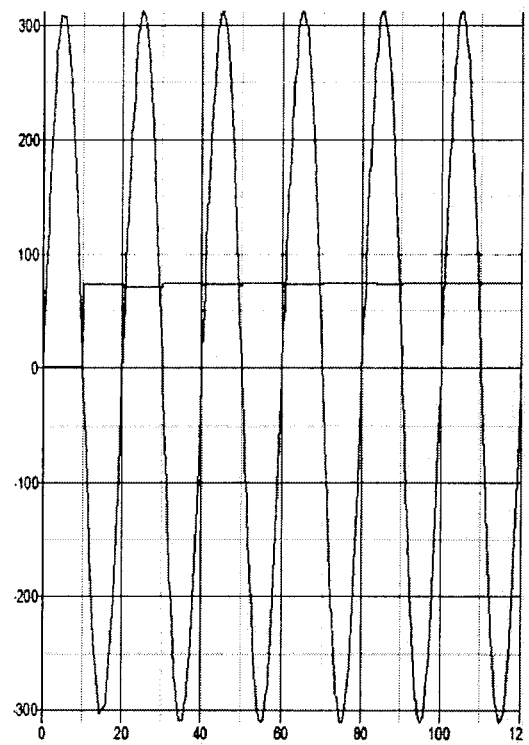
Figure 96:
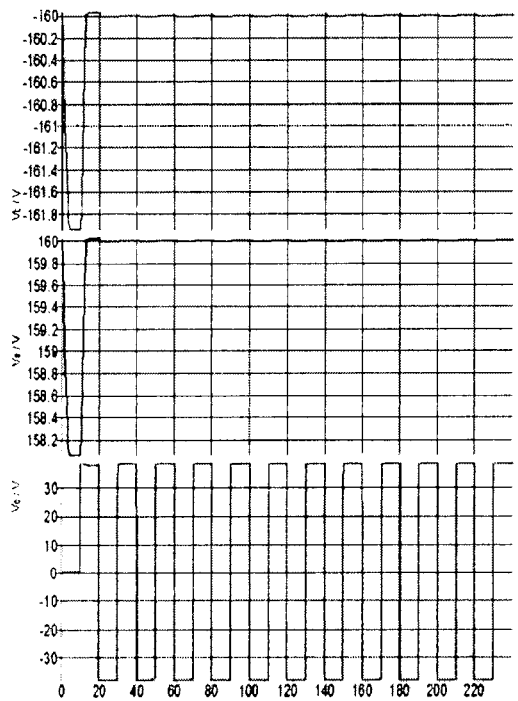
Figure 97:
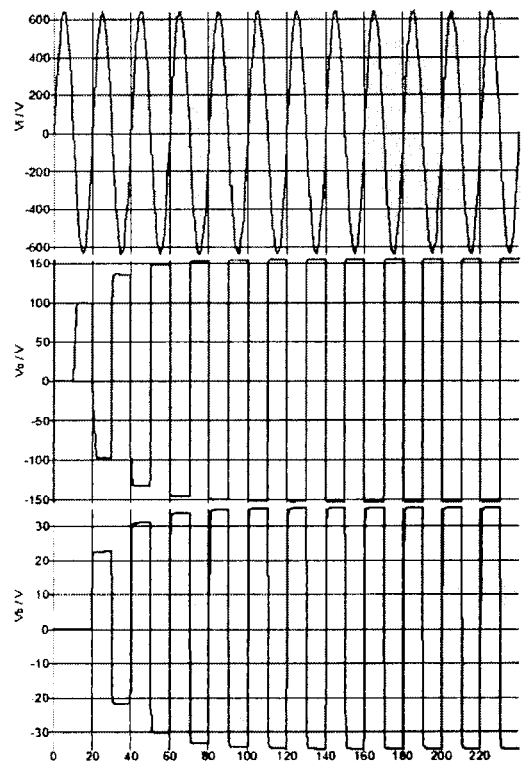
Figure 98:
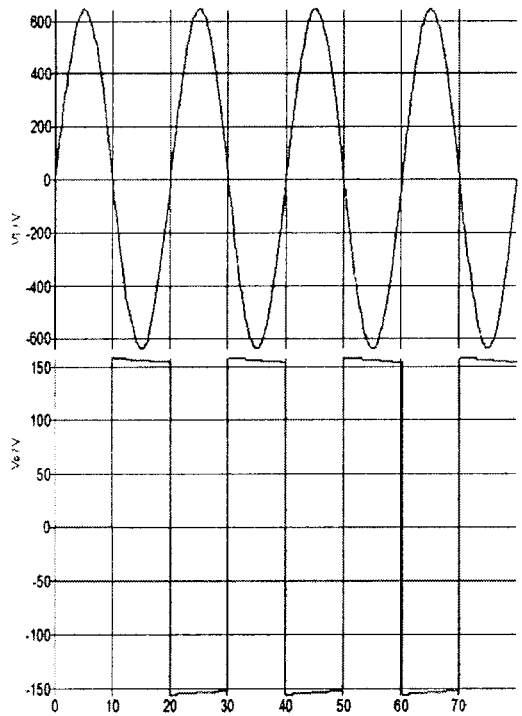
Figure 99:
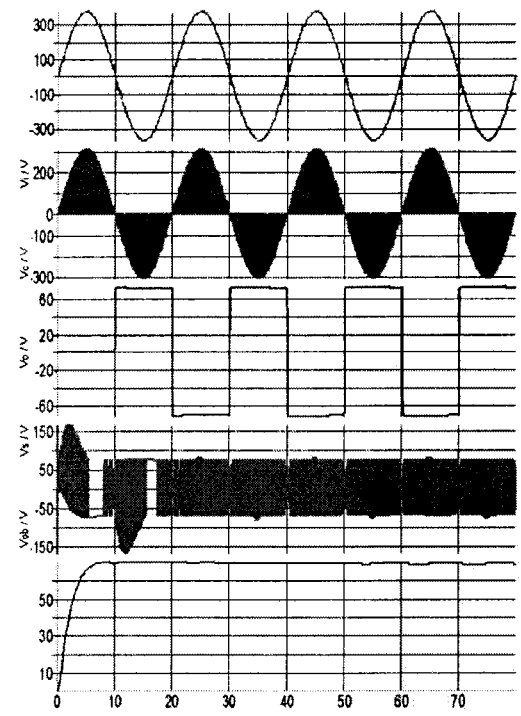
Figure 100:
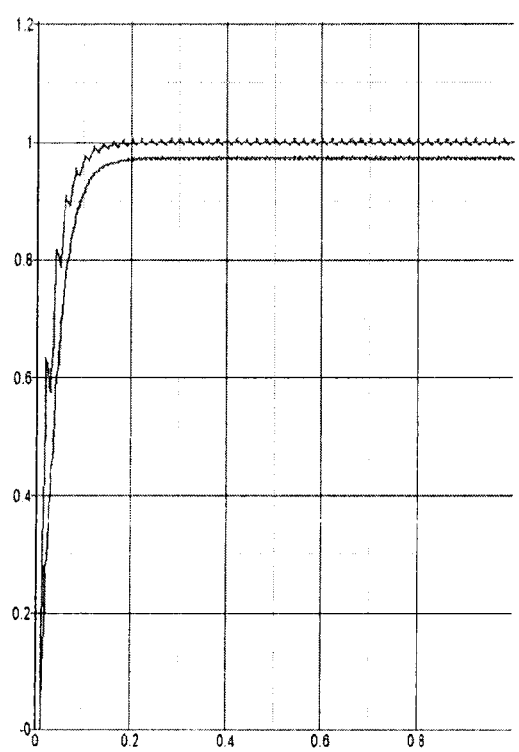
Figure 101:
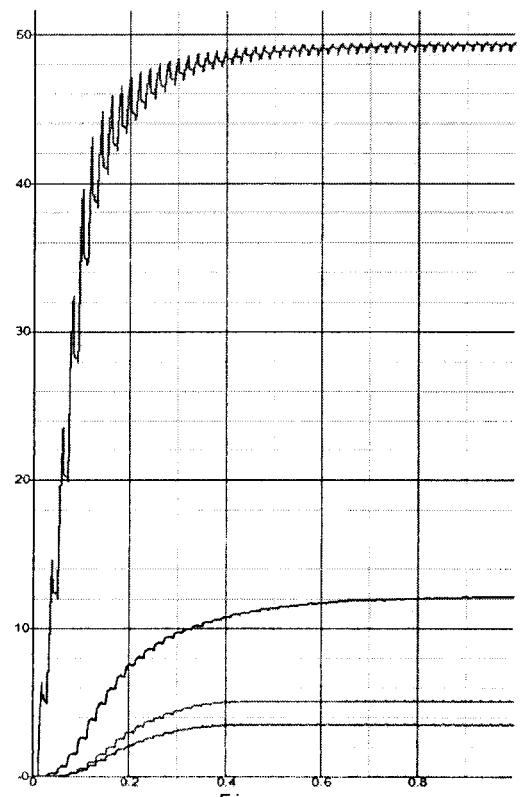
Figure 102:
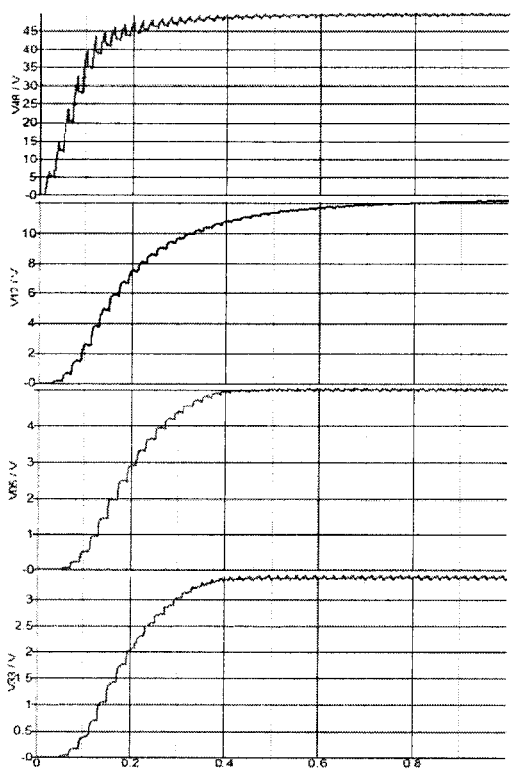
Figure 103:
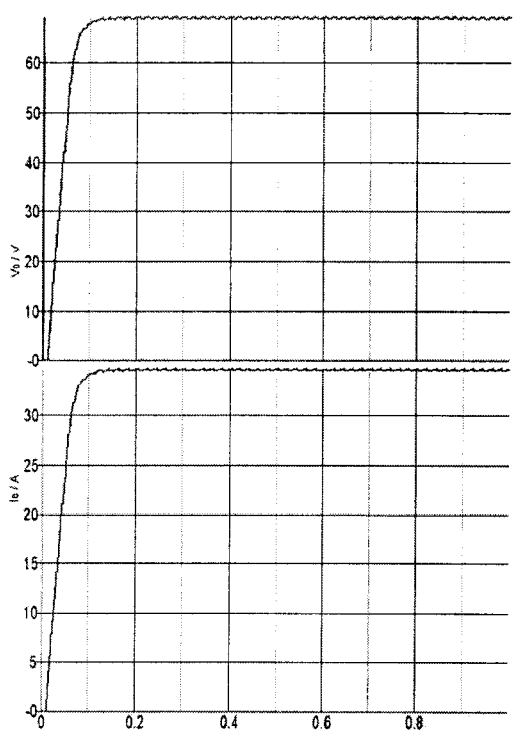
Figure 104:
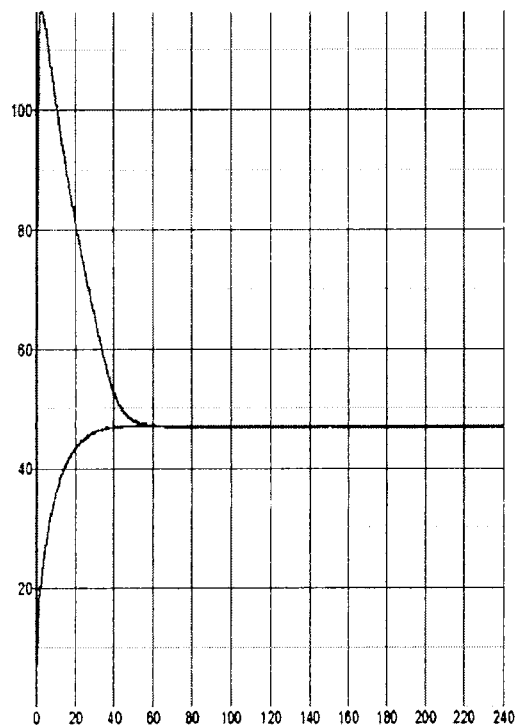
Figure 105:
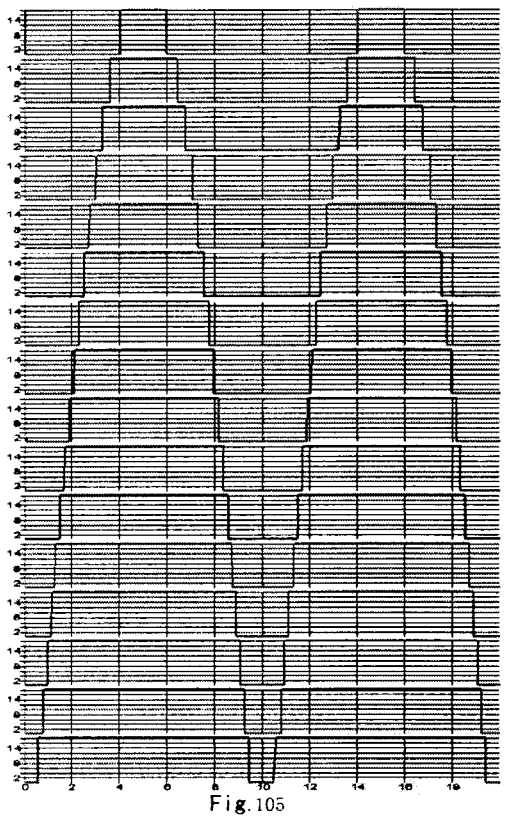
Figure 106:
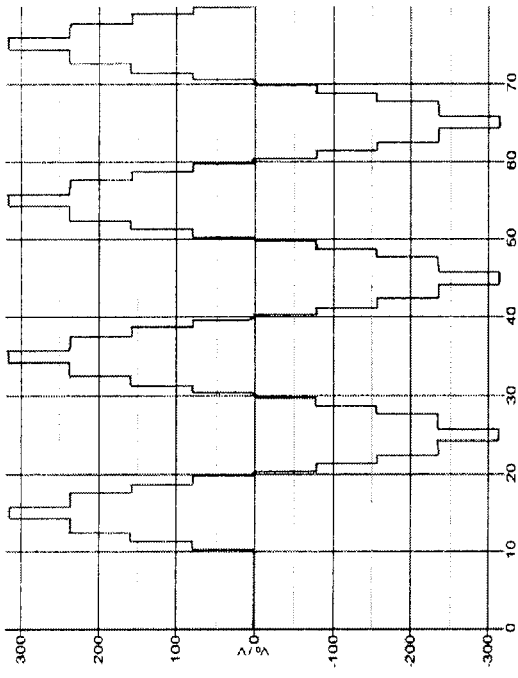
Figure 107:
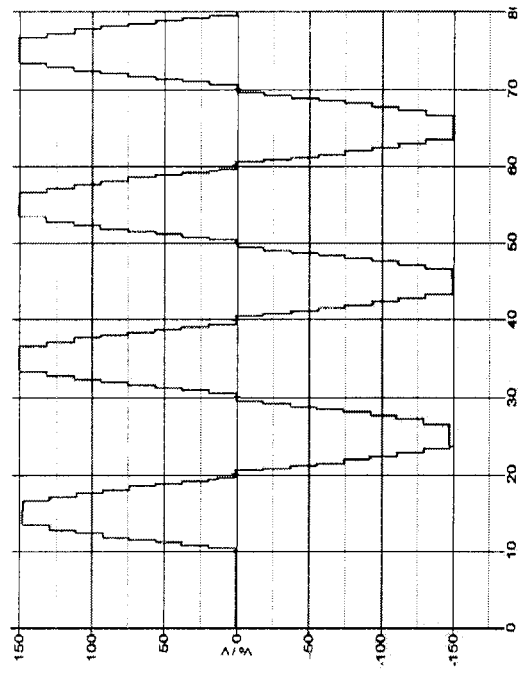
Figure 108:
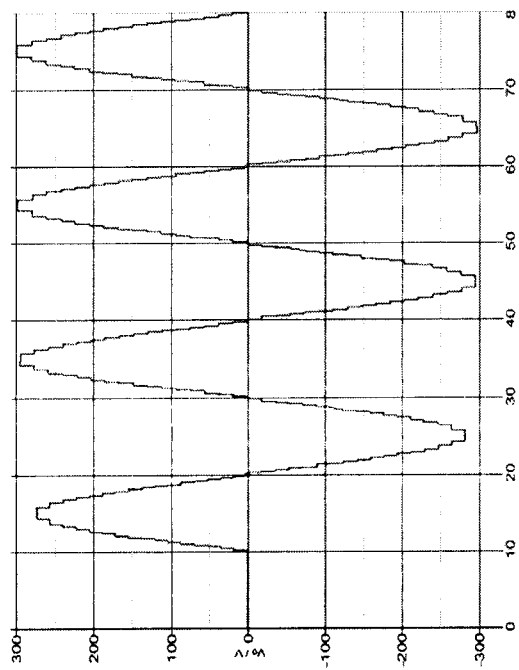
Figure 109:
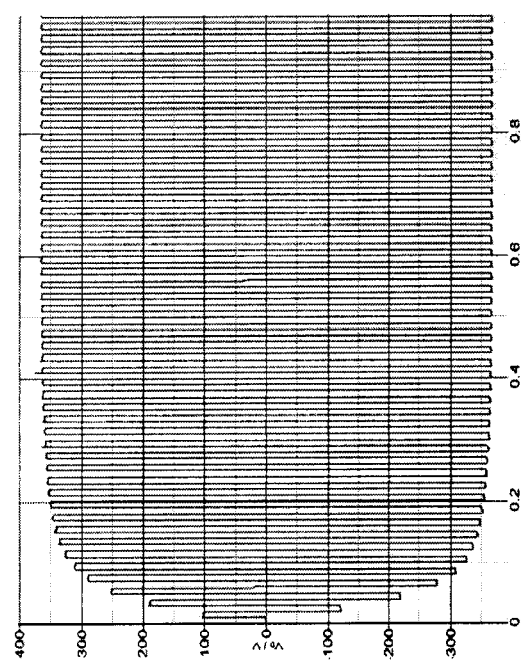
Figure 110:
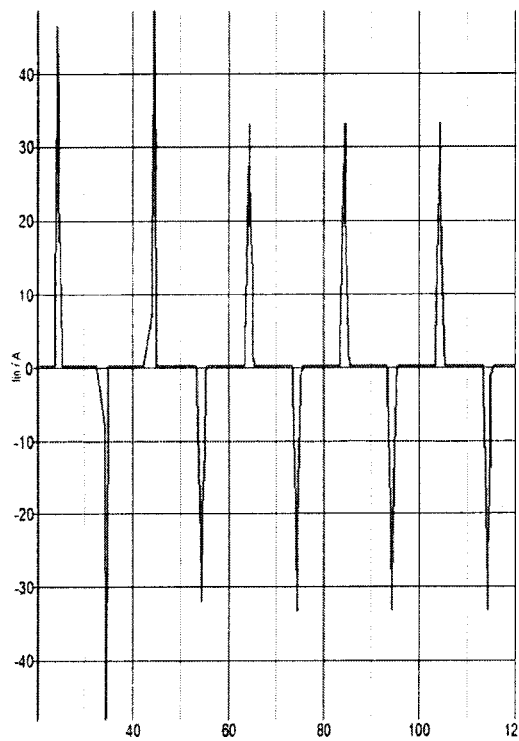
Figure 111:
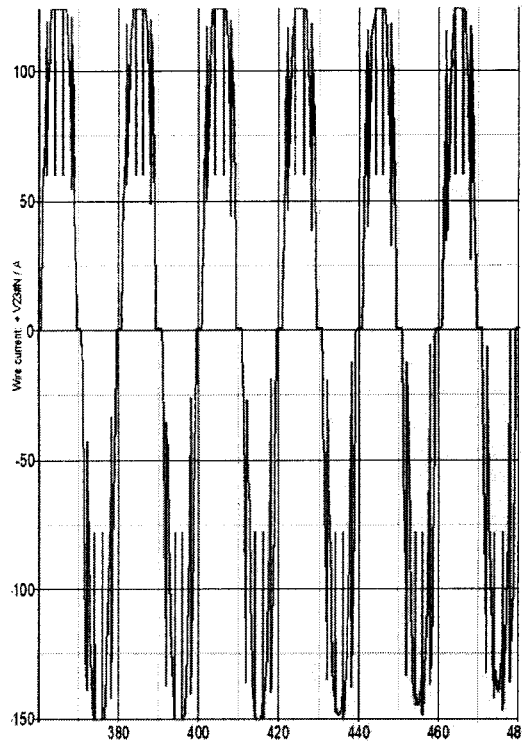
Figure 112:
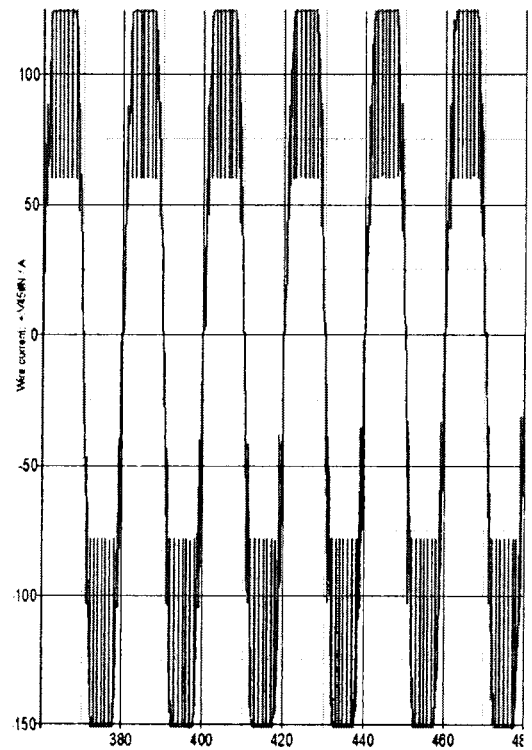
Figure 113:
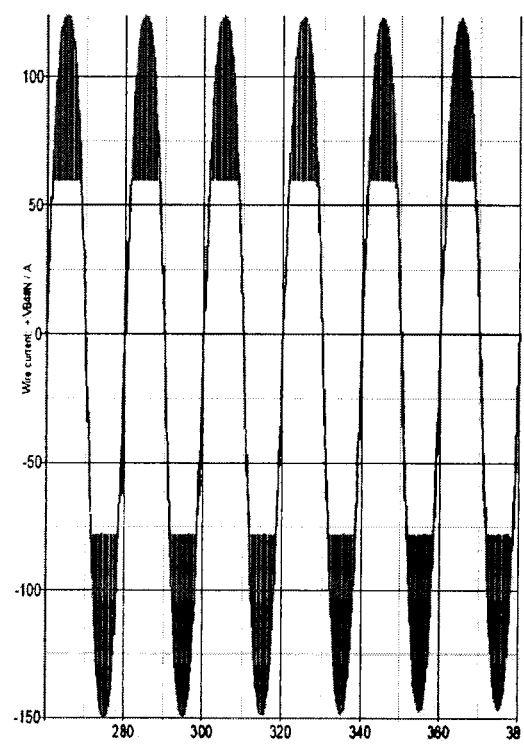
Figure 114:
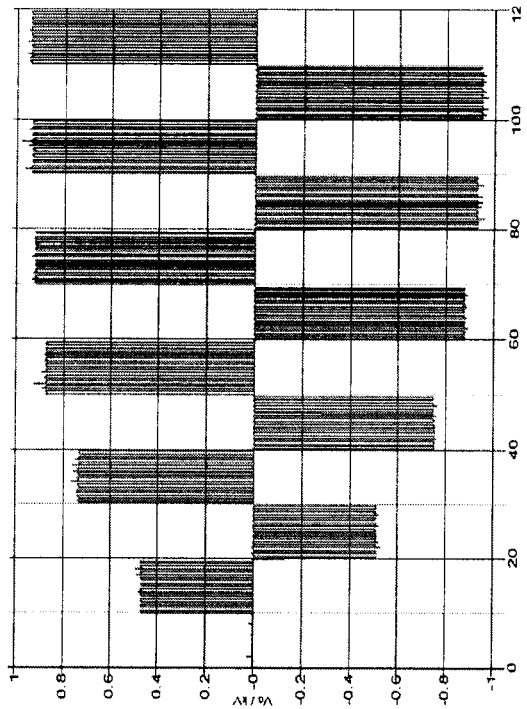
Figure 115:
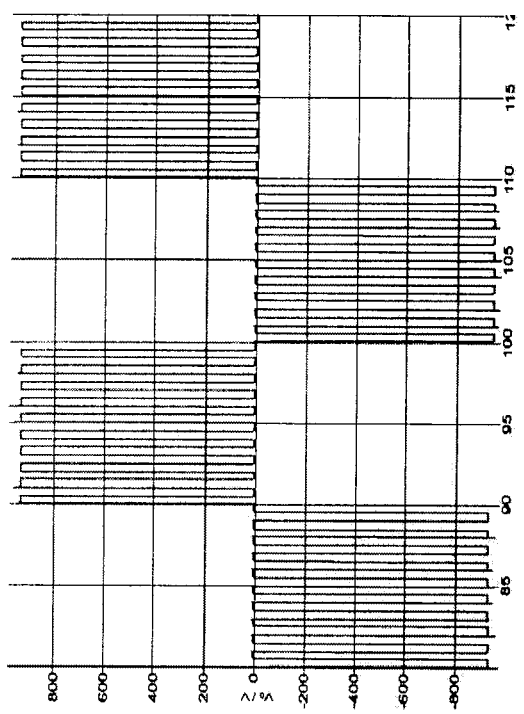
Figure 116:
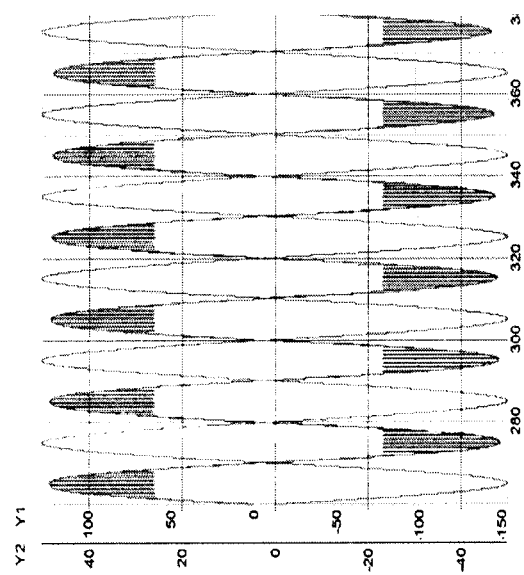
Figure 117:
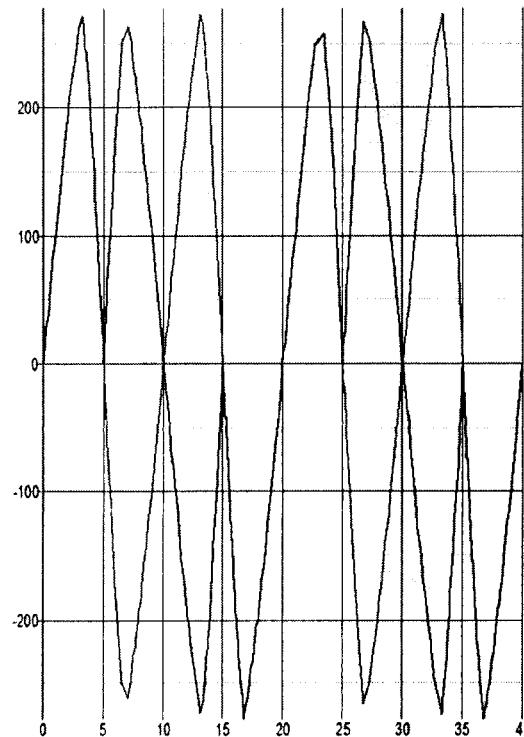
Figure 118:
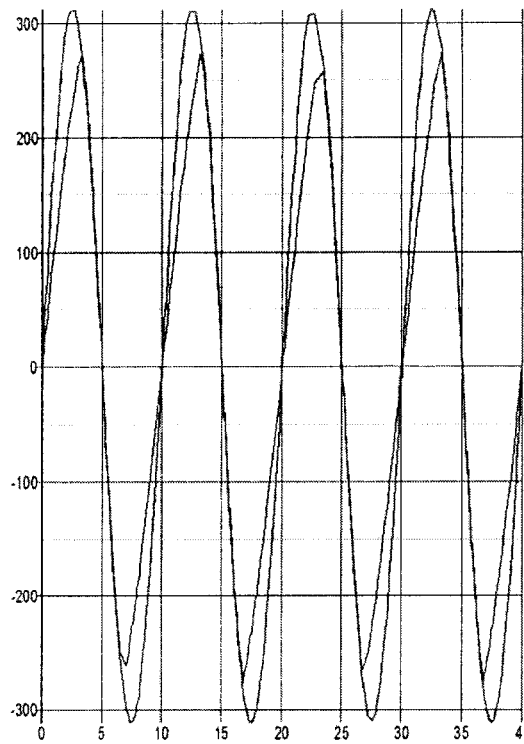
Figure 119:
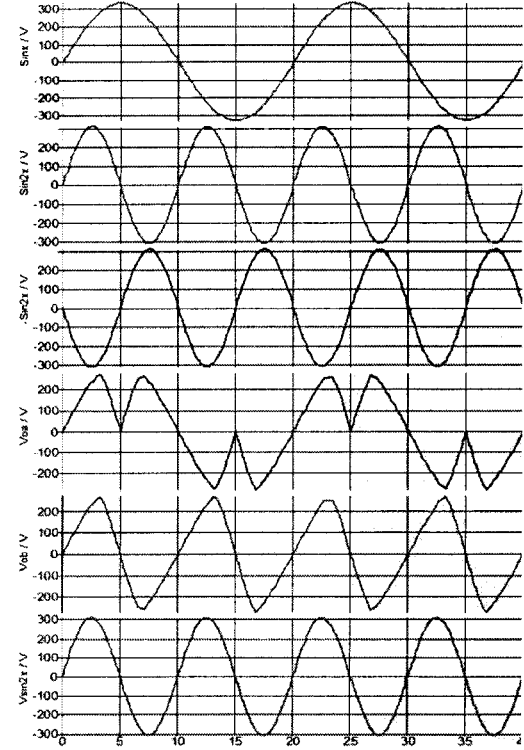
Figure 120:
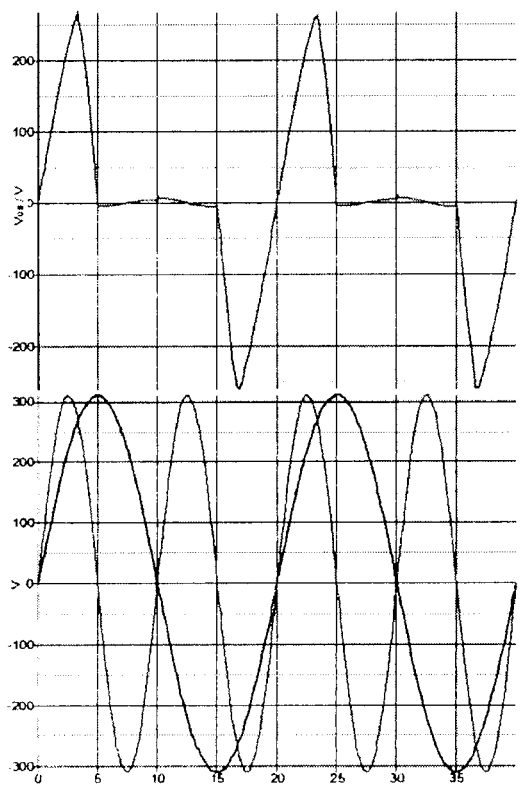
Figure 121:
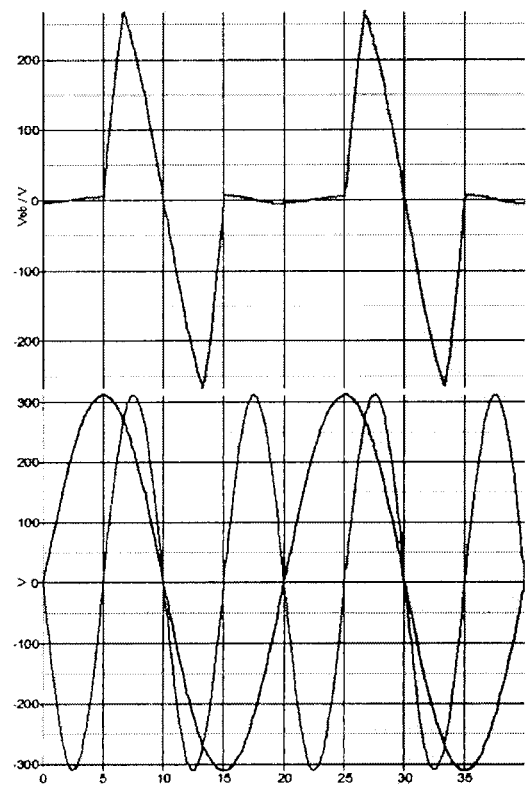
Figure 122:
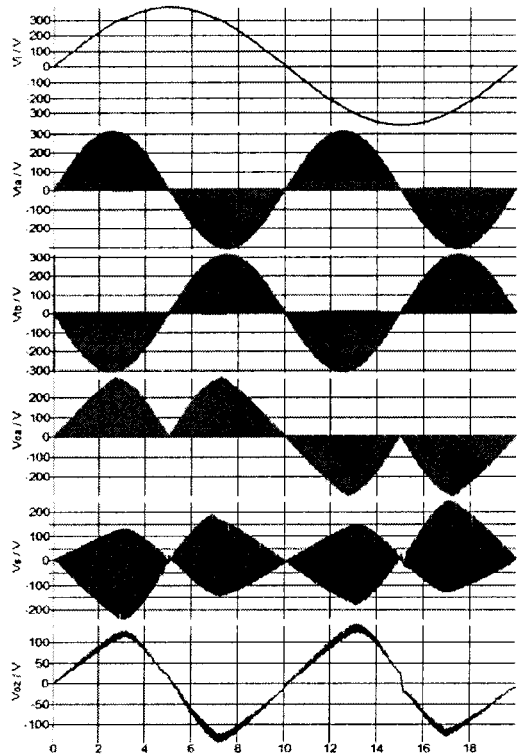
Figure 123:
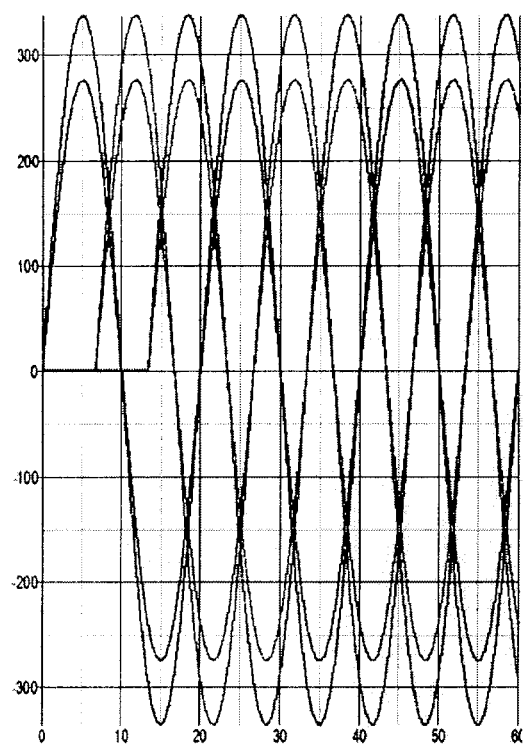
Figure 124:
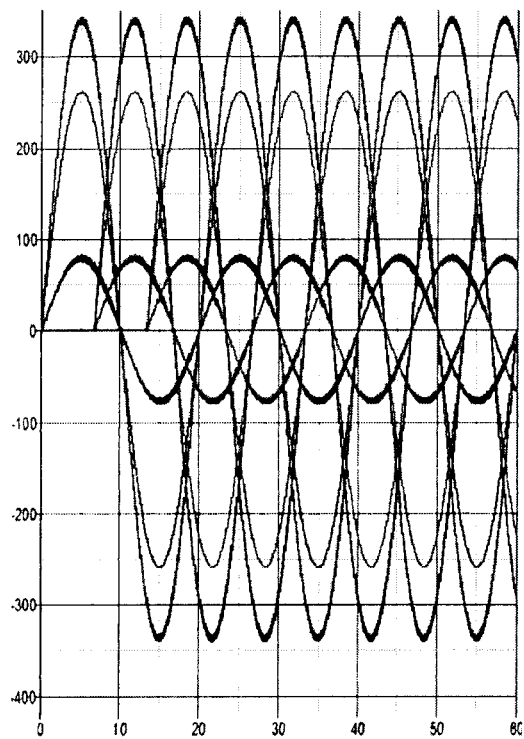
Figure 125:
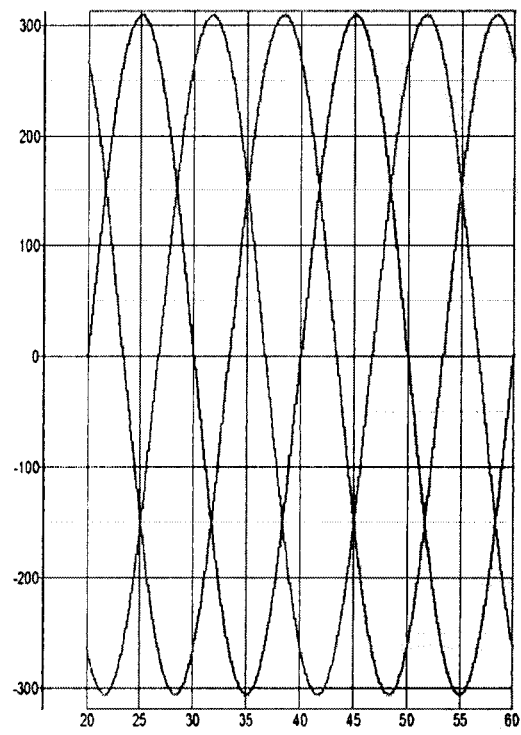
Figure 126:
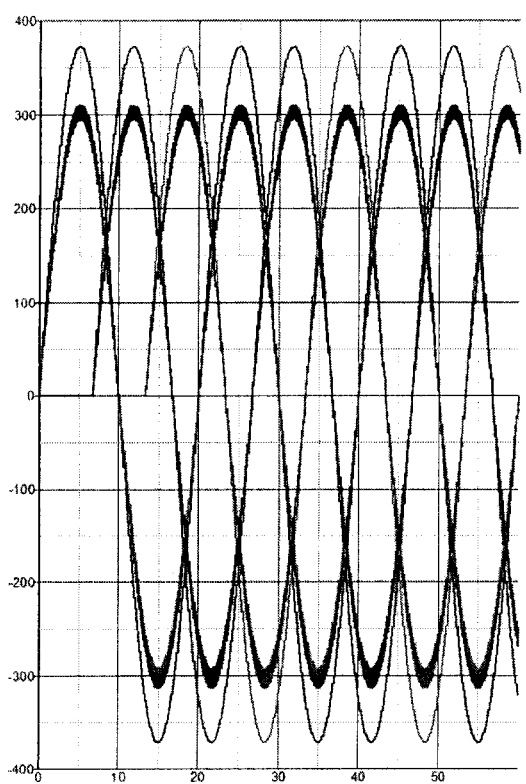

FIG. 83: Voltage Simulation Waveform at Each Point of Auxiliary Power Source;
FIG. 84: Positive and Negative Symmetrical Output Voltage Simulation Waveform of Auxiliary Power Source;
FIG. 85: Output Voltage Simulation Waveform of Polarity Reversing Power Source;
FIG. 86: Output Voltage Simulation Waveform of AC-AC N-stage Step-Up Power Source;
FIG. 87: Output Voltage Simulation Waveform of AC-DC N-stage Step-Up Power Source;
FIG. 88: Output Voltage Simulation Waveform of DC-DC N-stage Step-Up Power Source;
FIG. 89: Output Voltage Simulation Waveform of AC-AC N-stage High-Frequency High-Voltage Power Source;
FIG. 90: Output Voltage Simulation Waveform of AC-DC N-stage High-Frequency High-Voltage Power Source;
FIG. 91: Output Voltage Simulation Waveform of DC-AC N-stage High-Frequency High-Voltage Power Source;
FIG. 92: Output Voltage Simulation Waveform of AC-AC NN-stage Step-Up Power Source;
FIG. 93: Output Voltage Simulation Waveform of AC-AC N-stage Step-Up Voltage-Stabilized Power Source;
FIG. 94: Output Voltage Simulation Waveform of AC-AC N-stage Step-Down Power Source;
FIG. 95: Output Voltage Simulation Waveform of AC-DC N-stage Step-Down Power Source;
FIG. 96: Output Voltage Simulation Waveform of DC-AC N-stage Step-Down Power Source;
FIG. 97: Output Voltage Simulation Waveform of AC-AC NN-stage Step-Down Power Source;
FIG. 98: Output Simulation Waveform of AC-AC N-stage Fully-Isolated Step-Down Power Source;
FIG. 99: Output Voltage Simulation Waveform of AC-AC N-stage Step-Down Voltage-Stabilized Power Source;
FIG. 100: DC-DC N-stage Step-Down Ultralow-Voltage Power Source;
FIG. 101: Output Voltage Simulation Waveform at Each Point of Microcomputer Power Source;
FIG. 102: Output Voltage Simulation Waveform Details at Each Point of Microcomputer Power Source;
FIG. 103: Output Current and Voltage Simulation Waveform of Communication Power Source;
FIG. 104: Output Voltage Simulation Waveform at Secondary Side of Communication Power Source;
FIG. 105: 16-stage Driving Signal Simulation Waveform of Zero-Power-Consumption Photovaltaic Grid-Connected Inverter;
FIG. 106: 4-stage Output Voltage Simulation Waveform of Zero-Power-Consumption Photovoltaic Grid-Connected Inverter;
FIG. 107: 8-stage Output Voltage Simulation Waveform of Zero-Power-Consumption Photovoltaic Grid-Connected Inverter;
FIG. 108: 16-stage Output Voltage Simulation Waveform of Zero-Power-Consumption Photovoltaic Grid-Connected Inverter;
FIG. 109: Output Voltage Simulation Waveform of Power Factor Correction PFC;
FIG. 110: 0-stage Corrected Output Current Simulation Waveform of Power Factor Correction PFC;
FIG. 111: 5-stage Corrected Output Current Simulation Waveform of Power Factor Correction PFC;
FIG. 112: 10-stage Corrected Output Current Simulation Waveform of Power Factor Correction PFC;
FIG. 113: 16-stage Corrected Output Current Simulation Waveform of Power Factor Correction PFC;
FIG. 114: Output Voltage Simulation Waveform 1 of High-Frequency High-Voltage High-Power-Factor Power Source;
FIG. 115: Output Voltage Simulation Waveform 2 of High-Frequency High-Voltage High-Power-Factor Power Source;
FIG. 116: Output Voltage Simulation Waveform 3 of High-Frequency High-Voltage High-Power-Factor Power Source;
FIG. 117: Double-Sideband Compensation of General Inverter without High-Frequency Conversion;
FIG. 118: Double-Sideband Compensation of General Inverter without High-Frequency Conversion;
FIG. 119: Voltage Simulation Waveform at Each Point of General Inverter without High-Frequency Conversion;
FIG. 120: Double-Sideband Cutting of General Inverter without High-Frequency Conversion;
FIG. 121: Double-Sideband Cutting of General Inverter without High-Frequency Conversion;
FIG. 122: Output Voltage Simulation Waveform at Secondary Side of General Inverter without High-Frequency Conversion;
FIG. 123: Output Voltage Simulation Waveform of Three-Phase AC Voltage-Stabilized Power Source;
FIG. 124: Output Voltage Simulation Waveform of Three-Phase AC Inverter Power Source;
FIG. 125: Output Voltage Simulation Waveform of Three-Phase DC Inverter Power Source;
FIG. 126: Output Voltage Simulation Waveform of Three-Phase AC Voltage Cutting Power Source.

DETAILED DESCRIPTION OF EXEMPLARY EMBODIMENTS OF THE INVENTION

The unit circuit (1) has two types of circuit forms:

A field-effect tube Q1 of the unit circuit (1.1) is an N channel, and a field-effect tube Q2 is a P channel. The positive electrode of a diode D1 is connected with the negative electrode of a diode D2 to form an end point A, the drain electrode of the field-effect tube Q1 is connected with the negative electrode of the diode D1, the source electrode is connected with an end point B, the drain electrode of the field-effect tube Q2 is connected with the positive electrode of the diode D2, the source electrode is connected with the end point B, the grid electrode of the field-effect tube Q1 is connected with the positive electrode of a driving signal V1, the negative electrode of the driving signal V1 is connected with the end point B, the grid electrode of the field-effect tube Q2 is connected with the negative electrode of a driving signal V2, and the positive electrode of the driving signal V2 is connected with the end point B.

A field-effect tube Q1 of the unit circuit (1.2) is an N channel, and a field-effect tube Q2 is a P channel. The drain electrode of the field-effect tube Q1 is an end point A, the source electrode of the field-effect tube Q2 is an end point B, the source electrode of the field-effect tube Q1 is connected with the drain electrode of the field-effect tube Q2, the grid electrode of the field-effect tube Q1 is connected with the grid electrode of the field-effect tube Q2 and is also connected with the positive electrode of a driving voltage V, and the negative electrode of the driving voltage V is connected with the end point B.

The basic circuit (2) has three types of circuit forms:
The basic circuit (2.1) is composes of a unit circuit (1) and a resistor R1, an end point A of the unit circuit (1) is connected with the fire wire of an input voltage Vin, the resistor R1 is connected between the zero wire of the input voltage Vin and an end point B of the unit circuit (1), and the end point B of the unit circuit (1) is the output end of the basic circuit (2.1); and a step-up capacitor network UPnet and a step-down capacitor network DNnet are also connected between the end point B of the unit circuit (1) and ground to replace the resistor R1.

The basic circuit (2.2) is composed of a unit circuit (1), a transformer TX1, etc., an end point A of the unit circuit (1) is connected with the synonym end at the primary side of the transformer TX1 and the homonymous end is connected with the positive electrode or the fire wire of an input voltage Vin, an end point B of the unit circuit (1) is connected with the negative electrode or the zero wire of the input voltage Vin, and a dynamic rectification circuit (3) is connected at the secondary side of the transformer.

The basic circuit (2.3) is composed of a unit circuit (1), a resistor R1, a transformer TX1, etc., an end point A of the unit circuit (1) is connected with the synonym end at the primary side of the transformer TX1 and the homonymous end is connected with the positive electrode or the fire wire of an input voltage Vin, an end point B of the unit circuit 1 is connected with one end of a resistor R2, the negative electrode of the zero wire of an input voltage Vin is connected with the other end of the resistor R2, and the end point B of the unit circuit (1) is the output end of the basic circuit (2.3); and the secondary side of the transformer TX1 is connected with a dynamic rectification circuit (3), and a step-up capacitor network UPnet and a step-down capacitor network DNnet are also connected between the end point B of the unit circuit (1) and ground to replace the resistor R2.

The driving signals V1, V2 are generated by the high-frequency driving signal generator (VDrvh) and the synchronous driving signal generator (VDrvs).

The high-frequency driving signal generator (VDrvh) comprises an integrated circuit NE555 and a signal conversion circuit (SPrs), DC power sources V3, V4 are connected in series, the middle is grounded, the negative electrode of the DC voltage V3 is connected with a pin GND of NE555 and end ones of capacitors C1, C2, the positive electrode of the DC voltage V4 is connected with pins Vcc, Reset of NE555 and one end of a resistor R7, the other end of the capacitor C1 is connected with a pin Thresh of NE555, the other end of the capacitor C2 is connected with a pin Cntrl of NE555, the other end of the resistor is connected with a pin Dis of NE555, the positive electrode of a diode D1 is connected with the pin Dis of NE555, the negative electrode is connected with a pin Trig of NE555, the diode D2 and a resistor R6 are connected in series, the positive electrode of the diode D2 is connected with the pin Thresh of NE555, the other end of a diode D6 is connected with the pin Dis of NE555, a pin Out of NE555 is connected with an end point IN of the signal conversion circuit SPrs via a resistor R3, and the end point GND of the signal conversion circuit SPrs is grounded.

The synchronous driving signal generator VDrvs comprise an integrated circuit LM339 and a signal conversion circuit SPrs, DC power sources V4, V5 are connected in series, the middle is grounded, the negative electrode of a DC voltage V4 is connected with a power pin − of LM339, the positive electrode of a DC voltage V5 is connected with the power pin + of LM339 and one end of a resistor R8, the other end of the resistor R8 is connected with the output end point Gc of LM339, the negative electrode of a power source V3 and one end of the resistor R6 are grounded, the other end of the resistor R6 is connected with the same-phase input pin + of LM339, the positive electrode of the power source V3 is connected with the same-phase input pin + of LM339 via a resistor (R7), the opposite-phase input pin − of MP339 is grounded, the output end point Gc of LM339 is connected with the end point IN of the signal conversion circuit SPrs via the resistor R3, and the end point GND of the signal conversion circuit SPrs is grounded.

The signal conversion circuit (SPrs) comprises optical couplers U1, U2, etc., the cathode of the diode part of the optical coupler U1 is connected with the input end point IN, the anode is connected with the end point GND, the emitting electrode of the triode part of the optical coupler U1 is connected with the negative electrode of the power source V2 via the resistor and is also connected with the collecting electrode of a triode Q2, the collecting electrode of the triode part of the optical coupler U1 is connected with the positive electrode of the power source V1 and is also connected with the collecting electrode of a triode Q1, and the emitting electrodes of the triodes Q1, Q2 are connected together to form an output end point Gb and are also connected with the end point GND via the resistor R2; and the anode of the diode part of the optical coupler U2 is connected with the input end point IN, the cathode is connected with the end point GND, the emitting electrode of the triode part of the optical coupler U2 is connected with the negative electrode of the power source V2 via a resistor and is also connected with the collecting electrode of a triode Q4, the collecting electrode of the triode part of the optical coupler U2 is connected with the positive electrode of the power source V1 and is also connected with the collecting electrode of the triode Q3, and the emitting electrodes of the triodes Q3, Q4 are connected together to form an output end point Ga and are also connected with the end point GND via a resistor R5.

The dynamic rectification circuit (3) has four types of circuit forms:

The dynamic rectification circuit (3.1) comprises a unit circuit (1.1) and two resistors, the source electrodes of two field-effect tubes Q1, Q2 of the unit circuit (1.1) are separated, the source electrode of the field-effect tube Q1 is connected with one end of the resistor (R1) to form an output end point P+, the source electrode of the field-effect tube Q2 is connected with one end of the resistor R2 to form an output end point N−, the other ones of the resistors R1, R2 are connected with the output end point N, and the end point A of the unit circuit (1.1) forms an input end point L.

The dynamic rectification circuit (3.2) comprises a unit circuit (1.1) and one resistor, one end of the resistor R1 is connected with the end point A of the unit circuit (1.1) to form an output end point P+, the other end forms an output end point N− and an input end point N, and the end point A of the unit circuit (1.1) forms an input end point L.

The dynamic rectification circuit (3.3) comprises two unit circuits (1.2) and two resistors, the end points A of the two unit circuits (1.2) are connected together to form an input end point L, the end point B of the first unit circuit (1.2) is connected with one end of the resistor R1 to form an output end point P+, the end point B of the second unit circuit 1.2 is connected with one end of the resistor R2 to form an output end point (N−), and the other ones of the resistors R1, R2 form an input end point N.

The dynamic rectification circuit (3.4) comprises four unit circuits (1.2), the end points A of the first and third unit circuits (1.2) are connected together to form an output end point P+, the end points B of the second and fourth unit circuits (1.2) are connected together to form an output end point N−, the end point B of the first unit circuit (1.2) and the end point A of the fourth unit circuit (1.2) are connected together to form an input end point L, and the end point B of the third unit circuit (1.2) and the end point A of the second unit circuit (1.2) are connected together to form an input end point N.

The amplitude height modulation circuit (4) comprises 30 integrated circuits:

The same-phase end of the integrated circuit U3 is connected with a rectifying voltage Vd, the opposite-phase end is connected with a resistor R3 and a resistor (R10), the output end is connected with the positive electrode of the DC voltage V3 via a resistor R4 and is also connected with the end point B of the fourth integrated circuit U4, the other end of the resistor R3 is connected with the positive electrode of the voltage V3, the other end of the resistor R10 is grounded, a capacitor C4 is also connected in parallel via the voltage V3, the fire wire of the AC detection voltage V1 is connected with the anode of the diode D1 and the cathode of the diode D3, the zero wire is connected with the anode of the diode D2 and the cathode of the diode D4, the cathodes of the diodes D1, D2 are simultaneously connected with one end of the resistor R2, the diodes D3, D4 are simultaneously connected with one end of an resistor R11, and the resistors R2, R11 are simultaneously connected with the end point B of the integrated circuit U3; and the end point A of the integrated circuit (U4) is grounded via a resistor R12, the end point RST is connected with the positive electrode of the DC voltage V3 via the resistor R5, the end point CRext is connected with the end point Cext via the capacitor C1 and is connected with the positive electrode of the voltage V3 via the resistor, and the end point QP is connected with the end one s of the integrated circuits U5, U9.

The same-phase end of the integrated circuit U12 is connected with the rectifying voltage Vd, the opposite-phase end is connected with the positive electrode of the voltage V2, and the output end is connected with the positive electrode of the voltage V3 via a resistor R20 and is also connected with the end point B of the integrated circuit U13; and the end point A of the integrated circuit U13 is grounded via a resistor R26, the end point RST is connected with the positive electrode of the voltage V3 via the resistor R21, the end point CRext is connected with the end point Cext via the capacitor C2 and is connected with the positive electrode of the voltage V3 via a resistor R17, and the end point QP is connected with the other end of the integrated circuit and is also connected with the output end of the integrated circuit U29.

The same-phase end of the integrated circuit U19 is connected with the rectification voltage Vd, the opposite-phase end is connected with the positive electrode of a voltage V29, and the output end is connected with the positive electrode of the voltage V3 via the resistor R20 and is also connected with the end point B of the integrated circuit U13; and the end point A of the integrated circuit U13 is grounded via the resistor R26, the end point RST is connected with the positive electrode of the voltage V3 via the resistor R21, the end point CRext is connected with the end point Cext via the capacitor C2 and is connected with the positive electrode of the DC voltage V3 via the resistor R17, and the end point QP is connected with the other input end of the integrated circuit and is also connected with the output end of the integrated circuit U29.

The same-phase end of the integrated circuit U27 is simultaneously connected with end ones of resistors R47, R56, the opposite-phase end is simultaneously connected with end ones of resistors R48, R55, the output end is connected with the positive electrode of the voltage V3 via a resistor R49 and is also connected with the end point B of the integrated circuit U28, the other ends of the resistors are connected with the positive electrode of the voltage V3, the other ends of the resistors R55, R56 are grounded, and a capacitor C6 and the resistor R56 are connected in parallel; and the end point A of the integrated circuit U28 is grounded via a resistor R57, the end point RST is connected with the positive electrode of the voltage V3 via a resistor R50, the end point CRext is connected with the end point Cext via a capacitor C5 and is connected with the positive electrode of the DC voltage V3 via a resistor R46, the end point QP is simultaneously connected with the end points E1, E2 of the integrated circuit U16 and the input end points of the integrated circuits U29, U30, and the end point QN is connected with the end point Rst of the integrated circuit U6.

The end point UP of the integrated circuit U6 is connected with the output end point of the integrated circuit U5, the end point Down is connected with the output end point of the integrated circuit U9, the end points PL, D0, D1, D2 are connected with the positive electrode of the voltage V3 via a resistor R43, the end point D3 is grounded, and the end points Q0, Q1, Q2, Q3 are connected with the end points A0, A1, A2, A3 of the integrated circuit U16.

The clock input ends of the integrated circuits U1, U7, U10, U14, U17, U21, U23, U25, U2, U8, U11, U15, U18, U22, U24, U26 are respectively connected with the data output ends Q0-Q15 of the integrated circuit U16, the end point SET is grounded via the resistor R43, the end point RST is connected with the output ends of the integrated circuits U29, U30, the data input end point D is connected with the output end point QP of the integrated circuit U13, the output end point Q is respectively connected with the positive input ends of the switches S1-S16 via the resistors R8, R15, R22, R27, R32, R38, R44, R53, R9, R16, R23, R28, R33, R39, R45, R54, the negative input ends of the switches (S1-S16) are grounded, the resistors R6, R7, R13, R14, R18, R19, R24, R25, R29, R30, R36, R37, R41, R42, R51, R52 are respectively connected with the switches S1-S16 in parallel and then are successively connected in series, the other end of the starting end resistor R6 is connected with the positive electrode of the voltage V5, the other end of the tail end resistor R52 is connected with one end of the resistor R58, and the other end of the resistor R58 is connected with the negative electrode of the voltage V5 and is also grounded.

The step-up capacitor network (UPnet) and the step-down capacitor network (DNnet) comprises N stages of capacitor networks, and each stage comprises a left arm and a right arm:

The left arm of the step-up capacitor network (UPnet): the cathode of the diode D1 is connected with one end of the capacitor C1 to form a beginning point Begin1 of the stage, the other end of the capacitor C1 is connected with the anode of the diode D3 and the drain electrode of the field-effect tube Q2, and the source electrode of the field-effect tube forms an end point End1 of the stage, the anode of the diode is connected with the positive electrode of the input power source, the cathode of the diode is connected with the negative electrode of the input power source. The right arm of the step-up capacitor network (UPnet): the anode of the diode D2 is connected with one end of the capacitor C2 to form a beginning point Begin2 of the stage, the other end of capacitor C2 is connected with the cathode of the diode D4 and the drain electrode of the field-effect tube Q1, the source electrode of the field-effect tube Q1 forms an end point End2 of the stage, the cathode of the diode is connected with the negative electrode of the input power source, and the anode of the diode is connected with the positive electrode of the input power source.

The left arm of the step-down capacitor network (DNnet): the anode of the diode D1 is connected with one end of the capacitor C1 to form an end point Begin1 of the stage, the other end of the capacitor C1 is connected with the cathode of the diode D3 to form an end point End1 of the stage, the cathode of the diode is connected with the positive electrode of the output voltage, and the anode of the diode is connected with the negative electrode of the output voltage. The right arm of the step-down capacitor network (DNnet): the cathode of the diode D2 is connected with one end of capacitor C2 to form an end point Begin1 of the stage, the other end of the capacitor C2 is connected with the cathode of the diode D4 to form an end point End2 of the stage, the anode of the diode is connected with the negative electrode of the output voltage, and the cathode of the diode D4 is connected with the positive electrode of the output voltage; the end point End of the previous stage is connected with the end point Begin of the next stage to form a multi-stage step-up capacitor network and a multi-stage step-down capacitor network; and a square-wave driving signal (VEnu1) is enveloped as a sine wave.

Figure 1:
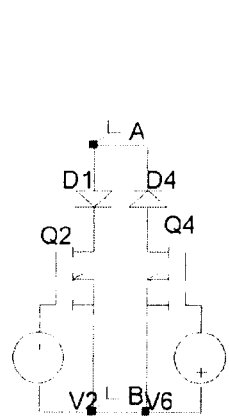
FIG. 1: Unit Circuit (1.1)

FIG. 1 is the unit circuit (1.1). In the positive half-cycle of mains supply, the grid electrode driving signal V2 is positive level, Q2 is conducted, and the current enters from the diode D2 and flows out of the source electrode after passing through the power device Q2; and in the negative half-cycle of mains supply, the grid electrode driving signal V6 is negative level, Q4 is conducted, the current enters from the source electrode of the power device Q4 and flows out of the cathode after passing through the diode D4, and the source electrodes of Q2 and Q4 are connected together.

Figure 2:
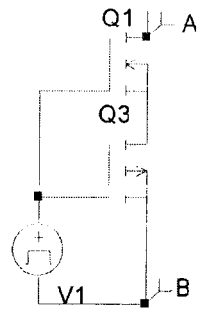
FIG. 2: Unit Circuit (1.2)

FIG. 2 is the unit circuit (1.2). The grid electrode driving signal V1 is positive and negative symmetrical level. In the positive half-cycle of mains supply, the grid electrode driving signal V1 is positive level, Q1 is conducted, and the current enters from the drain electrode of the power device Q1 and flows out of the cathode after passing through a diode within the power device Q3; and in the negative half-cycle of mains supply, the grid electrode driving signal V1 is negative level, Q3 is conducted, and the current enters from the source electrode of the power device Q3 and flows out of the cathode after passing through the diode within the power device Q1.

The unit circuit is a wonderful circuit combination, is everywhere in the green power converter but never exists in the traditional power converter. The unit circuit comprises a pair of power diodes and a pair of MOS tubes. The power diodes and the MOS tubes are the most basic functional components assembled as required in the invention. The unit circuit can be directly used for processing and operating AC voltage or DC voltage and is applied to all links of the green power converter. The two types of unit circuits have completely identical functions but slightly different purposes. The polarities of the MOS tubes in the unit circuit can be the same and can also be different. The direction of positive and negative electrodes of the diodes connected with the MOS tubes is properly changed due to different polarities of the MOS tubes so that the current can flow to form a loop. The diodes connected with the MOS tubes can be omitted in the occasion of processing DC.

Figure 3:
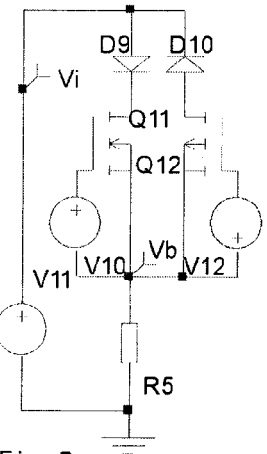
FIG. 3: Basic Circuit (2.1)
Figure 60:
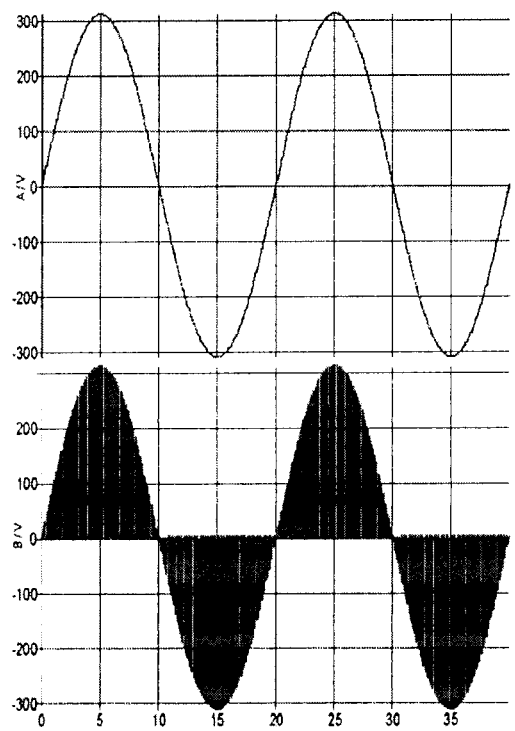
FIG. 60: Output Voltage Simulation Waveform of Basic Circuit (2.1)

FIG. 3 is the basic circuit (2.1). Assuming that the voltage V11 applied between the point A of the unit circuit and ground is a sine-wave signal, and uniform-amplitude square-wave signals V10, V12 are applied between both grid and source electrodes, and a square-wave signal Vb enveloped as sine wave is generated on the source electrode resistor R5. The signal is also called as a voltage cutting signal. FIG. 60 is the simulation waveform of a voltage cutting signal generated by the basic circuit (2.1).

Figure 4:
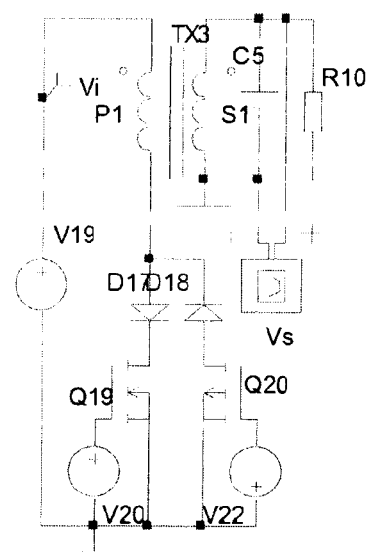
FIG. 4: Basic Circuit (2.2)
Figure 61:
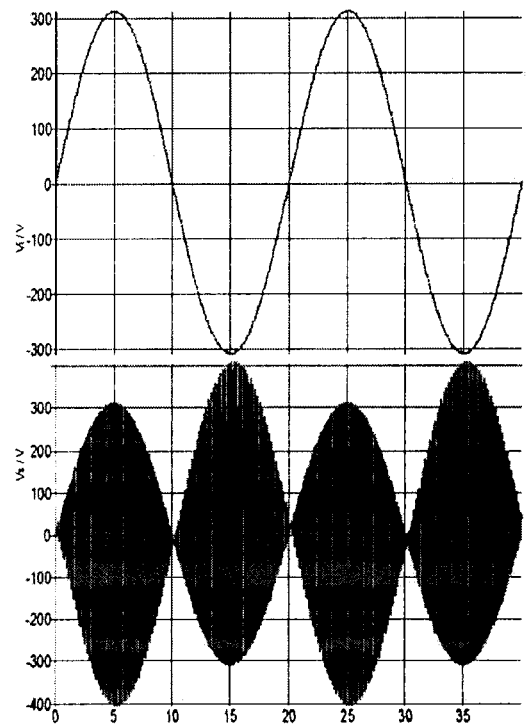
FIG. 61: Output Voltage Simulation Waveform of Basic Circuit (2.2)

FIG. 4 is the basic circuit (2.2). Assuming that the voltage V19 applied between the transformer and the ground is sine-wave voltage, uniform-amplitude square-wave signals V20, V22 are applied between two grid electrodes, and the double-side band voltage enveloped as sine wave is generated at the primary side and secondary side windings of the transformer TX3. FIG. 61 is the simulation waveform thereof. The upper part is the waveform of the input voltage V19, and the lower part is the waveform of the transformer secondary side voltage Vs. If large-capacitance filtering is not applied, the waveform of the transformer secondary side voltage is enveloped as sine wave, and the sine-wave voltage with the same frequency and same phase to the mains supply is obtained after dynamic rectification. If the input voltage is DC, DC has become AC. It is simple for the green power converter to perform AC-AC and DC-AC power conversion. The basic circuit (2.2) is used for generating a compensating voltage, and the circuit is also called as a voltage compensating circuit. The basic circuit (2.2) generates a compensating voltage by adopting traditional power conversion, and the efficiency is about 85%. The secondary side of TX3 in the compensating circuit adopts bridge rectification, and the DC compensating voltage can be obtained to compensate DC. The dynamic rectification circuit is adopted to generate an AC compensating voltage to compensate AC.

Figure 5:
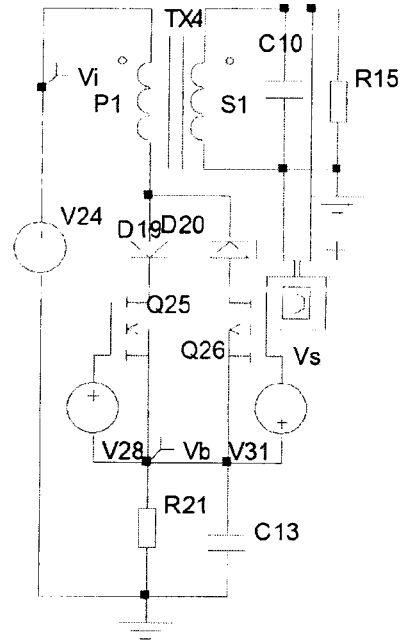
FIG. 5: Basic Circuit (2.3)
Figure 62:
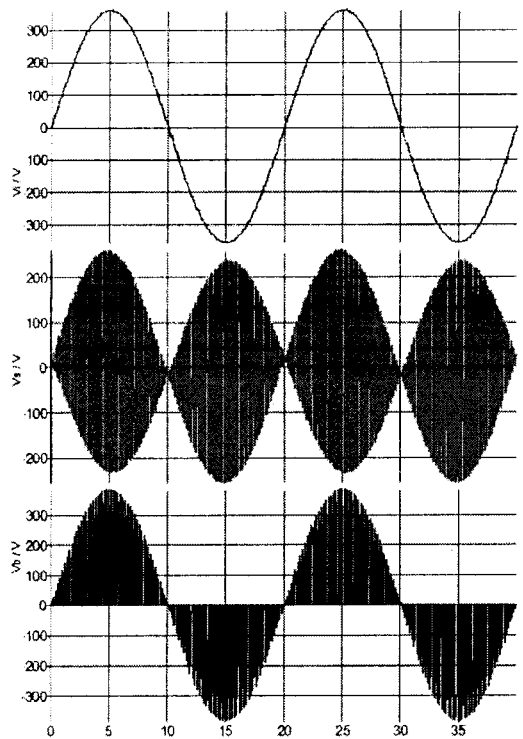
FIG. 62: Output Voltage Simulation Waveform of Basic Circuit (2.3)

FIG. 5 is the basic circuit (2.3). Assuming that the voltage V24 applied between the transformer and the ground is sine-wave voltage, uniform-amplitude square-wave signals V28, V31 are applied between both grid and source electrodes, a square-wave voltage enveloped as sine wave is generated on the source electrode resistor R21, and the double-side band voltage enveloped as sine wave is generated at the primary side and secondary side windings of the transformer TX4. FIG. 62 is the simulation waveform thereof. The upper part is the input sine-wave voltage, the middle part is the double-side band square-wave voltage generated at the transformer secondary side and enveloped as sine wave, and the lower part is the sine-wave square-wave voltage output by the source electrode and enveloped as sine wave.

If the voltage cutting signal Vb generated by the basic circuit (2.1) is applied between the grid electrodes of the field-effect tubes Q25, Q26 and the ground, no matter what voltage is applied to the drain electrodes, as long as the drain electrode voltage is greater than the grid electrode voltage, the square-wave voltage enveloped as sine wave is generated on the source electrode resistors. The voltage accurately tracks the grid electrode signal, i.e. the grid electrode voltage just likes an edge to cut off the drain electrode voltage with the exactly same shape to the grid electrode voltage. Therefore, the basic circuit (2.3) is also called as the voltage cutting circuit.

If the grid electrode cutting signal is sine wave, a DC voltage with the same amplitude to the cutting voltage is applied to the drain electrode, and an output voltage with the same amplitude to the DC voltage and the same shape to the cutting voltage envelop can be obtained on the source electrode resistor, which is the operating principle of DC inversion. If the grid electrode cutting signal is sine wave, an AC voltage with the same amplitude and different frequency to the cutting voltage is applied to the drain electrode, and an output voltage with the same amplitude to the drain electrode and same frequency to the grid electrode cutting voltage and having two common parts with different frequencies is obtained on the source electrode resistor, which is the operating principle of frequency variation. The rest part of the cut drain electrode voltage is subject to the traditional power conversion in TX4. The operating process and result are identical to the situation of compensating voltage.

The common drain electrodes of the basic circuits (2.2, 2.3) are both connected with magnetic core transformers. Because the input voltage is sine wave and does not have rectifying and filtering, when the square-wave driving signal is applied to the grid electrodes, a double-sideband square-wave voltage enveloped as sine wave is generated at the secondary side of the transformer. The amplitudes of the positive and negative half-cycles have large difference as can be seen, but the pulse with large amplitude is narrow, the pulse with small amplitude is wide, and the area or average value is identical. If the duty ratio of the driving pulse is equal to 0.5, the pulse amplitudes above and below the time axis are equal. The more the duty ratio deviates from 0.5, the greater the difference in the positive and negative pulse amplitudes is.

Figure 6:
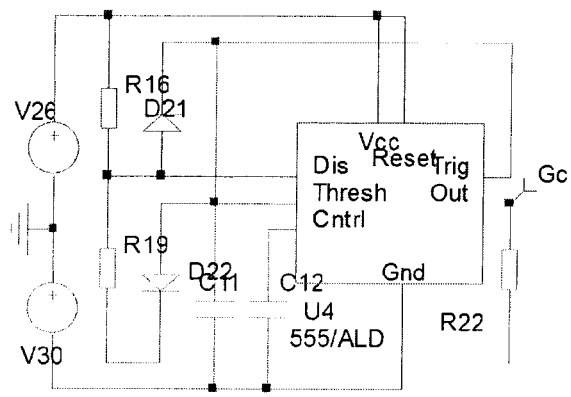
FIG. 6: High-Frequency Driving Signal Generator VDvrh.

FIG. 6 is the high-frequency driving signal generator VDrvh. The integrated circuit NE555 is connected with a basic oscillator with adjustable duty ratio, V26 and V30 are connected in series to power supply voltage, the center is grounded, an output voltage Gc is output from R22, and Gc is a symmetrical square-wave voltage in relative to the center ground. The signal is connected to the signal conversion circuit SPrs shown in FIG. 8. Complementary and positive and negative symmetrical driving signals Ga, Gb are finally generated.

Figure 7:
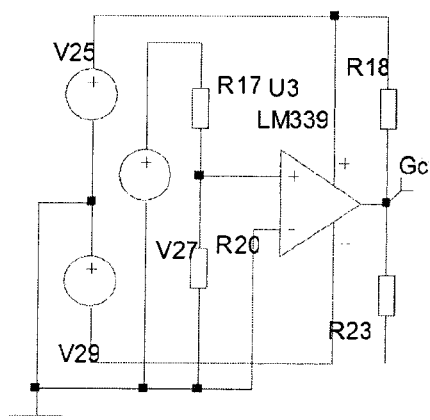
FIG. 7: Synchronous Driving Signal Generator VDvrs.

FIG. 7 is the synchronous driving signal generator VDrvs. The integrated circuit LM339 is connected with a general comparator circuit, and the power supply voltage is the same to FIG. 6. The same-phase end is connected with the mains voltage, and the opposite-phase end is grounded. When the mains voltage is not equal to zero, the output of the comparator generates jumping, an output voltage Gc is generated on resistor R23, and Gc is a symmetrical square-wave voltage in relative to the center ground. The signal is connected to the signal conversion circuit SPrs shown in FIG. 8. Complementary and positive and negative symmetrical driving signals Ga, Gb are finally generated.

Figure 8:
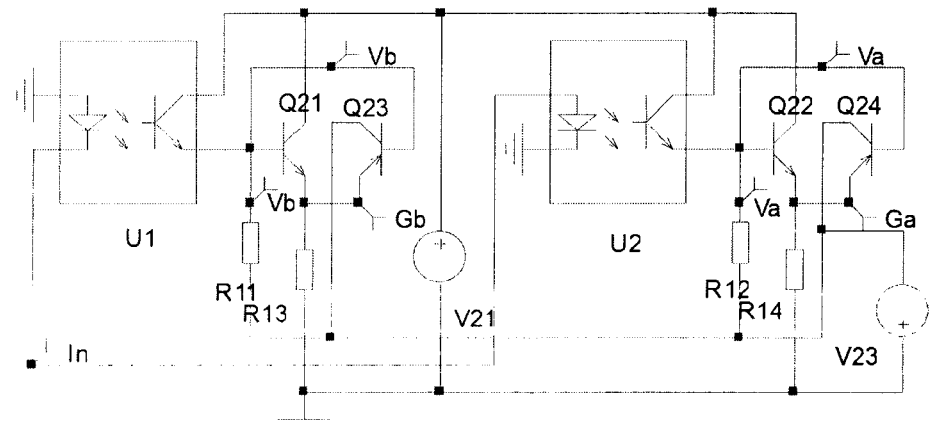
FIG. 8: Signal Converting Circuit SPrs.

The signal conversion circuit SPrs in FIG. 8 is composed of optical couplers U1, U2. The symmetrical square-wave signal Gc is connected from In. During positive half-cycle, Gc generates positive voltage drop Va on the resistor R12 via the optical coupler U2, and the voltage drop is also applied to the base electrodes of Q22, Q24. Because the emitting electrode resistor R14 is connected with the central ground, which is equivalent to the application of positive and negative symmetrical square-wave voltage to Q22, Q24, a positive and negative symmetrical square-wave circuit Ga is formed on the resistor R12. During negative half-cycle, Gc generates positive voltage drop Vb on the resistor R13 via the optical coupler U1, and the voltage drop is also applied to the base electrodes of Q21, Q23. Because the emitting electrode resistor R13 is connected with the central ground, which is equivalent to the application of positive and negative symmetrical square-wave voltage to Q21, Q23, a positive and negative symmetrical square-wave circuit Gb is formed on the resistor R13. The signal voltages Ga, Gb generated in FIG. 6 and FIG. 7 are complementary, positive and negative symmetrical and isolated, the MOS tubes in the invention only adopt the above two types of driving signals, namely high-frequency driving signal and mains supply synchronous driving signal, and the illustration of driving signals will not be repeated below.

Figure 63:
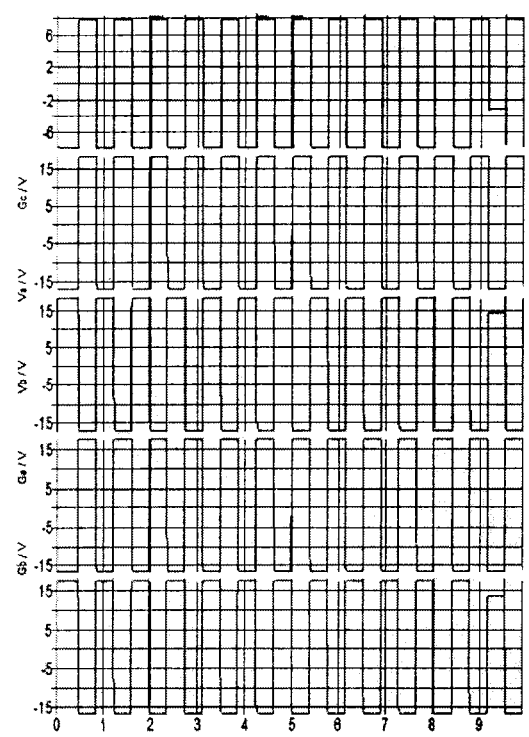
FIG. 63: Output Voltage Simulation Waveform of High-Frequency Driving Signal Generator VDvrh.

FIG. 63 is the simulation waveform of a high-frequency driving signal jointly generated by FIG. 6 and FIG. 8, from top to bottom: the positive and negative symmetrical square-wave voltage Gc generated by 555, the positive and negative symmetrical square-wave signal Va generated on the resistor R12 in relative to the center ground, the positive and negative symmetrical square-wave signal Vb generated on the resistor R11 in relative to the center ground, the positive and negative symmetrical square-wave signal Ga generated on the resistor R14 in relative to the center ground, and the positive and negative symmetrical square-wave signal Gb generated on the resistor R13 in relative to the center ground.

Figure 64:
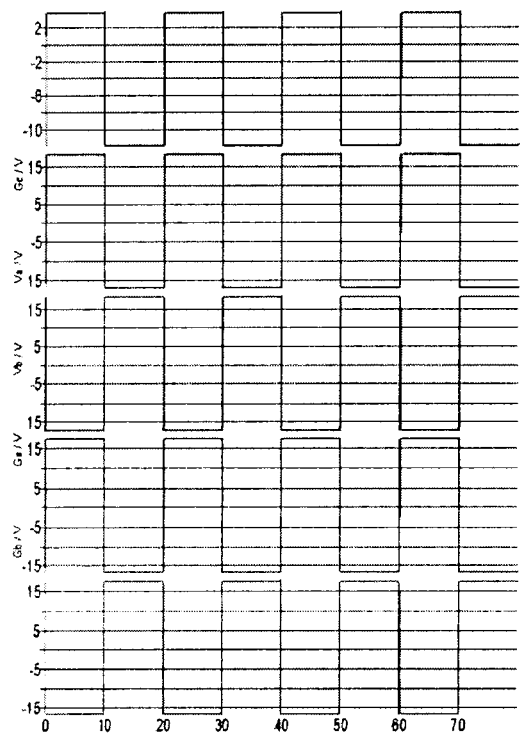
FIG. 64: Output Voltage Simulation Waveform of Synchronous Driving Signal Generator VDvrs.

FIG. 64 is the simulation waveform of a synchronous driving signal jointly generated by FIG. 7 and FIG. 8. The waveform names and meanings are the same as above.

Figure 9:
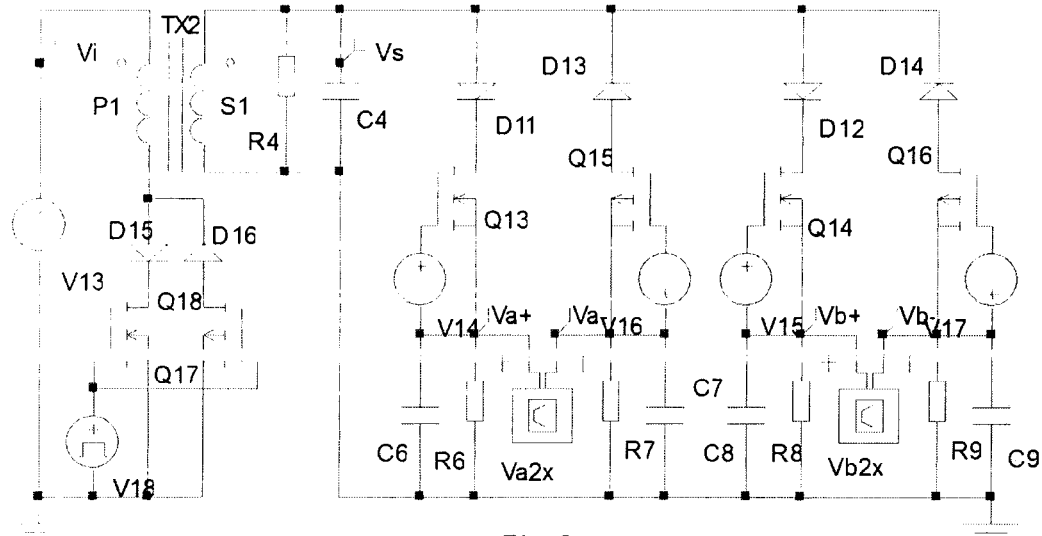
FIG. 9: Dynamic Rectification Circuit (3.1)

FIG. 9 is the dynamic rectification circuit (3.1). The drain electrode of the unit circuit SBP composed of field-effect tubes Q17, Q18 is connected with a transformer, and the dynamic rectification circuit (3.1) is the basic circuit (2.2). The input sine-wave voltage V13 is not rectified and filtered. When the grid electrode is connected with the symmetrical square-wave driving signal V9, a double-sideband square-wave voltage Vs enveloped as sine wave is generated at the secondary side of the transformer TX2. The Vs can be divided into four different parts, namely upper and lower parts for first 10 ms and upper and lower part for last 10 ms. V14-V17 are mains supply synchronous signals with the cycle of 20 ms, wherein V15, V16 delay 10 ms, and V14, V17 delay 0 ms. According to the direction of the diodes D11-D14, the branches of D11, Q13 select the upper part voltage of the first 10 ms, so that a steamed bun wave voltage Va+ only having positive half wave is obtained on the source electrode resistor R6, the branches of D13, Q15 select the lower part voltage of the last 10 ms, so that a steamed bun wave voltage Va− only having negative half cycle is obtained on the source electrode resistor R7, the branches of D14, Q16 select the lower part voltage of the first 10 ms, so that a steamed bun wave voltage Vb− only having negative half cycle is obtained on the source electrode resistor R9, and the branches of D12, Q14 select the upper part voltage of the last 10 ms, so that a steamed bun wave voltage Vb+ only having positive half cycle is obtained on the source electrode resistor R8. When the output voltage is obtained from the source electrodes of Q13, Q15, the output voltage is full-wave rectified steamed bun wave voltage Va2$x$; when the output voltage is obtained from the source electrodes of Q15, Q17, the output voltage is full-wave rectified steamed bun wave voltage Vb2$x$. The waveforms of Va2$x$ and Vb2$a$ are completely identical.

Figure 65:
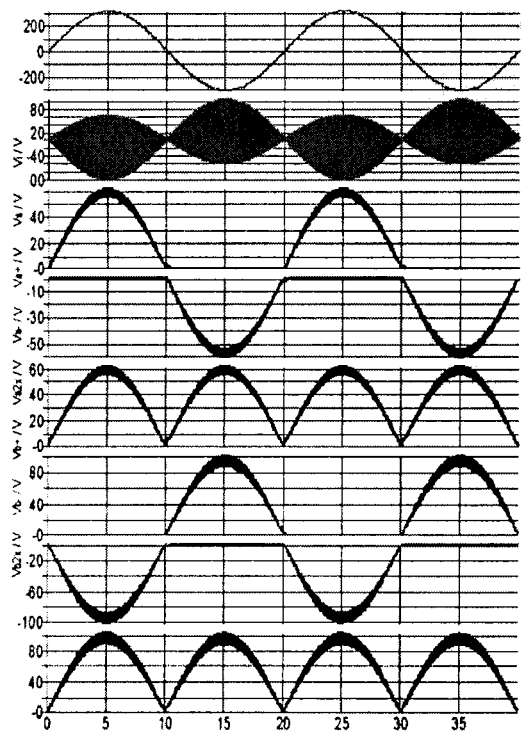
FIG. 65: Output Voltage Simulation Waveform of Dynamic Rectification Circuit (3.1)

FIG. 65 is the simulation waveform of the output voltage, from top to bottom: input current voltage V1, transformer secondary side voltage Vs and rectified steamed bun wave voltages Va+, Va−, Va2$x$, Vb+, Vb−, Vb2$x$. From the simulation waveform in FIG. 65, we can see that although the TX2 secondary side voltage waveform Vs is asymmetrical in relative to the axis X, the voltage waveforms Va+ and Va−, Vb+ and Vb− are symmetrical in relative to the axis X after rectifying and filtering by small capacitors C6, C7, C8, C9, and the amplitudes of Va2$x$ and Vb2$x$ in each 10 ms are also identical. The conclusion about the transformer secondary side double-sideband voltage is sufficiently proved: it seems that the amplitudes of the positive and negative half-cycles have large difference, but the pulse with large amplitude is narrow, the pulse with small amplitude is wide, and the area or average value is identical.

Figure 10:
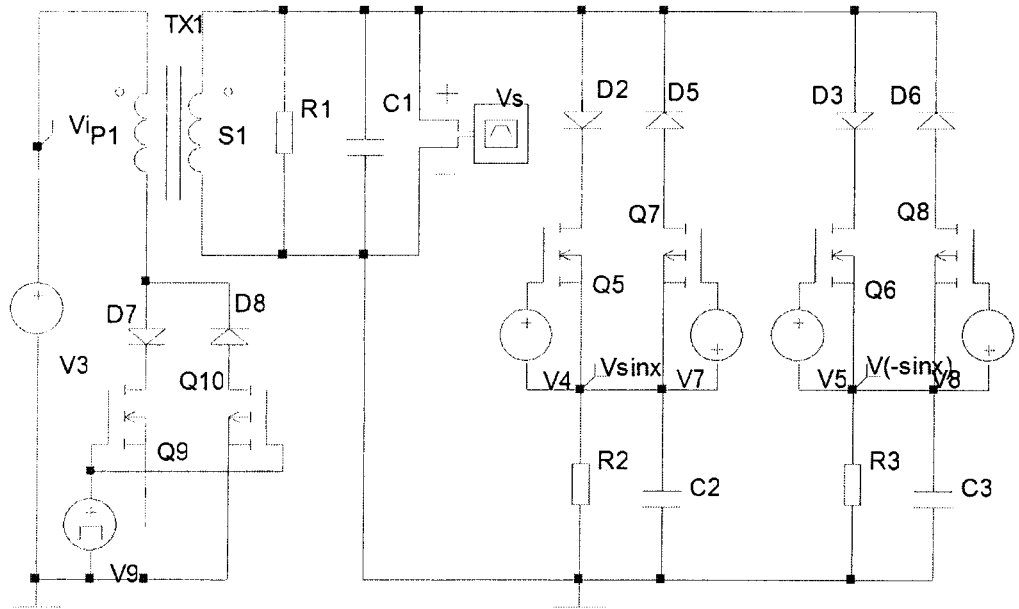
FIG. 10: Dynamic Rectification Circuit (3.2)

FIG. 10 is the dynamic rectification circuit (3.2). The drain electrode of the unit circuit SBP composed of field-effect tubes Q9, Q10 is connected with a transformer, and the dynamic rectification circuit (3.2) is the basic circuit (2.2). The input sine-wave voltage V3 is not rectified and filtered. Under the driving of the high-frequency square-wave signal V9, the double-sideband square-wave voltage Vs enveloped as sine wave is generated at the secondary side of the transformer TX1, which is identical to the above situation. However, because the source electrodes of Q5, Q7 are connected together and the source electrodes of Q6, Q8 are connected together, positive and negative sine-wave voltages Vsinx and (V(−sinx)) are respectively obtained on the common source electrode resistors R2, R3.

Figure 66:
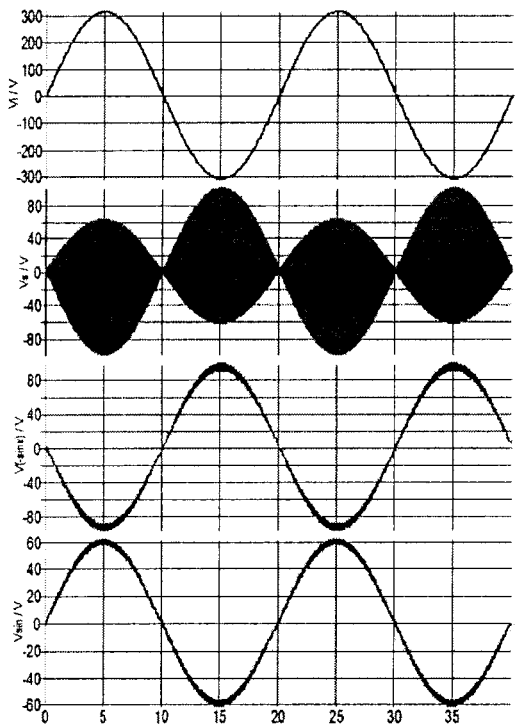
FIG. 66: Output Voltage Simulation Waveform of Dynamic Rectification Circuit (3.2)

FIG. 66 is the output voltage simulation waveform of the dynamic rectification circuit (3.2), from top to bottom: input voltage Vi, the double-sideband voltage Vs enveloped as sine wave at the secondary side, output voltage V(−sinx) on the resistor R3, and voltage Vsinx output form the resistor R2.

Figure 11:
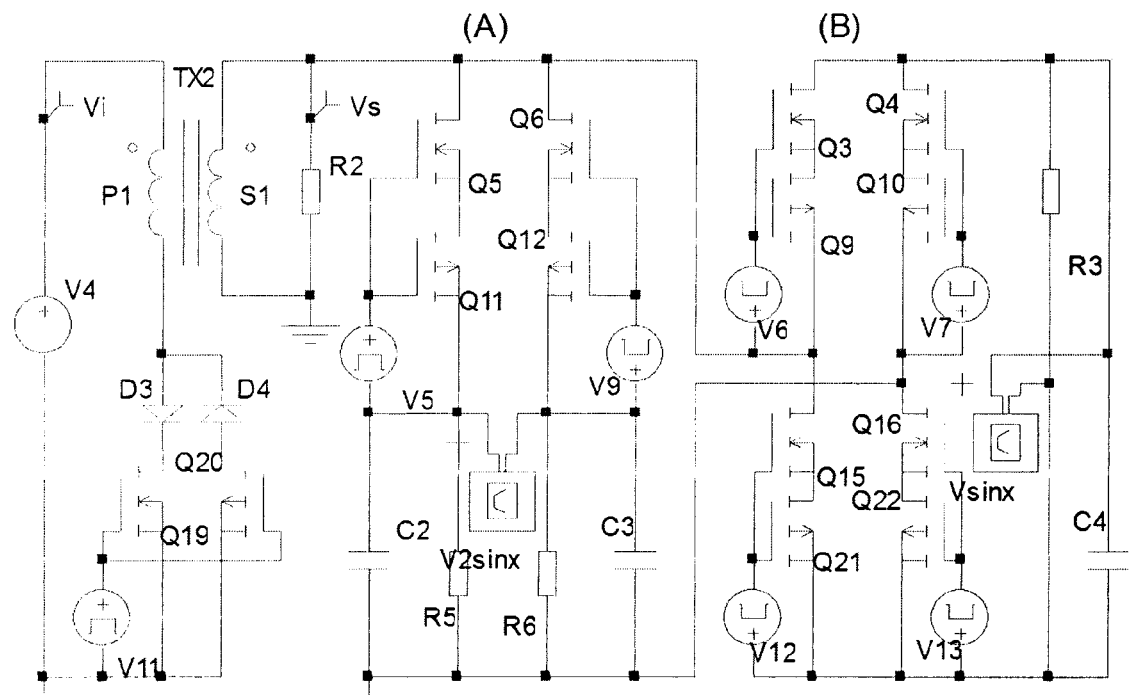
FIG. 11: Dynamic Rectification Circuit (3.2), (3.4)

FIG. 11 (A) is the dynamic rectification circuit (3.3). The drain electrode of the unit circuit (1.2) composed of field-effect tubes Q19, Q20 is connected with the transformer TX2, and the dynamic rectification circuit is the basic circuit (2.2). The input sine-wave voltage Vi is not rectified and filtered, the positive and negative symmetrical square-wave driving signal V11 is applied to the grid electrode, and the double-sideband square-wave voltage Vs enveloped as sine wave is generated at the secondary side of TX2.

Q5, Q11 and Q6, Q12 in FIG. 11 (A) respectively form two unit circuits (1.2). Driving signals V5, V9 are synchronous square-wave driving signals, the cycle is 10 ms, the positive and negative are symmetrical and has opposite phases, Q5, Q6 are drived in positive direction, and Q11, Q12 are drived in negative direction. According to the principle of the unit circuit (1.2), the voltage of the upper part in first 10 ms is obtained in the first unit circuit (1.2), the voltage on the capacitor C2 has positive upper part and negative lower part, the waveform is identical to the envelop of the waveform of the upper part in first 10 ms, the voltage of the lower part in last 10 ms is obtained in the second unit circuit (1.2), the voltage on the capacitor C3 has negative upper part and positive lower part, and the waveform is identical to the envelop of the waveform of the lower part in last 10 ms. The voltage V2sinx output from the source electrodes of Q11, Q12 has amplitude 2 times of Vs and the same frequency and phase to the input voltage V4. We can see that the lower part voltage in first 10 ms of Vs and the upper part voltage in last 10 ms of Vs are not taken out, which are equivalent to half-wave rectified voltage.

FIG. 11 (B) is the dynamic rectification circuit (3.4). Q3, Q9, Q4, Q10, Q15, Q21, Q16, Q22 respectively form four unit circuits (1.2), driving signals V6, V7, V12, V13 are all positive and negative symmetrical square waves with 20 ms cycle and opposite phases. According to the principle of the unit circuit (1.2), we can know that when the negative half-cycle of the driving signal in the first 10 ms comes, Q9, Q10, Q21, Q22 are conducted, diodes within Q3, Q4, Q15, Q16 form a positive rectifying bridge, the rectification result enables the waveform of the double-sideband square-wave voltage Vs in the first 10 ms below the time axis to be turned above the time axis, and the positive steamed bun wave voltage in the first 10 ms is obtained on the loading resistor R3; and when the positive half-cycle of the driving signal in the last 10 ms comes, Q3, Q4, Q15, Q16 are conducted, diodes within Q9, Q10, Q21, Q22 form a negative rectifying bridge, the rectification result enables the waveform of the double-sideband square-wave voltage Vs in the last 10 ms above the time axis to be turned below the time axis, and the negative steamed bun wave voltage in the last 10 ms is obtained on the loading resistor R3. Both the positive and negative steamed bun wave voltages on the resistor R3 form a complete voltage waveform cycle of a sine wave, the amplitude is the same to that of the transformer secondary side voltage Vs, the frequency and the phase are identical to those of the input voltage, all the waveforms above and below the time axis in the first and last 10 ms of Vs reach the load, and the dynamic rectification circuit is equivalent to the full-wave rectification circuit.

Figure 67:
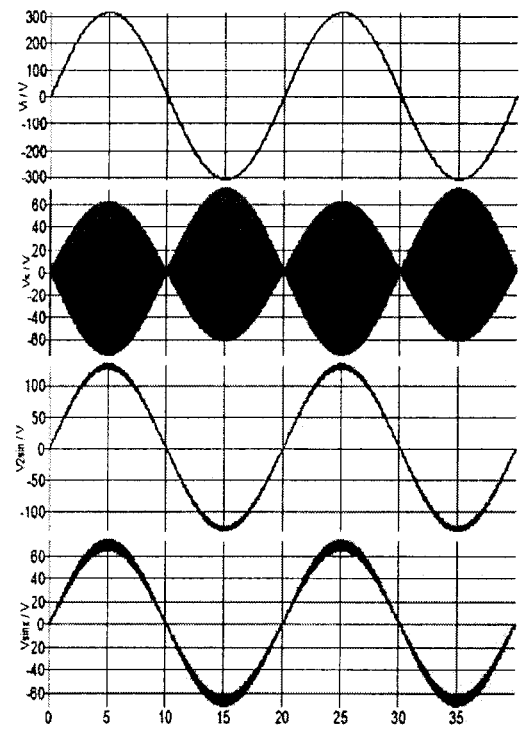
FIG. 67: Output Voltage Simulation Waveform of Dynamic Rectification Circuit (3.2), (3.4)

FIG. 67 is the output voltage simulation waveforms of type C and type D dynamic rectification circuits, from top to bottom: input voltage V4, transformer secondary side voltage Vs, output voltage V2sinx of type C dynamic rectification circuit and output voltage Vsinx of type D dynamic rectification circuit. We can see that the amplitude of V2sinx is 2 times of Vsinx.

Figure 12:
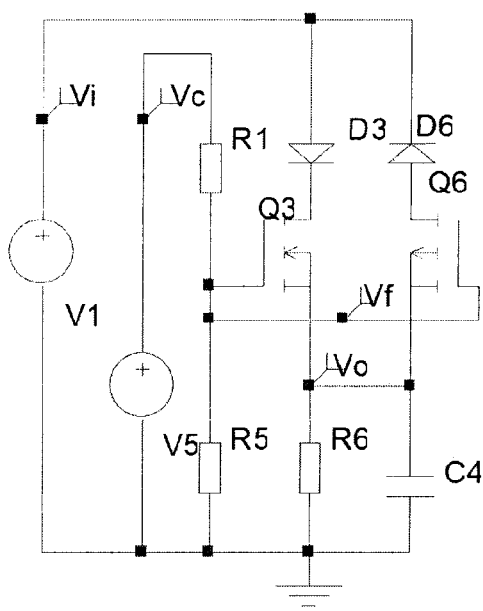
FIG. 12: Schematic Circuit Diagram of Amplitude Height Modulation Circuit (4)

FIG. 12 is the schematic circuit of the amplitude height modulation circuit (4). Q3, Q6 form a unit circuit (1.1), the source electrode is connected with the resistor R6, and the unit circuit is the typical basic unit (2.1). The voltage on the load resistor tracks the grid electrode voltage Vf, Vf is provided by a reference voltage Vc generated in the machine, and Vc is slightly higher than the mains supply Vi to prevent the grid electrode from control failure. When 1) the load R5 varies, 2) the mains supply fluctuates and 3) the temperature varies, the grid electrode voltage Vf will fluctuate, and the output voltage Vo also fluctuates along with Vf. In order to compensate the compensation, the output voltage Vo remains constant, the grid electrode voltage Vf must be properly adjusted, and the gird electrode voltage remains constant to compensate the fluctuations caused by the above three reasons.

In order to keep DC voltage constant, there are many circuits for selection. However, the grid electrode reference voltage Vf here is sine-wave AC voltage. In the matter of the existing circuits, no circuit can stabilize the AC voltage. Indeed, the pulse width modulation PWM technique can stabilize DC and AC voltages, but the operating principle is based on adjusting the pulse width of the high-frequency pulse (the defects have been already mentioned). The main power component of the invention does not undergo traditional power conversion, and no pulse width needs to be adjusted. Therefore, in order to remain the grid electrode Vf constant, only a grid electrode biasing resistor R1 or R5 needs to be properly adjusted.

The amplitude height modulation circuit (4) technique just automatically and properly adjusts the resistance of the biasing resistor R1 or R5, and indirectly adjusts the amplitude of the sine-wave AC reference voltage Vf to keep it constant. The operating principle is as follows:

When the input voltage Vi rises or drops or the load resistor R6 is increased or decreased, the amplitude of the source electrode output voltage Vo rises or drops. When the source electrode output voltage Vo is still between the DC reference voltages V1 and V2 and is shown as the middle waveform in FIG. 6, the amplitude height modulation circuit has no action.

Figure 68:
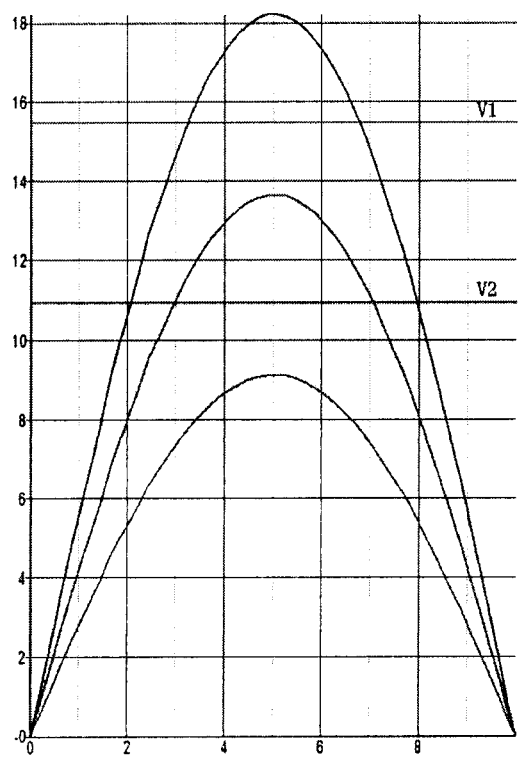
FIG. 68: Schematic Diagram of Amplitude Height Modulation Circuit (4)

When the input voltage Vi rises or the load resistor R6 is increased, the amplitude of the source electrode output voltage Vo rises to be greater than the DC reference voltage V1 and is shown as the topmost waveform in FIG. 68. In order to keep Vo constant, the grid electrode potentials of Q3, Q6 must drop, and the biasing upper resistor R1 needs to be increased at the moment. R1 is constantly increased, and Vo constantly drops. After the amplitude of Vo drops to be smaller than the DC reference voltage V1, R1 is not increased any more, Vo does not drop either and is shown as the middle waveform in FIG. 68, and the amplitude of the output voltage Vo is smaller than V1.

When the input voltage Vi drops or the load resistor R6 is decreased, the amplitude of the source electrode output voltage Vo drops to be smaller than the DC reference voltage V2 and is shown as the bottommost waveform in FIG. 68. In order to keep Vo constant, the grid electrode potentials of Q3, Q6 must rise, and the upper biasing resistor R1 needs to be decreased at the moment. R1 is constantly decreased, and Vo constantly rises. After the amplitude of Vo rises to be greater than the DC reference voltage V2 and is shown as the middle waveform in FIG. 68, R1 is not decreased any more, Vo does not rise either, and the amplitude of the output voltage Vo is held at greater than V2.

The dynamic adjustment has the result that the amplitude of the output voltage Vo only varies between the DC reference voltages V1, V2, and V1, V2 can be manually set in advance, i.e. the amplitude and the voltage-stabilized accuracy of the output voltage Vo can be manually set in advance. Here, the variation of R1 is quantized or digital in stead of continuous. The method is to divide the adjustable part of the resistor R1 into N equal parts, each equal part of R1 is connected with one digital switch in parallel, and the opening of the switches indicates that this equal part of resistor is connected or increased. The closing of the switches indicates that this equal part of resistor is short-circuit or decreased. The opening and closing of the switches are automatically controlled by the digital circuit, and the speed is very quick.

The amplitude height modulation circuit technique adopts the digital circuit to control the micro increment of the adjustable part of the resistor R1 and controls the amplitude of the grid electrode sine-wave dynamic reference voltage Vf of the power devices Q3, Q6 in nature, thus the technique is called as amplitude height modulation. The method has the ingenious part that the reference voltage is DC low voltage, and the control object is AC high voltage. In practical application, N can be taken as 8 or 16, and the realized circuit is relatively simple. If the value of N is too large, the circuit becomes relatively complex. The amplitude height modulation circuit AHM and the pulse width modulation PWM have different approaches but equally satisfactory results and various chips can be integrated. N can be a greater value, the voltage adjustment is more accurate and smoother, and the adjustment is more convenient to apply.

The amplitude height modulation circuit AHM technique automatically and properly adjusts the resistance of the biasing resistors R1 or R2 according to the amplitude of the AC voltage Vo, and the external circuit is very simple. One control object is AC output voltage Vo, and one target object is the resistor R1 or R2. In the actual circuit, the resistance of the object Vo can be controlled by using one label to be equivalent to all circuits in the amplitude height modulation circuit. The labeling method of the equivalent resistor is as follows: AHMn(Vo)No, AHM represents amplitude height modulation circuit, n represents the adjustable resistance range of the target object, (Vo) represents the control object, and No represents the sequence number of the element.

Figure 13:
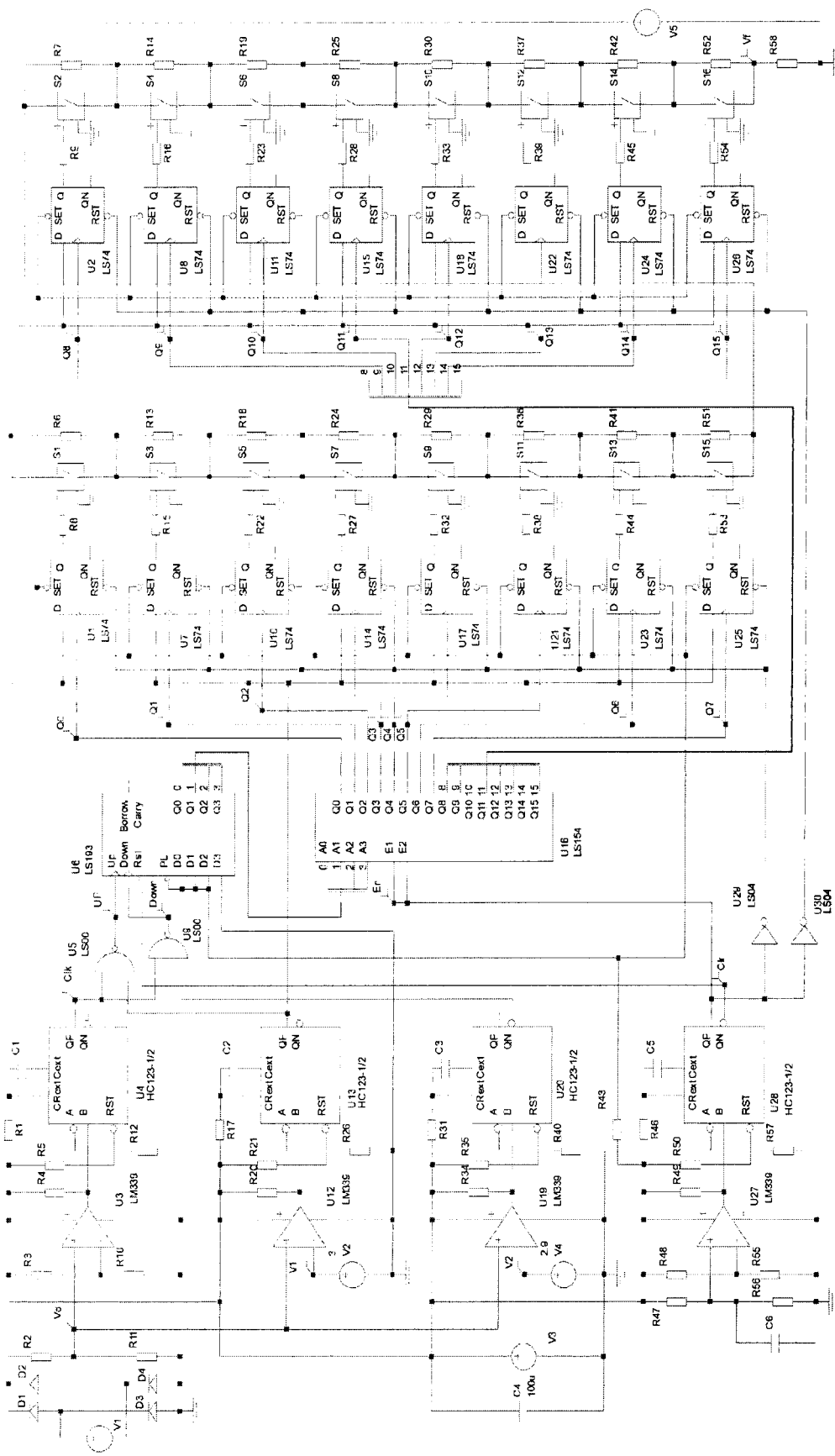
FIG. 13: Actual Circuit Diagram of Amplitude Height Modulation Circuit (4)

FIG. 13 is the actual circuit of the amplitude height modulation circuit. The operating process is as follows: U3, U4 form the synchronous signal generator to generate a clock signal Clk synchronous to the mains supply. U12, U13 form a high voltage detection circuit, setting is performed when the output voltage is greater than V1. U19, U20 form a low voltage detection circuit, and resetting is performed when the output voltage is smaller than V2. U27, U28 form a starting resetting signal generating circuit to output Clr and RST signals.

16 resistors R6, R7, R13, R14, R18, R19, R24, R25, R29, R30, R36, R37, R41, R42, R51, R5 and 16 switches S1-S16 are connected in parallel, 16 type D triggers (74LS74) U1, U7, U10, U14, U17, U21, U23, U25, U2, U8, U11, U15, U18, U22, U24, U26 controls the opening and closing of the switches S1-S16, namely controlling the disconnection and connection of 16 resistors such as R1, etc., and U6 is a four-bit BCD reversible counter. The preset data end bits D0-D2 are connected with a high level via the resistor R47, D3 is grounded, the preset data is 0111, the four-bit counting output ends D0-D3 is connected with the data input ends A0-A3 of the U16 four-bit decoder, and U16 interprets the four-bit BCD codes obtained by U6 counting into 16-bit control signals Q0-Q15. Each bit of control signal is corresponding to one of 16 type D triggers such as U1, etc., each type D trigger controls the connection and disconnection of 16 resistors such as R6, etc., the 16 resistors are the adjustable part of the resistor R1 in FIG. 12, the resistor R58 connected with the 16 resistors such as R6, etc. in series is the resistor R2 in FIG. 16, V5 is the control voltage Vc in FIG. 12, and the DC reference circuits (V1, V2) are respectively 3.0V and 2.9V.

U3 is a comparator LM339, the opposite-phase end is connected with the low level V0 slightly greater than zero, and the same-phase end is connected with the steamed bun wave voltage Vd of the rectified output voltage V0. When the voltage is greater than V0, U2 outputs a high level. When the voltage is below V0, U3 outputs a low level, a square-wave voltage synchronous to the mains supply is obtained at the output end of U3, and the voltage is connected with the input end B of U4; and U4 is a monostable trigger, the input end B is triggered by a high level, C1, R1 decide that the monopulse output by the trigger is 5 ms, and a clock signal (Clk) with 10 ms cycle and 5 ms pulse width is obtained at the output end QP of U4. Refer to the simulation waveform of Clk in FIG. 1013.

U12 is a comparator LM339, the opposite-phase end is connected with the reference voltage V1=3V, and the same-phase end is connected with the steamed bun wave voltage Vd of the rectified output voltage Vo. When the steamed bun wave voltage of the rectified output voltage Vo is greater than V1, U12 outputs a high level. When the voltage is below V1, U12 outputs a low level, a square-wave voltage synchronous to the half cycle of mains supply is obtained at the output end of U12, and the voltage is connected with the input end B of U13; and U13 is a monostable trigger, the input end B is triggered by a high level, C2, R17 decide that the monopulse cycle output by the trigger is slightly greater than 5 ms, and a DC level instead of square-wave voltage is obtained at the output end QP, i.e. the monostable trigger U13 becomes a monostable trigger capable of being repeatedly triggered.

U19 is a comparator LM339, the opposite-phase end is connected with the reference voltage V1=2.9V, and the same-phase end is connected with the steamed bun wave voltage Vd of the rectified output voltage Vo. When the voltage is greater than V2, U19 outputs a high level. When the voltage is below V2, U19 outputs a low level, a square-wave voltage synchronous to the half cycle of mains supply is obtained at the output end of U19, and the voltage is connected with the input end B of U20; and U20 is a monostable trigger, the input end B is triggered by a high level, C3, R31 decide that the monopulse cycle output by the trigger is slightly greater than 5 ms, and a DC level instead of square-wave voltage is obtained at the output end QP of U20, i.e. the monostable trigger U19 becomes a monostable trigger capable of being repeatedly triggered.

U27 is a comparator LM339, the opposite-phase end is connected with half of the voltage V3, and the voltage connected with the same-phase end is slightly greater than the voltage at the opposite-end phase and is also connected with the capacitor C5. When the machine is started and powered up, because the voltage at both ends of the capacitor C5 can not change suddenly, the voltage applied to the same-phase end is 0V, and U27 outputs a low level. When the voltage at both ends of C5 rises to be above the voltage at the opposite-phase end, U27 outputs a high level, starting power-up resetting and clearing signals Clr are obtained at the output end of U27, and the voltage is connected with the input end B of U28; and the U28 is a monostable trigger, the input end B is triggered by a high level, C5, R46 decide that the monopulse cycle output by the trigger is 1 ms, the starting power-up resetting and clearing signals Clr are obtained at the output end QP of U28, and refer to the simulation waveform of Clr in FIG. 23.

The counting results Q0-Q3 of a four-bit BCD code reversible counter U6(74LS193) directly enter into A0-A3 of 4-16 decoders (74LS156)U16. After each determined 4-bit BCD code passes through the decoders and corresponds to one bit determined in the output ends Q0-Q15, the output of the decoder is connected with the clock input ends of 16 type D triggers such as U1, etc., and the type D trigger corresponding to the 4-bit BCD code acts.

Figure 69:
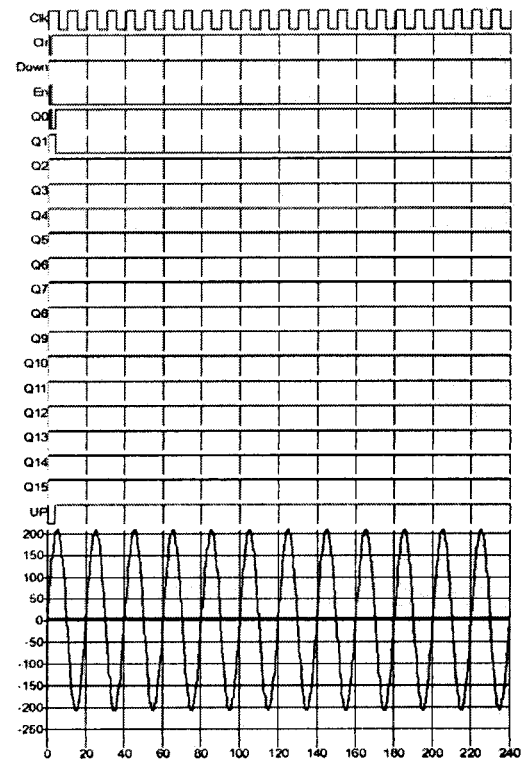
FIG. 69: Output Voltage Simulation Waveform (A) of Amplitude Height Modulation Circuit (4)

During starting, QN of U28 outputs negative pulse of 1 ms so as to reset U6, after resetting the pulse, QP selects U16, 16 type D triggers such as U1, etc. are reset via U29, U30, 16 switches such as S1, etc. are disconnected, 16 resistors such as R6, etc. are connected into the circuit, and the amplitude of the reference voltage Vf is minimum. The output AC voltage V0 is rectified into steamed bun voltage via a bridge composed of D1-D4, the voltage is compared with the DC voltages V1, V2, and there are three conditions:

1. When the voltage amplitude is smaller than the DC voltage V1 and is greater than the DC voltage V2, QP of U13 and QN of U20 both output low levels, the clock signal Clk can not pass through AND gates U5, U9, Up and Down of U6 do not have pulse signals, U16 counting stops. No matter of the data eds, clock ends of 16 type D triggers such as U1, etc, are connected with which levels, the switches S1-S16 do not act, the reference voltage Vf is unchanged, the amplitude of the output voltage Vo is maintained within the allowable range, and the simulation waveform refers to FIG. 69.

Figure 70:
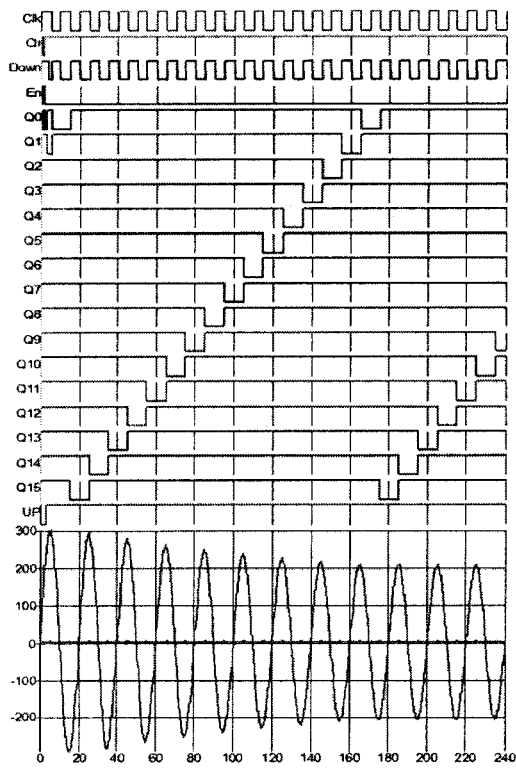
FIG. 70: Output Voltage Simulation Waveform (B) of Amplitude Height Modulation Circuit (4)

2. When the voltage amplitude is greater than the DC voltage V1 and is also greater than the DC voltage V2, QP of U13 outputs a high level, QN of U20 outputs a low level, the clock signal can not pass through U5 but can pass U9 to enter into the input end Down of U6, thus U6 starts subtracting one, and U6 stops counting until the amplitude of the output voltage Vo is smaller than V1. Because QP of U20 outputs a high level and the phase is reversed by a triode Q1, the data ends D of first 16 type D triggers of U1 are connected with a low level. If a pulse comes to the clock end of a certain type D trigger, the output end Q outputs a low level, the low level enables the connected switch to be disconnected and a resistor connected with the switch in parallel to be connected into the circuit, the reference voltage Vf drops, and the output voltage Vo also drops. As long as the amplitude of the steamed bun wave voltage Vd of the output voltage Vo is greater than the DC voltage V1(3.0V), U6 constantly subtracts one, the counting result is decoded by LS154 and is finally always corresponding to one type D trigger, so that the switch connected with the trigger is disconnected, the corresponding resistor is connected into the circuit, the result is that the reference voltage Vf constantly drops, the output voltage Vo also constantly drops along with the reference voltage Vf, and the simulation waveform refers to FIG. 70.

Figure 71:
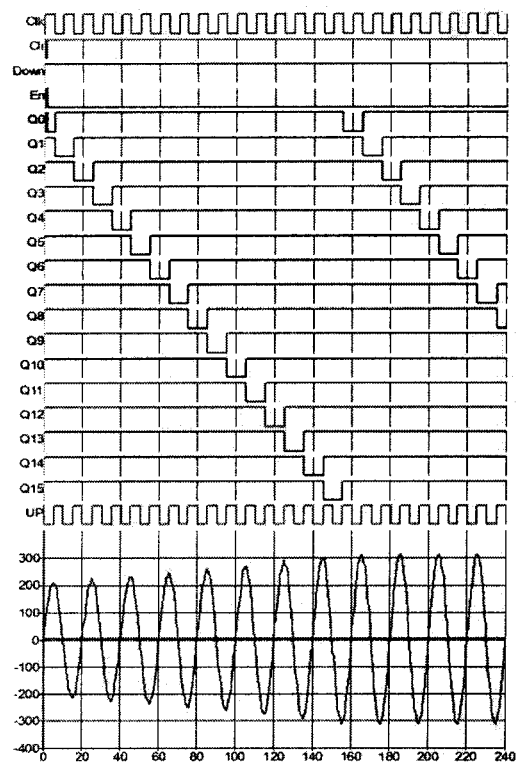
FIG. 71: Output Voltage Simulation Waveform (C) of Amplitude Height Modulation Circuit (4)

3. When the amplitude of the voltage is smaller than the DC voltage V1 and is also smaller than the DC voltage V2, QP of U13 outputs a low level, QN of U20 outputs a high level, the clock signal can not pass through U9 but can pass through U5 to enter into the input end Up of U6, thus U6 starts adding one, and U6 stops counting until the amplitude of the output voltage Vo is greater than V2. Because QP of U20 outputs a low level and the phase is reversed by a triode Q1, the data ends D of first 16 type D triggers such as U1, etc., are connected with a high level. If a pulse comes to the clock end of a certain type D trigger, the output end Q outputs a high level, the high level enables the connected switch to be connected and a resistor connected with the switch in parallel to be short-circuit, the reference voltage Vf rises, and the output voltage Vo also rises. As long as the amplitude of the steamed bun wave voltage Vd of the output voltage Vo is smaller than the DC voltage V2, U6 constantly adds one, the counting result is decoded by LS154 and is finally always corresponding to one type D trigger, so that the switch connected with the trigger is connected, the resistor is short-circuit, the result is that the reference voltage Vf constantly rises, the output voltage Vo also constantly rises along with the reference voltage Vf, and the simulation waveform refers to FIG. 71.

Figure 14:
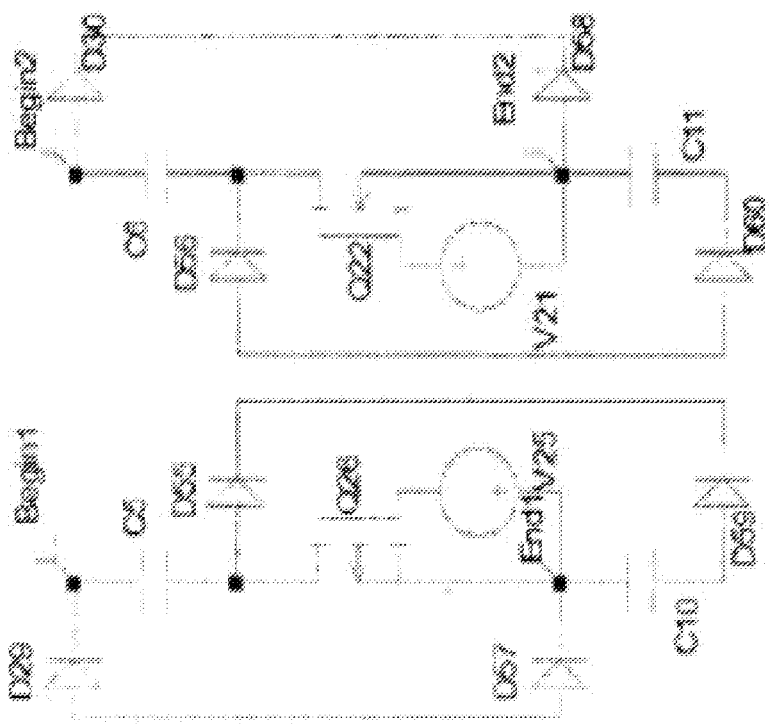
FIG. 14: One-stage Step-Up Capacitor Network(UPnet.
Figure 15:
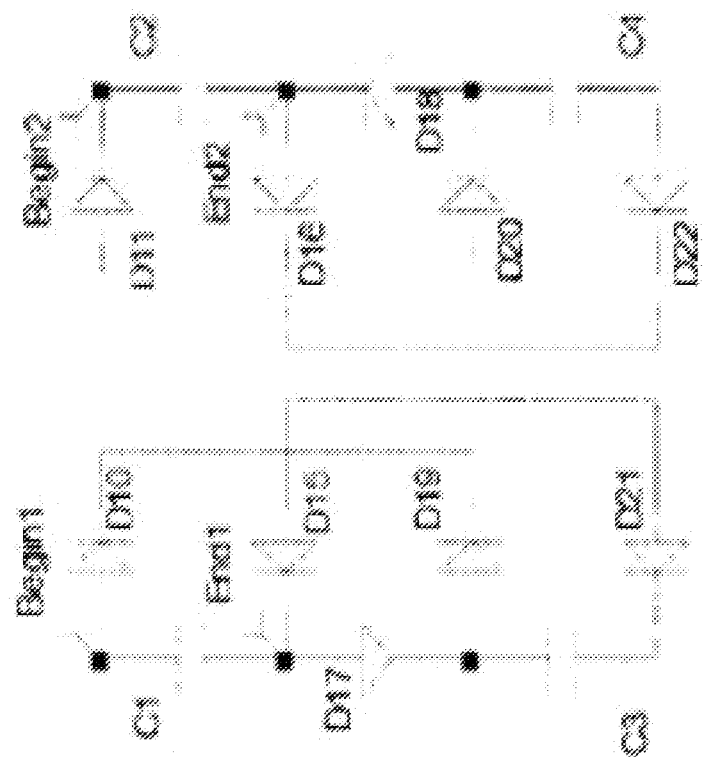
FIG. 15: One-stage Step-Down Capacitor Network DNnet.

The step-up capacitor network UPnet comprises N stages of capacitor networks. In FIG. 14, from Begin to End is the one-stage circuit diagram of the network, each stage comprises a left arm and a right arm, and the circuit is completely symmetrical; the step-down capacitor network DNnet comprises N stages of capacitor networks. In FIG. 15, from Begin to End is the one-stage circuit diagram of the network, each stage comprises a left arm and a right arm, and the circuit is completely symmetrical.

DESCRIPTION OF THE PREFERRED EMBODIMENTS

Embodiment 1

AC Inverter Power Source

Figure 16:
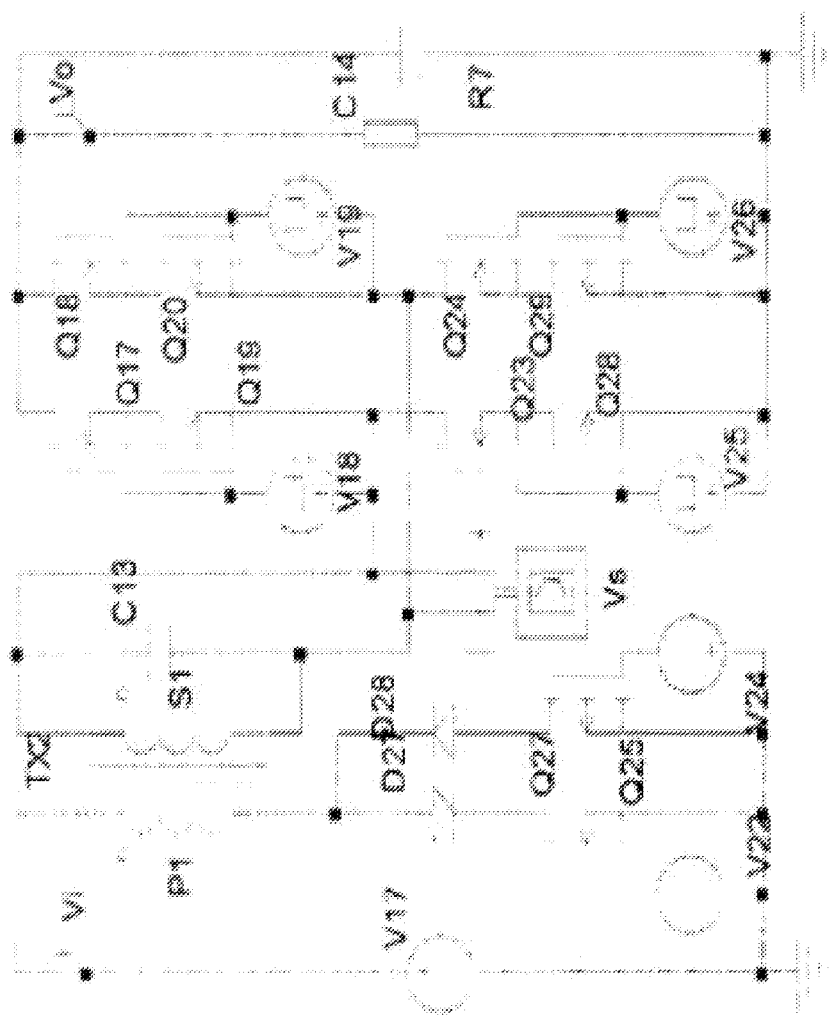
FIG. 16: Embodiment 1: AC Inverter Power Source.
Figure 72:
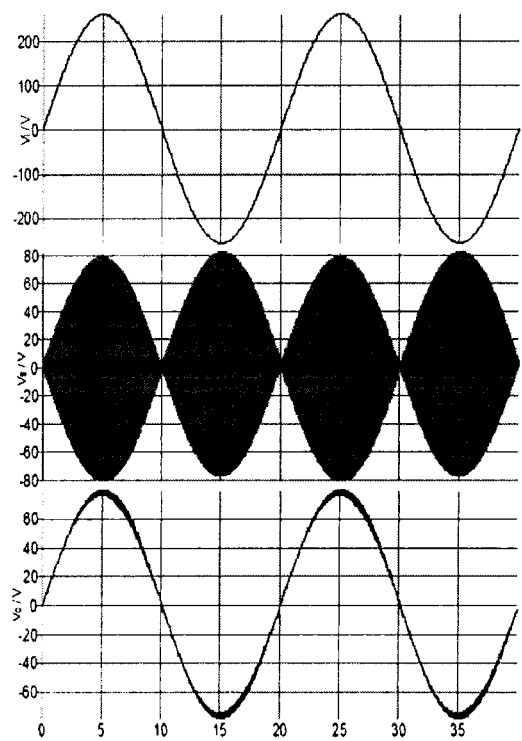
FIG. 72: Output Voltage Simulation Waveform of AC Inverter Power Source.

FIG. 16 is an AC inverter power source, the MOS tubes Q25, Q27 and the like form a type A unit circuit SBPA, the common drain electrodes are connected with the transformer TX2 to form a basic circuit (2.2), the transformer secondary side is a dynamic rectification circuit (3.4) composed of Q17, Q18, Q19, Q20, Q23, Q24, Q28, Q29, C2 is a capacitor with smooth action, V17 is a mains supply, V18, V19, V25, V26 are positive and negative symmetrical VDvrs type synchronous driving signals, and V22, V24 are VDvrh type high-frequency driving signals. Assuming that the amplitude of the input voltage V17 is 280V, the transformation ratio of the transformer TX1 is 1:0.3, the load resistor R7 is 50 Ohm, and the AC voltage V0 with 80V output amplitude is obtained on the resistor R7. In the simulation waveform of FIG. 72, the components are successively as follows: input voltage Vi, double-sideband square-wave voltage Vs enveloped as sine wave at transformer secondary side and output voltage Vo. We can see that the output voltage has the same frequency and phase to the input voltage and is an envelop of the double-sideband voltage waveform at the transformer secondary side, the pulse width, namely duty ratio, of the driving signals V22, V24 is changed, and the output AC voltage Vo can be automatically adjusted.

Embodiment 2

DC Inverter Power Source

Figure 17:
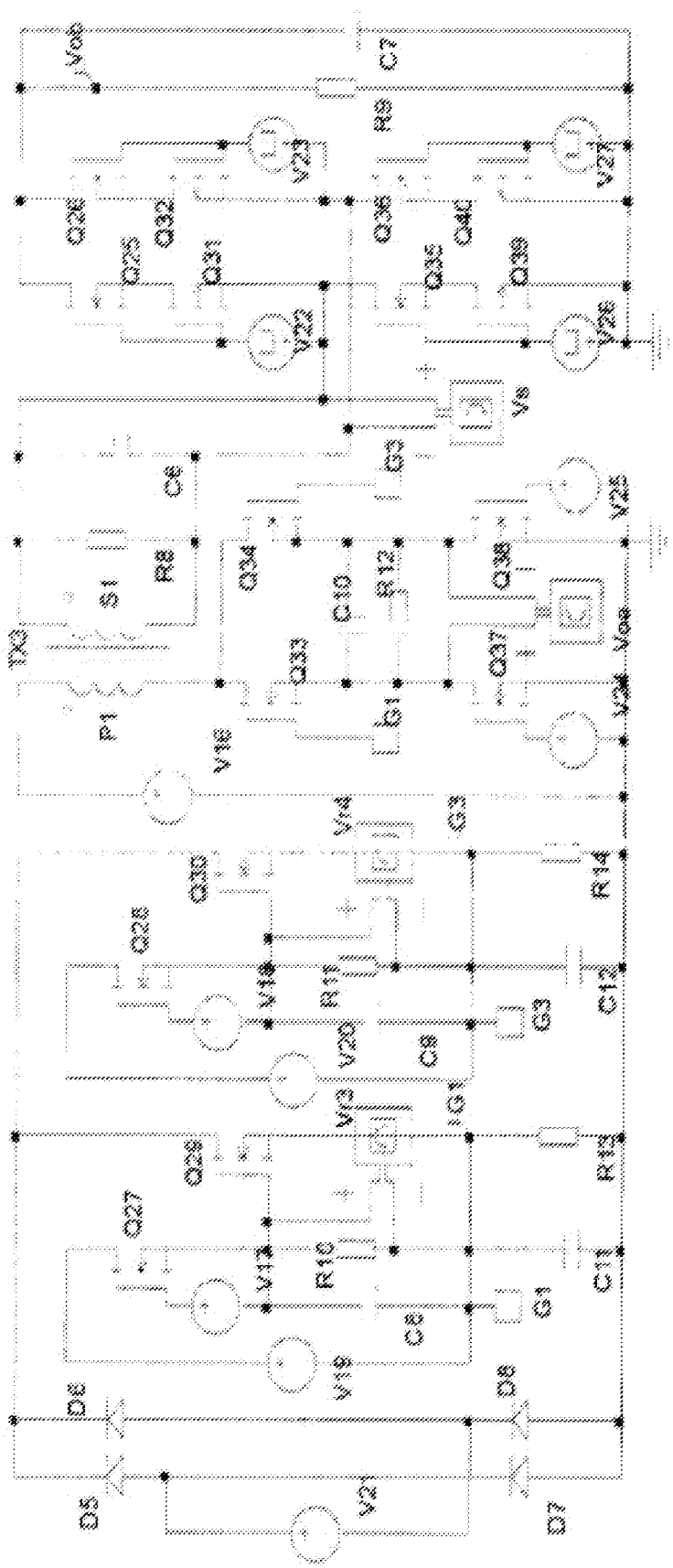
FIG. 17: Embodiment 2: DC Inverter Power Source.

FIG. 17 is a DC inverter power source, and MOS tubes Q33, Q34, Q37, Q38 form a main circuit. Because the input voltage is DC, the polarities of the MOS tubes forming the unit circuit are the same, and meanwhile, the diodes connected with the MOS tubes are omitted. The external voltage V16 is a 311V DC voltage, the driving signals V24, V25 are square-wave signals of 50 Hz, V25 delays 10 ms, the driving signals G1, G3 are high-frequency square-wave signals generated by Q29, Q30 and enveloped as sine-wave steamed bun wave, and G3 delays 10 ms. During the first 10 ms period, Q33, Q38 are conducted, the DC voltage flows across the TX3 primary side winding, Q33, R12, Q38 to form a loop, a sine-wave forward steamed bun wave high-frequency square-wave voltage identical to the G1 envelop is generated on R12, and a double-sideband sine-wave steamed bun wave high-frequency square-wave voltage is generated on the secondary side of TX3. During the last 10 ms period, Q34, Q37 are conducted, the DC voltage flows across the TX3 primary side winding, Q34, R12, Q37 to form a loop, a sine-wave negative steamed bun wave high-frequency square-wave voltage identical to the G3 envelop is generated on R12, and a double-sideband sine-wave steamed bun wave high-frequency square-wave voltage in the last 10 ms is generated on the secondary side of TX3. After 20 ms, a complete high-frequency square-wave voltage Voa enveloped as sine wave is formed on the resistor R12, and a complete double-sideband sine-wave high-frequency square-wave voltage Vs is formed at the TX3 secondary side. After the voltage Vs flows across the type D dynamic rectification circuit composed of Q25, Q26, Q31, Q32, Q35, Q36, Q39, Q40, a sine-wave output voltage Vob is generated, the transformation ratio of TX3 and the pulse width of G1, G3 can be controlled, and the amplitude of Vob can be adjusted.

Generation of G1, G3: the source electrodes of Q27, Q28 are respectively connected with the resistors R10, R11, the grid and source electrodes are connected with the high-frequency square-wave driving signals V17, V18, the drain electrodes are respectively connected with the square-wave signals V19, V20 with 20 ms cycle and 50% duty ratio, V20 delays 10 ms, and the high-frequency square-wave signals Vr3, Vr4 with 20 ms envelop cycle and 50% duty ratio are obtained on the resistors R10, R11, wherein Vr4 falls 10 ms behind Vr3. After the sine-wave signals with 50 Hz and 322V amplitude generated in the machine passes through the full bridge composed of D1-D4, steamed bun wave signals are generated and applied to the drain electrodes of Q29, Q30, the source electrodes are respectively grounded via the resistors R13, R14, the grid and source electrodes are respectively connected with driving signals Vr3, Vr4 on R10, R11, and half steamed bun wave signals G1, G3 having 320V amplitude and enveloped as sine wave are respectively obtained on the source electrode resistors R13, R14.

Figure 73:
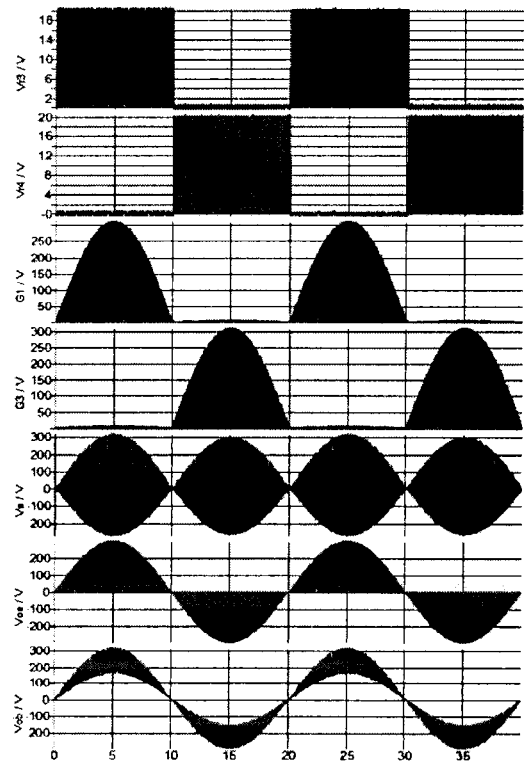
FIG. 73: Output Voltage Simulation Waveform of DC Inverter Power Source.

FIG. 73 is the simulation wave of voltage at each point, from top to bottom: driving signals Vr3, Vr4, driving signals G1, G3, TX3 secondary side double-sideband voltage Vs, sine-wave voltage Voa output from R12, and sine-wave voltage Vob generated by dynamic rectification DR.

Assuming that the cut sine wave is ASinx, the expression of the rest part after cutting is S=A−ASinx, S is the result of reversing and translating the sine function ASinx and is still sine function, the double-sideband square-wave voltage is obtained at the transformer TX3 secondary side, and the envelop is still sine wave.

Q33, Q34 form a main cutting circuit, and Q37, Q38 guide the current to reverse and act as diodes connected with the MOS tube when an AC is input. The output voltage Voa on R12 closely follows the grid electrode voltages G1, G3, the amplitude is lower than one Vgs, after filtering by a capacitor C10, and the waveform is not square-wave voltage any more and is the same sine-wave voltage to the envelop of the grid electrode signals G1, G3.

The cutting circuit composed of Q33, Q34 cuts off the sine-wave voltage Voa from the DC voltage applied to the drain electrode, the area is 64% of the input voltage, the cut rest part occupies 36% of the input voltage area, and the part of voltage undergoes traditional power conversion in TX3 to generate the sine-wave voltage Vob. Voa is the cut source electrode voltage, the conversion efficiency is 100%, Vob is the output voltage after traditional power conversion by TX3, and the conversion efficiency is 85%. Assuming that the power consumption of this part is P1, P1=36%*(1-85%)=5.4%, then the useful work namely main efficiency is 94.56%.

Embodiment 3

AC Voltage-Stabilized Power Source

Figure 18:
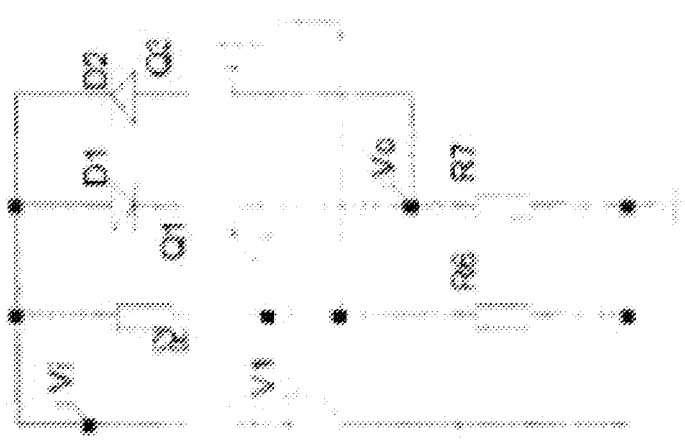
FIG. 18: Embodiment 3: Schematic Circuit of AC Voltage-Stabilized Power Source.
Figure 74:
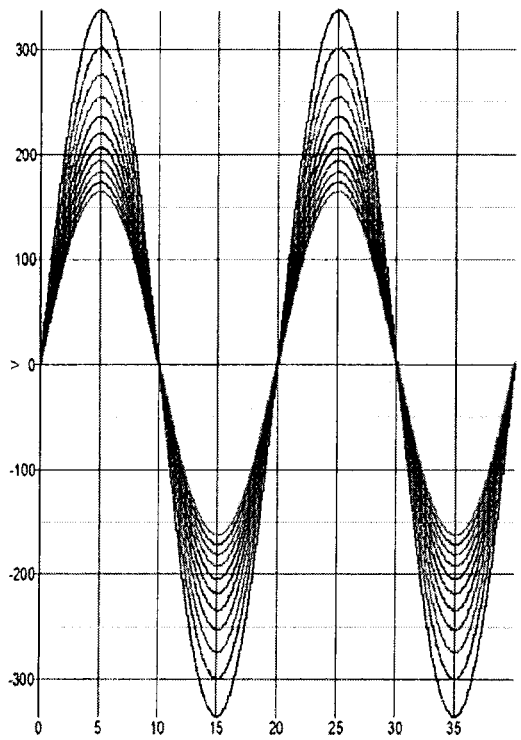
FIG. 74: Output Voltage Simulation Waveform of AC Voltage-Stabilized Power Source.

FIG. 18 is the schematic circuit of the AC voltage-stabilized power source, power devices Q1, Q3 form a type A unit circuit SBPA, the resistor R7 is connected with the common source electrodes to form a unit circuit (2.1), the amplitude height modulation equivalent resistor AHM20 k(Vo)1 and the resistor R6 are biasing circuits of grid electrodes of Q1, Q3, and the input voltage Vi is sine wave with 360V amplitude. The output voltage Vo tracks the grid electrode voltages of Q1, Q3. When the upper biasing resistor varies between 10 k and 100 k, the output voltage V0 varies between 300V and 170V, i.e. the AC output voltage is adjustable, and FIG. 74 is the simulation waveform of the output voltage. When the load resistor R7, the input voltage Vi or the temperature T varies, the output voltage Vo correspondingly varies, the amplitude height modulation circuit (4) is started at the moment, and the result of closed-loop control enables the output voltage to remain constant. The amplitude height modulation equivalent resistor AHM120 k(Vo)1 has the labeling meaning: the adjustable resistance range of the upper biasing resistor AHM1 is 20 k, and the control object is the output voltage Vo.

Assuming that the input voltage is 250V, the output voltage of the source electrode is 220V, the output current is 20 A, the AC voltage of 30V is applied to the drain and source electrodes of Q1, Q3, the power consumption is 600 W, and the efficiency of the complete machine is 88%. In order to not waste 30V AC voltage at the drain and source electrodes of Q1, Q3 due to heating, the drain electrode of the unit circuit composed of Q1, Q3 is connected with the transformer TX1, and this part of power (12%) undergoes traditional power conversion and is output in parallel to the output voltage Vo, as shown in FIG. 19.

Figure 19:
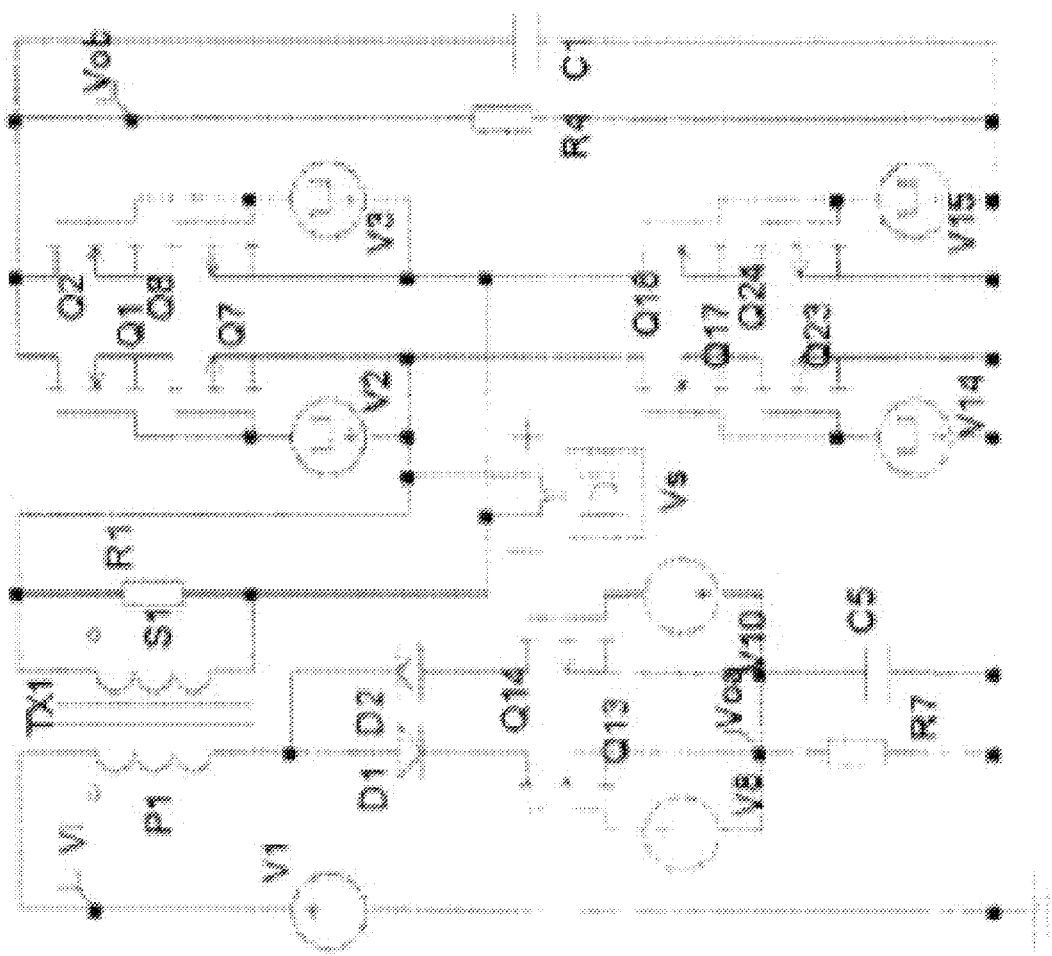
FIG. 19: Embodiment 3: AC Inverter Circuit of AC Voltage-Stabilized Power Source.
Figure 75:
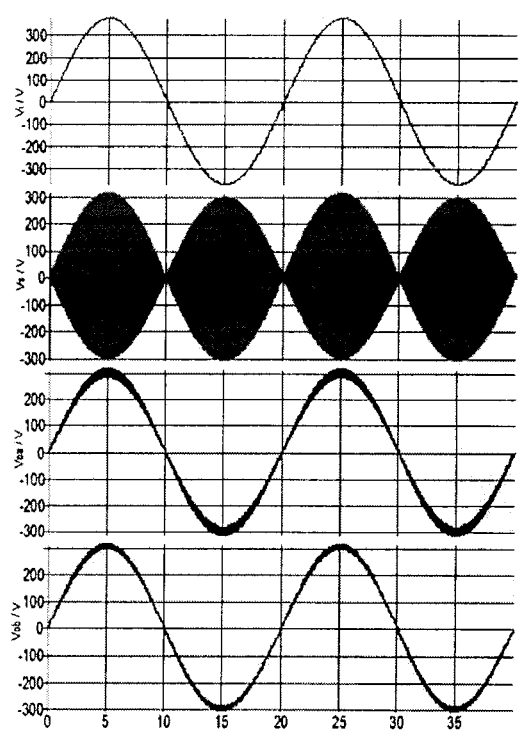
FIG. 75: Output Voltage Simulation Waveform of AC Inverter (Voltage Cutting) Power Source.

In FIG. 19, the common drain electrode of the unit circuit (1.1) composed of Q13, Q14 is connected with the transformer TX1 and evolutes into a basic circuit (2.3). VDvrh type high-frequency driving signals V8, V10 are applied to the grid electrodes of two power devices Q13, Q14, the external voltage V1 is 250V, the source electrode output voltage Voa is 220V, and the sum of drain and source voltage drop at the transformer primary side winding and Q13, Q14 is 30V. Because Q13, Q14 work near the saturation region, the drain and source voltage drop is small, 30V voltage is basically applied to the primary side of the transformer, the transformation ratio of TX1 is 11, a double-sideband square-wave voltage having amplitude near 311V and enveloped as sine wave is generated at the secondary side of TX1, and the voltage passes through the dynamic rectification circuit (3.4) to obtain the sine-wave voltage Vob. FIG. 75 is the simulation waveform of the output voltage, from top to bottom: input voltage Vi, transformer secondary side double-sideband square-wave voltage Vs, source electrode output voltage Voa and transformer secondary side output voltage Vob. From the simulation waveform, we can see that the output voltages Voa, Vob have the same frequency and phase to the input voltage Vi.

Because the output voltage and the input voltage are connected in series and the input current and the output current are identical, when the efficiency is calculated, the power can be replaced by voltage, the input voltage is 250V, wherein 220V is output by the source electrode, and the rest part 30V undergoes traditional power conversion. The conversion efficiency is 85%, this part of output voltage is 30*85%=25.5V, thus the actual output is 220+25.5=245.5V, the efficiency is equal to the output power divided by the input power, and thus the overall efficiency of AC voltage stabilizer in FIG. 19 is 245.5/2598.2%. A major part of the input power (88) is output by the source electrode and directly reaches the output end without passing through the magnetic core transformer, the conversion efficiency of this part of power is 100%, only a tiny part of power (12%) needs traditional power conversion, and the power is transmitted via the magnetic core transformer. In the circuit in FIG. 19, the basic circuit (2.3) composed of Q13, Q14 looks like a knife to cut the input sine-wave voltage Vi into two parts, one part is output AC voltage Voa, the other part is transformer primary side voltage Vp, and thus the circuit in FIG. 19 is a voltage cutting circuit.

Not only is the output voltage Voa ensured to be constant sine-wave voltage, but also the operating efficiency of the transformer TX1 is ensured. The grid electrode driving signal applied to Q1, Q2 must be enveloped as a sine-wave square-wave voltage, the amplitude shall be slightly higher than the output voltage, and the frequency shall be corresponding to the operating frequency of the transformer. In addition, when the input voltage is below 220V, voltage compensation must be carried out to reach the rated output voltage value.

Figure 20:
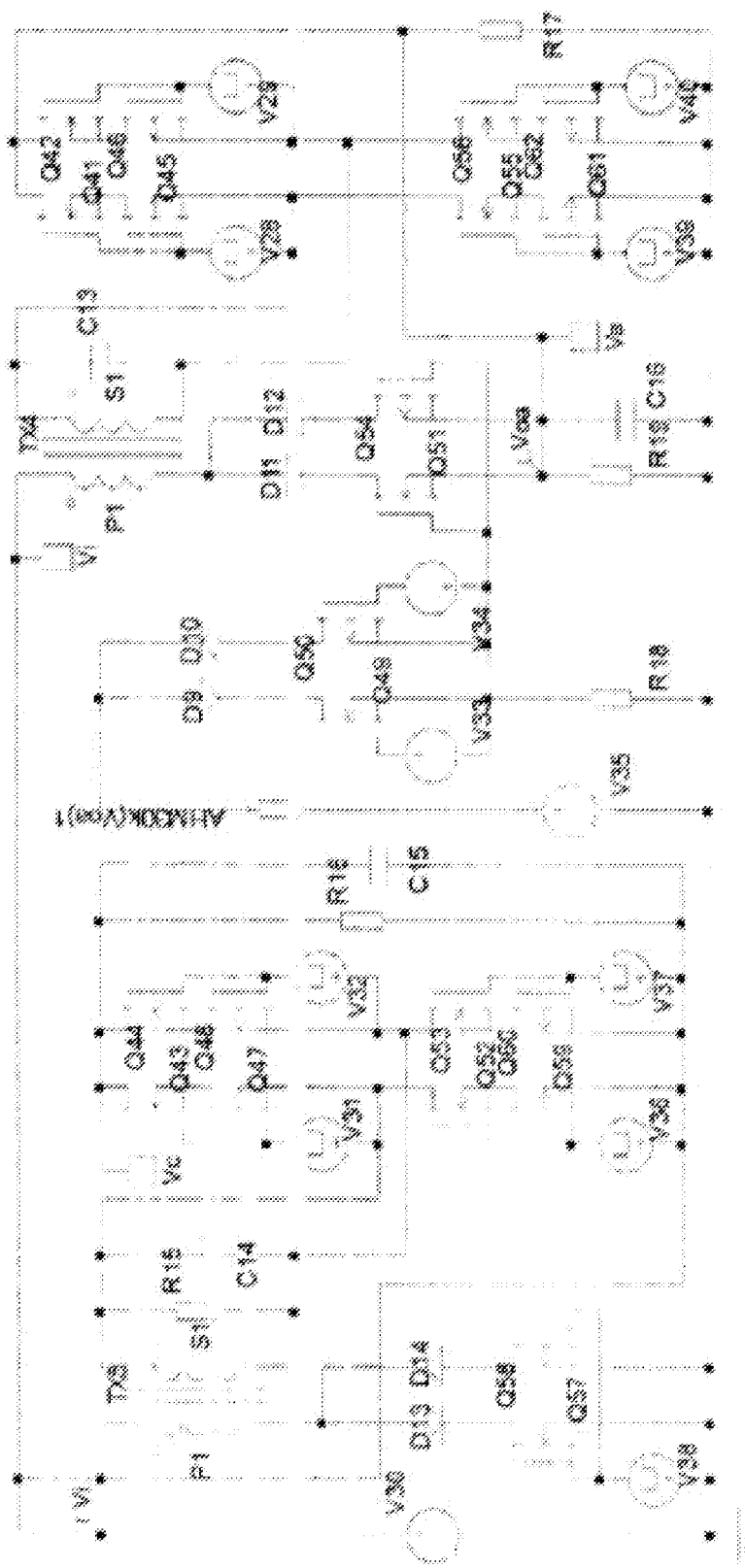
FIG. 20: Embodiment 3: Main Circuit of AC Voltage-Stabilized Power Source.

FIG. 20 is the main circuit of the AC voltage stabilizer, and the basic circuit (2.2) composed of Q57, Q58 plus the secondary side circuit of the transformer is an AC inverter power source and is identical to the circuit in FIG. 16. The output voltage of the inverter is connected with the input voltage Vi in series, i.e. the AC voltage Vr16 output from the resistor R16 is connected with the input AC voltage Vi in series, the lower end of R16 is connected with the fire wire of the input voltage Vi, the other end of R2 is connected with the output end point Vc, the pulse width namely duty ratio of the driving signal V38 is changed, and the output voltage Vc is automatically adjusted.

The VDvrh type driving signal is applied to the grid electrode of the basic circuit (2.1) composed of Q49, Q50. When the AC power source V35 is externally applied, a square-wave signal enveloped as sine wave is output from the source electrode resistor R18, the amplitude of the envelop is one Vgs below the grid electrode voltage, and the frequency is identical to the frequency of the VDvrh type driving signal applied to the grid electrode. An AC voltage stabilizer which is completely identical to the circuit in FIG. 19 is formed from the basic circuit (2.3) composed of Q51, Q54 and the secondary side circuit of the transformer thereof. When the square-wave signal output by the resistor R18 and enveloped as sine wave is applied to the grid electrodes of Q51, Q54, the output voltage Voa of the source electrode can be ensured to be the sine-wave voltage with rated amplitude, the operating frequency of the transformer TX4 can also be ensured, and the output voltage Vob at the transformer TX4 secondary side and the source electrode output voltage Voa are output in parallel at the end point Va. The amplitude height modulation equivalent resistor AHM30 k(Voa)1 and the resistor R18 are connected in series. When AHM30 k(Voa)1 is increased, the amplitude of the square-wave signal output from R18 and enveloped as sine wave is decreased, vice versa, and the amplitude of the output voltage Voa is indirectly controlled.

The operating process of the AC voltage-stabilized power source in FIG. 20 is as follows: when the input voltage V1 is in the normal range, the compensating circuit and the cutting circuit are not started, and the output voltage is the input voltage Vi; when the input voltage is too high, the cutting circuit is started, the compensating circuit is not started, and the output voltage is Va; when the input voltage is too low, the cutting circuit is not started, the compensating circuit is started, and the output voltage is Vc; and the connection and disconnection of the voltages Vi, Va, Vc are controlled by the dedicated switches(refer to uninterrupted power source UPS).

Embodiment 4

DC Voltage-Stabilized Power Source

Figure 21:
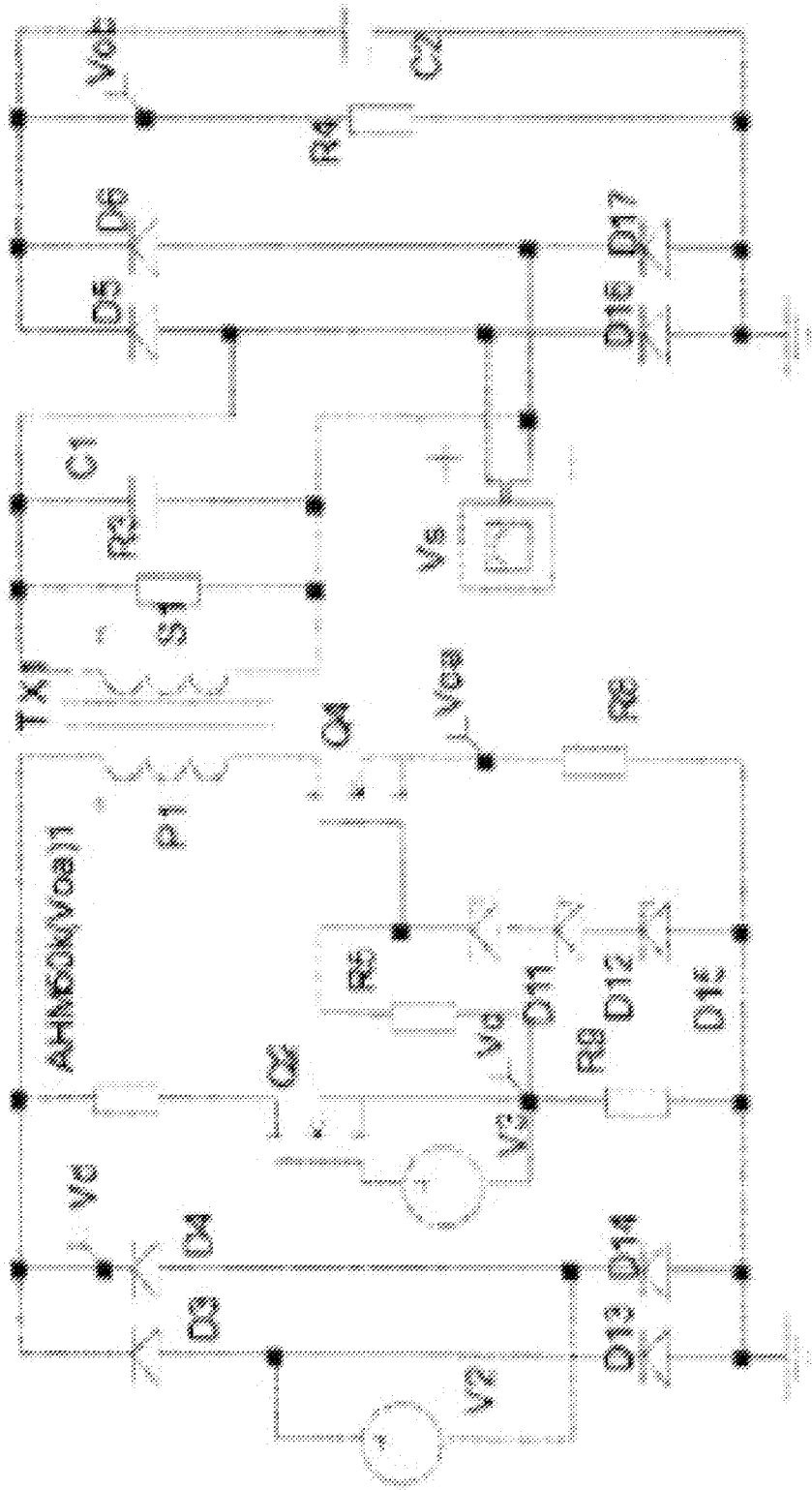
FIG. 21: Embodiment 4: DC Voltage-Stabilized Power Source.

FIG. 21 is the schematic circuit of the DC voltage-stabilized power source, the input voltage V2 passes through the rectifying bridge composed of D3, D4, D13 and D14 to generate a steamed bun wave voltage Vd. The voltage is applied to the drain electrode of the MOS tube Q2 via the resistor R1, the source electrode of Q2 is grounded via the resistor R9, the grid electrode is connected with the square-wave driving signal V3, the source electrode generates a square-wave signal Vc enveloped as steamed bun wave, and Vc passes through a voltage-stabilized tube heap clipping wave composed of D11, D12 and D15 to become a flat-roof steamed bun wave cutting signal to be applied to the grid electrode of the MOS tube Q4. The circuit composed of Q4, the transformer TX1 and the resistor R8 is a basic circuit (2.3), that is half of the cutting circuit, and a flat-roof steamed bun wave voltage identical to the cutting signal is obtained at the source electrode resistor R8 of Q4. After the double-sideband square-wave voltage generated by the secondary side circuit of TX1 passes through the full-bridge rectification, the DC voltage Vob is obtained, the amplitudes of Voa, Vob are identical, and two DC voltages are output in parallel.

The adjustable resistance of the amplitude height modulation equivalent resistor AHM50 k Voa1 is 50 k, and the adjustment object is the output AC voltage Voa. The adjustment of the output voltage Vob has two approaches: one approach is the transformation ratio of TX1, namely rough adjustment, and the other approach is the pulse width of the cutting square wave, namely fine adjustment.

Figure 78:
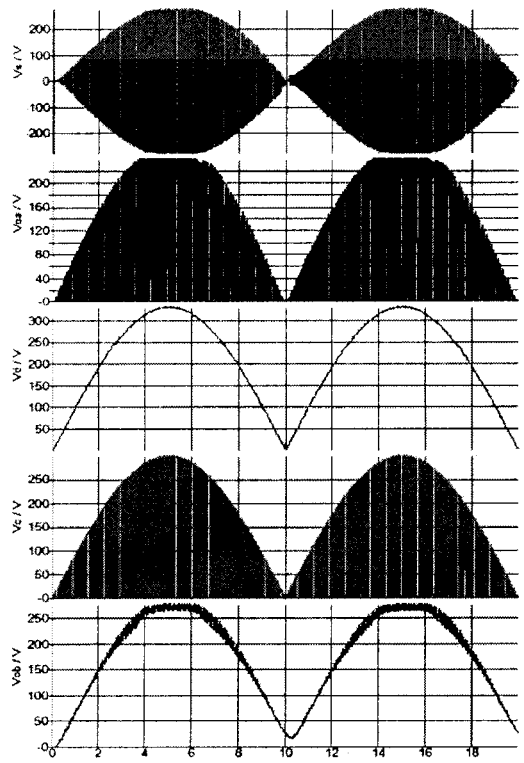
FIG. 78: Voltage Simulation Waveform at Each Point of DC Voltage-Stabilized Power Source.

FIG. 78 is the simulation waveform of voltage at each point, from top to bottom: steamed bun wave voltage Vd of rectified input voltage, cutting voltage Vc, source electrode output voltage Voa of Q2, TX1 secondary side double-sideband voltage Vs and bridge-rectified output voltage Vob. Here, large-capacitance filtering is not applied to Voa and Vob, and Voa and Vob are unidirectional pulse voltage.

Figure 76:
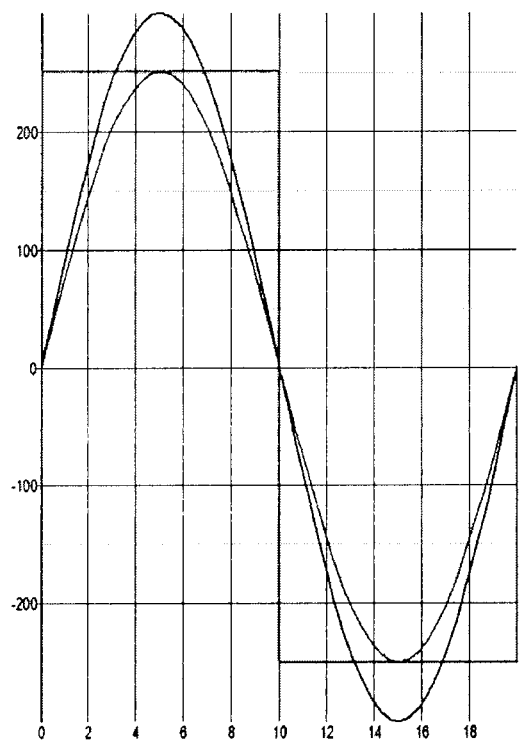
FIG. 76: Voltage Cutting Schematic Diagram of DC Voltage-Stabilized Power Source.
Figure 77:
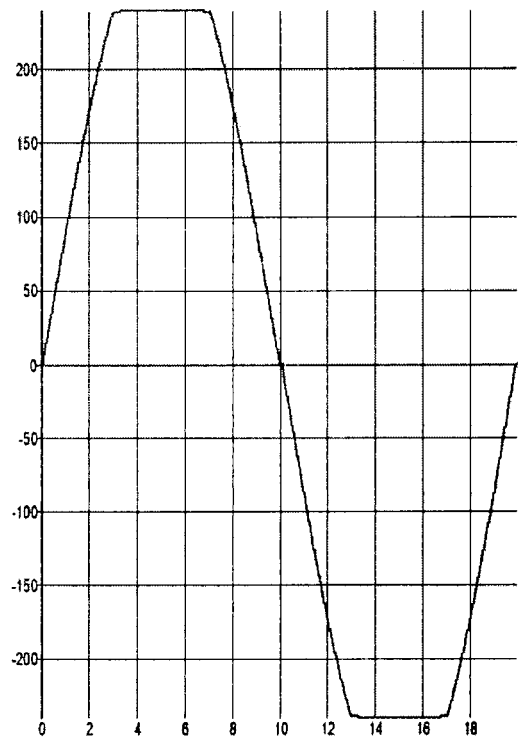
FIG. 77: Actual Cutting Waveform of DC Voltage-Stabilized Power Source.

The flat-roof wave cutting has the advantage of further increasing the overall efficiency. FIG. 76 is the comparison demonstration diagram of cutting way, in order to output 250V DC voltage, the sine-wave signal with 250V amplitude can be used for cutting the input voltage. However, the rest part after cutting is obviously greater than the rest part of the input voltage cut by the 250V DC signal. The fewer the cut rest part is, the fewer the power requiring traditional power conversion is, and the higher the efficiency is. The complete cutting signal adopted by the DC voltage-stabilized power source is shown in FIG. 77. Assuming the input AC voltage is 220V and the output DC voltage is 250V, the area of the input voltage is P1=220*1.414*2=622(V), and the top area of the clipping wave is P2=51.45. The overall efficiency can be calculated as follows:

The flat-roof steamed bun wave voltage area output from the resistor R8 is P1-P2=(622−51.45)=570.55, the conversion efficiency of this part is 100%, the top area 51.45 needs traditional power conversion, the efficiency is 85%, the available power of this part is 51.45*85%=43.73, and the overall efficiency is (570.55+43.75)/622=98.75%. When the output voltage is higher, the overall efficiency is also higher.

Embodiment 5

AC Uninterrupted Power Source UPS

Figure 22:
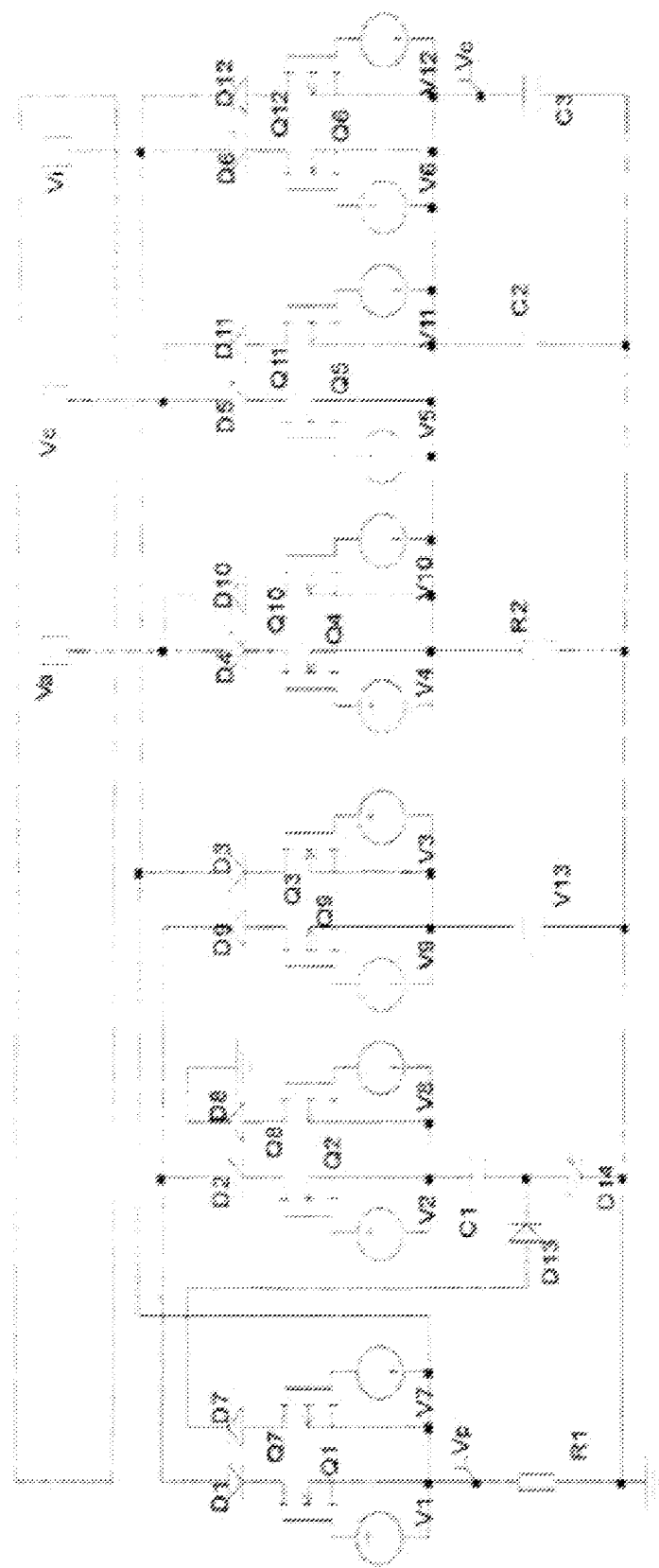
FIG. 22: Embodiment 5: AC Uninterrupted Power Source (UPS)

On the circuit of the AC voltage-stabilized power source, the additional DC voltage is connected into the circuit and the output voltage control circuit to become the uninterrupted power source UPS, and the specific circuit is shown in FIG. 22.

The power devices Q4, Q10, Q5, Q11, Q6, Q12 form three basic circuits (2.1) and operate as the switches of the AC voltage, the three basic circuits are collectively called as an output voltage control circuit, and the circuit is a part of the AC voltage-stabilized power source (refer to the AC voltage-stabilized power source). When the input voltage is within the normal range, the unit circuit connected with the port Vi is started, and the input voltage on the source electrode resistor R2 forms voltage drop to become the output voltage Vo. When the input voltage is too high, the unit circuit connected with the port Va is started, the voltage Va generated by the cutting circuit forms voltage drop on the resistor R2 to become the output voltage Vo. When the input voltage is too low, the unit circuit connected with the port Vc is started, the voltage Vc generated by the compensating circuit forms voltage drop on the resistor R2 to become the output voltage Vo.

The basic circuit (2.1) composed of the power devices (Q9, Q3) is a charge and discharge circuit, the basic circuit (2.1) composed of the power devices Q2, Q8 is a voltage polarity reversing circuit, the basic circuit (2.1) composed of the power devices Q1, Q7 is a square-wave conversion circuit, and the three circuits are collectively called as DC voltage access circuits. When the battery voltage is lower than the rated value, Q3 is started, and the input AC voltage V1 charges the battery V13 via D3, Q3. When the battery voltage is higher than the rated value, Q3 is disconnected, and charging stops.

When the mains supply is cut off, the input voltage Vi is zero, Q9 is started, the battery voltage outputs the positive square-wave voltage having 20 ms output cycle and 10 ms pulse width and synchronous to the mains supply via Q9, D9. During the first 10 ms period, the voltage is divided into two parts, one part passes through D1, Q1, and forms the positive half cycle of a square-wave voltage Vp on the resistor R, and the other part of voltage charges the capacitor C1 via D2, Q2 and D14 to form the capacitor voltage Vc5 with positive upper part and negative lower part. During the last 10 ms period, the battery does not have output, the positive electrode of the voltage Vc5 on the capacitor C5 is grounded via Q8, D8, the negative electrode forms a negative half cycle of the square-wave voltage Vp on the resistor R1 via D7, Q7, and the 50 Hz square-wave voltage Vp formed on the resistor R1 directly enters into the input voltage bus.

After the square-wave voltage Vp enters into the input voltage bus, the two situations above and below the rated voltage are completely identical to those of AC voltage, the same processing and control are carried out, i.e. cutting is carried out when the voltage is greater than the rated value, compensation is carried out when the voltage is smaller than the rated value, and the cutting and compensating results and the output voltage Vo are sine-wave voltages (refer to the DC inverter power source).

Embodiment 6

Uninterrupted Power Source without Converter in DC Uninterrupted Power Source UPS The name of uninterrupted power source UPS not only means uninterrupted output voltage, but also means the purpose of mainly providing electric energy for computers and peripheral equipment via the output voltage. Because the computers and peripheral equipment adopt switching power sources, the AC power source is firstly rectified into a DC voltage after entering into the computers, that the input voltage is AC voltage or DC voltage is not important for the computers and peripheral equipment, and thus the DC voltage can directly enter into the computers and peripheral equipment. The name of DC uninterrupted power source UPS has the same meanings: i.e. the name not only means uninterrupted output voltage, but also means the purpose of mainly providing electric energy for computers and peripheral equipment via the output voltage.

Figure 23:
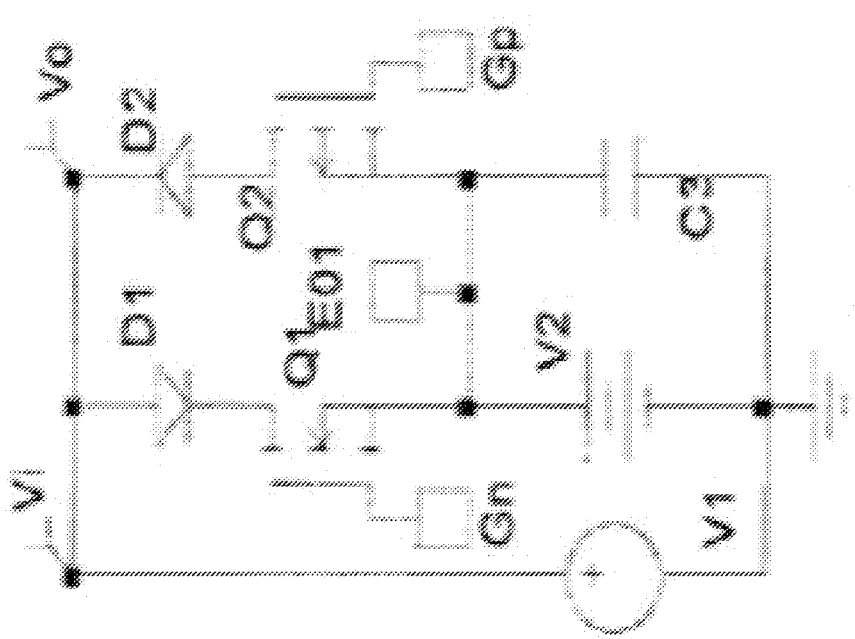
FIG. 23: Embodiment 6: Uninterrupted Power Source without Converter.

FIG. 23 is the main circuit diagram of the uninterrupted power source without converter. The source electrode of the type A unit circuit composed of the MOS tubes Q1, Q2 is connected with the battery V2. If the mains supply exists, the mains supply V1 directly supplies power to the load, the grid electrode control voltage Gp of the MOS tube Q2 is low, and Q2 is cut off. When the battery voltage is lower than the rated value, the grid electrode control signal Gn of Q1 is high, Q1 is conducted, and the mains supply charges the battery V2 via the diode D1 and the MOS tube Q1. When the battery voltage is greater than the rated value, the grid electrode control signal Gn of Q1 is low. Q1 is switched off, and charging stops. When the mains supply is cut off, the grid electrode control signal Gp of the MOS tube Q2 is high, Q2 is conducted, and the battery voltage supplies power to the load via Q2, D2. The embodiment does not have any power converter, and thus the power source is called as uninterrupted power source without converter.

When the mains supply exists in the uninterrupted power source without converter, the mains supply is directly output. When the mains supply is cut off, the battery DC voltage is directly output, and the mains supply and the battery DC voltage do not undergo any power conversion. There are two reasons: firstly, the computers and peripheral equipment operate normally in the occasion of mains supply, and the installation of UPS is to consider the accidental cut-off of the mains supply rather than other reasons; secondly, the computers and peripheral equipment do not require an AC power supply necessarily, and a DC power supply is better.

Embodiment 7

Figure 24:
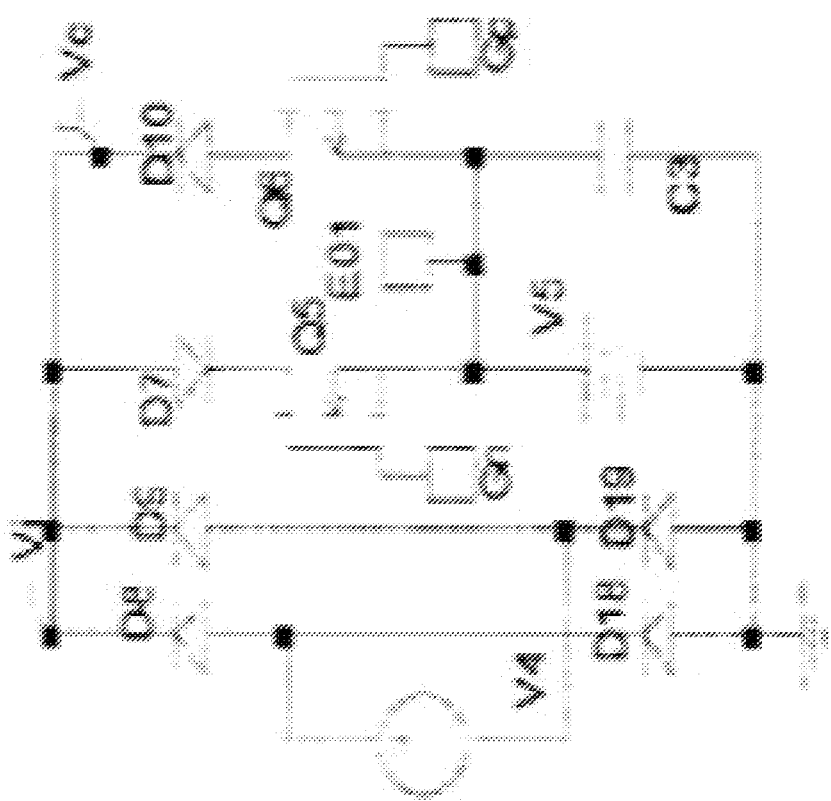
FIG. 24: Embodiment 7: Uninterrupted Power Source without Power Consumption.

Uninterrupted Power Source without Power Consumption in DC Uninterrupted Power Source UPS FIG. 24 is the main circuit diagram of the uninterrupted power source without power consumption. Compared with the uninterrupted power source without converter in FIG. 23, a full-bridge circuit composed of diodes D8, D9, D18, D19 is added. The input voltage of uninterrupted power source UPS without power consumption only passes through the rectification circuit. The overall power consumption is only equivalent to that generated by one diode PN junction, so the power consumption is very small, and thus the power source is called as uninterrupted power source without power consumption.

When the mains supply exists in the uninterrupted power source without power consumption, a rectified steamed bun wave pulse voltage of the mains supply is output. When the mains supply is cut off, the DC voltage dropping at one side of the battery is output. There are two reasons to do so: firstly, the computers and peripheral equipment adopt switching voltage-stabilized power sources, and that the input voltage is constant or not constant is the same to the computers and peripheral equipment; secondly, the computers and peripheral equipment do not require an AC voltage power supply necessarily, and a DC voltage power supply is better.

Embodiment 8

Figure 25:
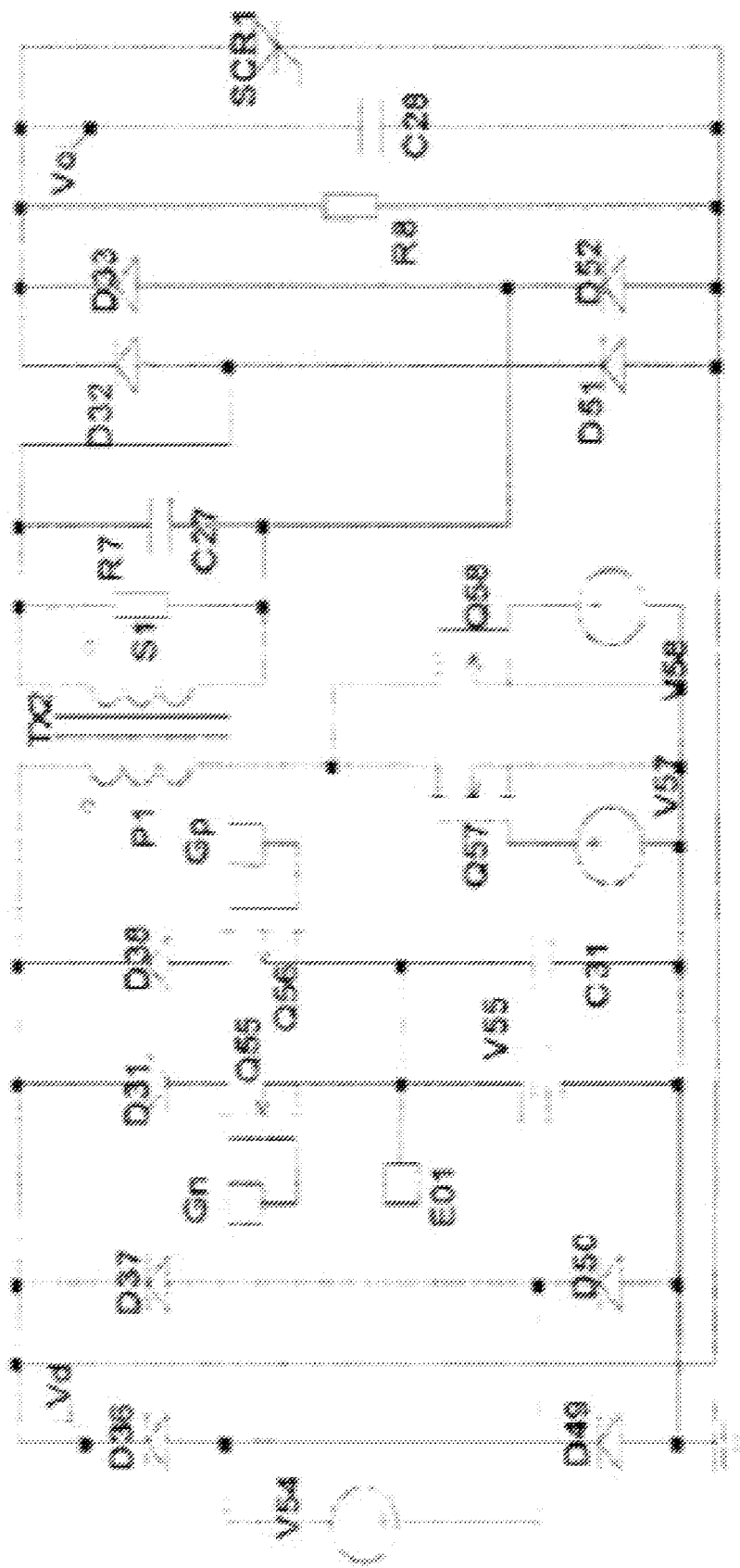
FIG. 25: Embodiment 8: Uninterrupted Power Source without Converter.

Uninterrupted Power Source without Inverter in DC Uninterrupted Power Source UPS FIG. 25 is the main circuit diagram of the uninterrupted power source without inverter. Compared with the uninterrupted power source without power consumption in FIG. 24, a voltage compensating circuit composed of Q57, Q58 is added. The compensating DC voltage generated by the compensating circuit is connected with the steamed bun wave voltage Vd of rectified mains supply or the DC voltage V55 output by the battery in series. When the input mains supply is lower than the rated value, a silicon-controlled SCR1 is cut off, and the compensating voltage and Vd or V55 are overlapped into the output voltage Vo. Because the compensating voltage is obtained via traditional power conversion PWM, pulse width modulation can keep the output voltage Vo constant. When the mains supply is not lower than the rated value, the compensating circuit is closed, SCR1 is conducted, and the rest operating process is identical to that of the uninterrupted power source without power consumption.

When the mains supply exists in the uninterrupted power source without inverter, a constant voltage Vo obtained by overlapping the steamed bun wave voltage Vd of the rectified mains supply and the compensating voltage Vc is output. When the mains supply is cut off, the constant voltage Vo obtained by overlapping the battery DC voltage V1 and the compensating voltage Vc is output. The uninterrupted power source without inverter does not have an inverter, and DC is not inverted into AC any more. Because the computers and peripheral equipment do not require an AC voltage power supply necessarily, a DC voltage power supply is better.

FIG. 26 is the AC detection and battery detection circuit for the uninterrupted power source without inverter. The circuit is divided into two parts. The first part is the AC detection circuit, the same-phase end of the comparator LM339 is connected with the steamed bun wave voltage Va of the rectified reference AC voltage, and the opposite-phase end is connected with the steamed bun wave voltage Vd of the rectified input mains supply. When the input mains supply is within the rated range, the voltage Vd is greater than the voltage Va, and the comparator LM339 outputs a low level so as to turn off the switch S1; when the input mains supply is smaller than the rated range or cut off, the voltage Vd is smaller than the voltage Va, and the comparator LM339 outputs a high level so as to turn on the switch S1. Therefore, the signal voltage (V30) is applied between the grid and source electrodes of Q56, Q56 is conducted, and the battery voltage output provides a load current.

The second part is the battery detection circuit. The battery voltage E01 is connected with the anode of the diode part of an optical coupler 4N33 to form a loop via the resistor R14, the triode part is connected with an emitting electrode tracker and connected to the ends Trig and Thresh of the clock chip 555/ALD after voltage division by the resistors R12, R18 and (R11, R19). When the battery voltage is within the normal range, 555/ALD outputs a low level. When the battery voltage is lower than the rated value, 555/ALD outputs a high level to turn on the switch S2. The signal voltage V31 is applied between the grid and source electrodes of Q55, Q55 is conducted, and the rectified steamed bun wave voltage charges the battery.

The circuit and the uninterrupted power source without inverter have three interface signals: Gp, Gn and E01, the uninterrupted power source without power consumption and the uninterrupted power source without converter also have the three identical interface signals, the definitions of the signals are completely the same, and thus the detection circuit is applicable to the above three DC uninterrupted power sources.

Embodiment 9

AC Constant-Current Power Source

Figure 79:
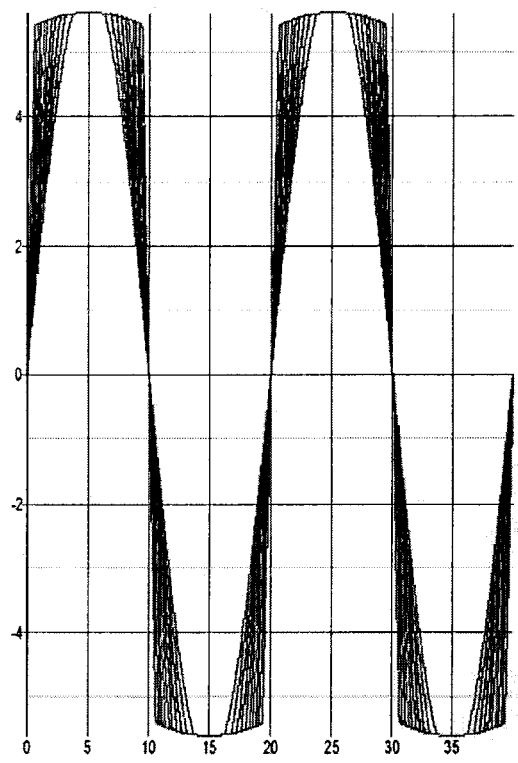
FIG. 79: Output Current Simulation Waveform of AC Constant-Current Power Source.
Figure 80:
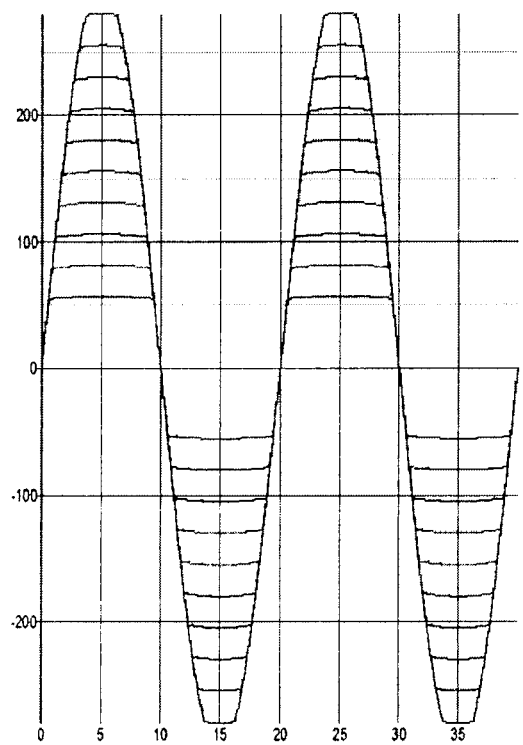
FIG. 80: Output Voltage Simulation Waveform of AC Constant-Current Power Source.

FIG. 27 is the AC constant-current power source. The common drain electrode of the basic circuit (2.1) composed of Q47, Q48 is connected with the output resistor R17, and voltage-stabilizing diodes D39, D38 are respectively connected with the source electrode resistors R10, R11 in parallel. From the characteristics of the power MOS tube, we can see that the drain source current is only relevant to the grid electrode voltage. When the grid electrode voltage is unchanged (the voltage is stabilized by the voltage-stabilizing diodes D39, D38), the drain source current is also unchanged. When the load varies or the input voltage varies, the output current is unchanged. FIG. 79 is the simulation waveform of the output current, when the load resistor R17 varies from 10 ohm to 50 ohm, the output current remains constant. FIG. 80 is the simulation waveform of the output voltage. When the load resistor R17 varies from 10 ohm to 50 ohm, the output voltage on R17 varies from 60V to 280V, which also indicates that the load current is constant.

Embodiment 10

DC Constant-Current Constant-Voltage Power Source

FIG. 28 is the DC constant-current constant-voltage power source. The steamed bun wave voltage of the input mains supply passing through a full-bridge rectification circuit composed of D15, D16, D25 and D26 is applied to the drain electrode of the MOS tube Q29 and also applied to a voltage-stabilizing diode heap composed of the resistor R1 and the voltage-stabilizing tubes D21, D23, D24, D27 in series, each voltage-stabilizing tube is 75V, the grid electrode of Q1 is clamped at 300V level, the source electrode is grounded via the resistor R8, a flat-roof steamed bun wave voltage clipped by 300V is generated on R8, the voltage is applied to the source electrode of the MOS tube Q30 via the resistor R7, the drain electrode is grounded via the resistor R9, and the gird and source electrodes are connected with the voltage-stabilizing diode D17. According to the characteristics of the MOS tube, the drain source current is only relevant to the grid electrode voltage, the grid electrode voltage is unchanged, the drain source current is also unchanged, the gird electrode voltage of Q30 is now clamped at a certain level by the voltage-stabilizing diode D3, thus the drain source current is unchanged, and a constant-current current is output. When the resistance of the load resistor R5 is increased until the voltage exceeds the allowable value, Q29 outputs constant voltage, the output voltage of R5 is limited from continuing increasing, and the constant-voltage function is kept.

Figure 81:
FIG. 81: Output Current Simulation Waveform of DC Constant-Current Constant-Voltage Power Source.
Figure 82:
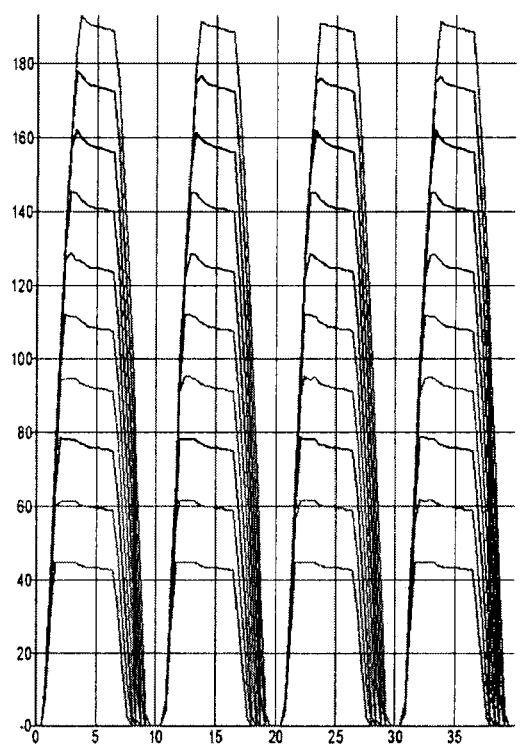
FIG. 82: Output Voltage Simulation Waveform of DC Constant-Current Constant-Voltage Power Source.

FIG. 81 is the simulation waveform of the output current, the load resistor R4 varies from 8 ohm to 30 ohm, and the current flowing across the load resistor R18 is basically unchanged. FIG. 82 is the simulation waveform of the output voltage, the load resistor R18 varies from 8 ohm to 30 ohm, and the voltage on the load resistor R18 varies from 50V to 200V, which means that the current flowing across the load resistor R18 remains constant.

Embodiment 11

Auxiliary Power Source

FIG. 29 is an auxiliary power source. The MOS tubes Q15, Q17, Q16, Q18 in the circuit form two type A unit circuits SBPA, the common source electrodes are respectively connected with the resistors R4, R5 to form a basic circuit (2.1), the external power source V20 is a mains supply with 311V amplitude, the driving signals V14, V18, V15, V19 are square waves with 20 ms cycle and 1 ms pulse width, the time delays are 0 ms, 10 ms, 9 ms and 19 ms successively, and the voltages of sine wave in intervals 1 ms before and after zero are respectively taken. FIG. 83 is the simulation waveform of voltage at each point, from top to bottom: input AC voltage V1, grid electrode driving voltages V1, V2, V3 V4, output voltage Vp on the resistor R4 and output voltage Vn on the resistor R5. V1-V4 are interval selection pulses. We can see that the selection pulses and the pointed head intervals of the output voltage are in one-to-one correspondence. FIG. 84 is the positive and negative symmetrical DC voltage after large-capacitance filtering, and the amplitude is close to 80V. If different pulse widths are selected, output DC voltages with different amplitudes can be obtained.

Grid pollution and low power factor are mainly caused by too many capacitive loads. The capacitive loads have the characteristic of only utilizing a small part of voltage in intervals near the peak value of the sine wave. If the interval starting from zero passage utilizes the sine-wave voltage, not only is a large energy source developed, but also the pollution degree of the grid can be greatly improved.

The auxiliary power source just utilizes the sine-wave voltage in an interval near zero passage. An auxiliary voltage required as low as enough can be obtained by properly selecting the pulse width of the MOS tube driving signal. When the driving signal pulse width is selected as 0.5 ms, the output symmetrical voltage is about 30V, and the voltage can be DC positive voltage after rectification.

Embodiment 12

Polarity Reversing Power Source

Figure 49:
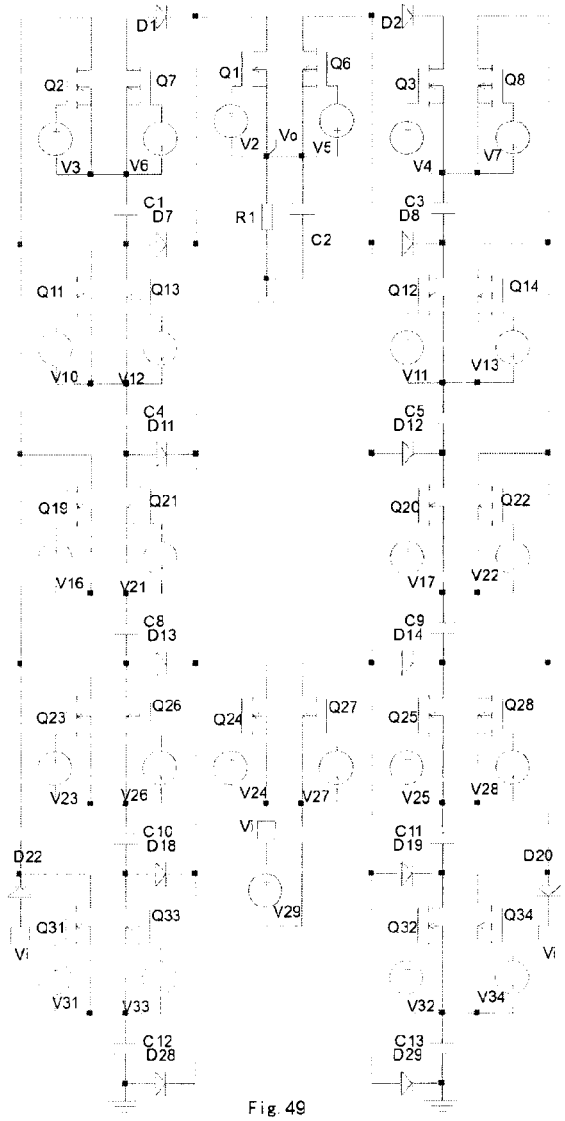
FIG. 49: Embodiment 32: Power Factor Correction (PFC)

FIG. 30 is a polarity reversing power source, which has the function of reversing the polarity of the voltage. The common source electrode of the MOS tubes Q1, Q12 is connected with a serial branch of the resistor R5 and C7 and D20, the cathode of V20 is grounded, the input voltage V12 is a positive voltage, and the driving signals V9, V10 are square waves of 50 Hz. During the first 10 ms period, Q11 is conducted, V12 forms 10 ms square-wave voltage on the resistor R5, the capacitor C7 is charged via D20, and the polarity of the upper part is positive and the polarity of the lower part is negative. When the second 10 ms comes, Q11 is cut off, Q12 is conducted, the positive voltage end of C7 is grounded, the diode D17 outputs a negative voltage, and a negative square-wave voltage of 10 ms is obtained on the resistor R6. The simulation waveform in FIG. 85 is positive and negative pulse voltage, and a large-filtering capacitor can be applied in order to obtain symmetrical DC output. In practice, the left circuit of FIG. 49 is also a square-wave inverter power source. The polarity reversing power source is frequently used in subsequent embodiments.

Embodiment 13

AC-AC N-Stage Step-Up Power Source

FIG. 31 is an AC-AC N-stage step-up power source, the left part and the right part are completely symmetrical, and N=4 is now taken as an example. MOS tubes Q11, Q4 form a type A unit circuit, the source electrode is connected with the N-stage step-up power capacitor network UPnet, the common source electrode of the unit circuit composed of Q1 and Q8 is connected with the resistor R1 and the capacitor C1, and the two unit circuits are connected into a basic circuit (2.1). For the first stage of the step-up capacitor network, during the positive half cycle, Q11 is conducted, and V34 charges the capacitor C2 via the diodes D7, D11, D17 and Q23; during the negative half cycle, Q4 is conducted, V34 charges the capacitor C3 via D9, D12, D18 and Q38, and the charging methods of the other three stages of the step-up capacitor network are completely the same. Charging and discharging are carried out at the same time, during the positive half cycle, Q4, Q15, Q21, Q27 and Q8 are conducted, and the voltages on the capacitors C3, C10 C17, C23 are superposed and form negative voltage drop on the resistor R1; during the negative half cycle, Q11, Q18, Q24, Q30 and Q1 are conducted, the voltages on the capacitors C2, C9, C16, C22 are superposed and form positive voltage drop on the resistor R1, charging and discharging are carried out alternately, and the output voltage Vo falls half cycle behind the input voltage V11. FIG. 86 is the simulation waveform of the output voltage, the middle sine wave is the waveform of the 311V mains supply, and the outer layer is the square-wave output voltage already increased to near 1200V.

The efficiency of the power source can be estimated as follows:

The load resistor R1 is 1 k, the output voltage is 1200V, so the output current is 1.2V. The voltages on the positive half-cycle and negative half-cycle network capacitors are superposed and output, and the charging current and the discharging current can be considered to be equal. The positive saturation voltage drop of the diode is 1.2V, the saturation conduction resistance of the MOS tube is 0.75 ohm, each charging channel has three diodes and one MOS tube, and the voltage loss is:

$$U1=1.2*3+0.75*1.2=4.5V$$

Because the circuits for charging capacitor are connected in series, the currents are equal, the calculation efficiency can be replaced by voltage, the voltage losses of the four charging channels are completely identical, and the efficiency η1 during charging is:

$$\eta1=(311-4.5)/311=98.56\%$$

The discharging channel has four MOS tubes and one diode, and the voltage loss is:

$$U2=0.75*4*1.2+1.2=4.8V$$

Similarly, the discharging efficiency η2 is:

$$\eta2=(1200-4.8)/1200=99.6\%$$

Therefore, the overall efficiency is η=η1*η2=98.56%*99.6%=98.17%

Embodiment 14

AC-DC N-Stage Step-Up Power Source

FIG. 32 is an AC-DC N-stage step-up power source, and N=4 is now taken as an example. The embodiment has two different points from the above embodiment: 1) the source electrode of the MOS tube Q9 is directly grounded; and 2) a serial branch connected with C15 and D39 is applied between the anode of the diode D32 and ground, and the anode of D39 is grounded.

The embodiment is AC input but can output DC. The differences between the operating process of the embodiment and that of the embodiment 10 are as follows: 1) during the negative half cycle, Q9 is not conducted, after the voltages on the capacitors C5, C12, C19, C25 are superposed, the capacitor C15 is charged via the diode D39, and the voltage on C15 has negative upper part and positive lower part; and 2) in the positive half cycle of next period, Q9 is conducted, the negative voltage end (upper end) of the capacitor C15 is grounded, the positive voltage end (lower end) outputs the voltage Vb, and the voltage forms positive voltage drop on the load resistor R2 via the diode D33. FIG. 87 is the simulation waveform of the output voltage, the upper part is the input 311V mains supply Vi, the middle part is the output voltage Va which is a positive square-wave voltage with the amplitude of 1200V, the lower part is Vb which is also a positive square-wave voltage with the amplitude of 1200V, and Vb and Va are output in parallel, have the same phase and are superposed.

Embodiment 15

DC-AC N-Stage Step-Up Power Source

FIG. 33 is a DC-AC N-Stage step-up power source. The differences from the AC-AC four-stage step-up power source are as follows: 1) 2 MOS tubes are used for replacing 2 diodes at the charging end, and a fully-controlled device MOS tube is used for controlling the time of charging because of DC input; and 2) a polarity reversing circuit composed of C26, D59 and Q35 is added, a negative pulse voltage with 20 ms cycle and 10 ms lag is generated, the drain electrode of Q6 is equivalent to the application of the AC negative half-cycle voltage, and the subsequent operating process is completely identical to that of the AC-AC N-stage step-up power source. FIG. 88 is the simulation waveform of the output voltage, the straight line between 0.2 and 0.4 is the input 300V DC voltage V+, the square-wave voltage between 0 and −0.3 is the −300V pulse voltage V− generated by the polarity reversing circuit, and the outermost layer is the 1200V symmetrical square-wave output voltage Vo.

Embodiment 16

AC-AC N-Stage Step-Up High-Frequency High-Voltage Power Source

Figures 34, 35, 36:
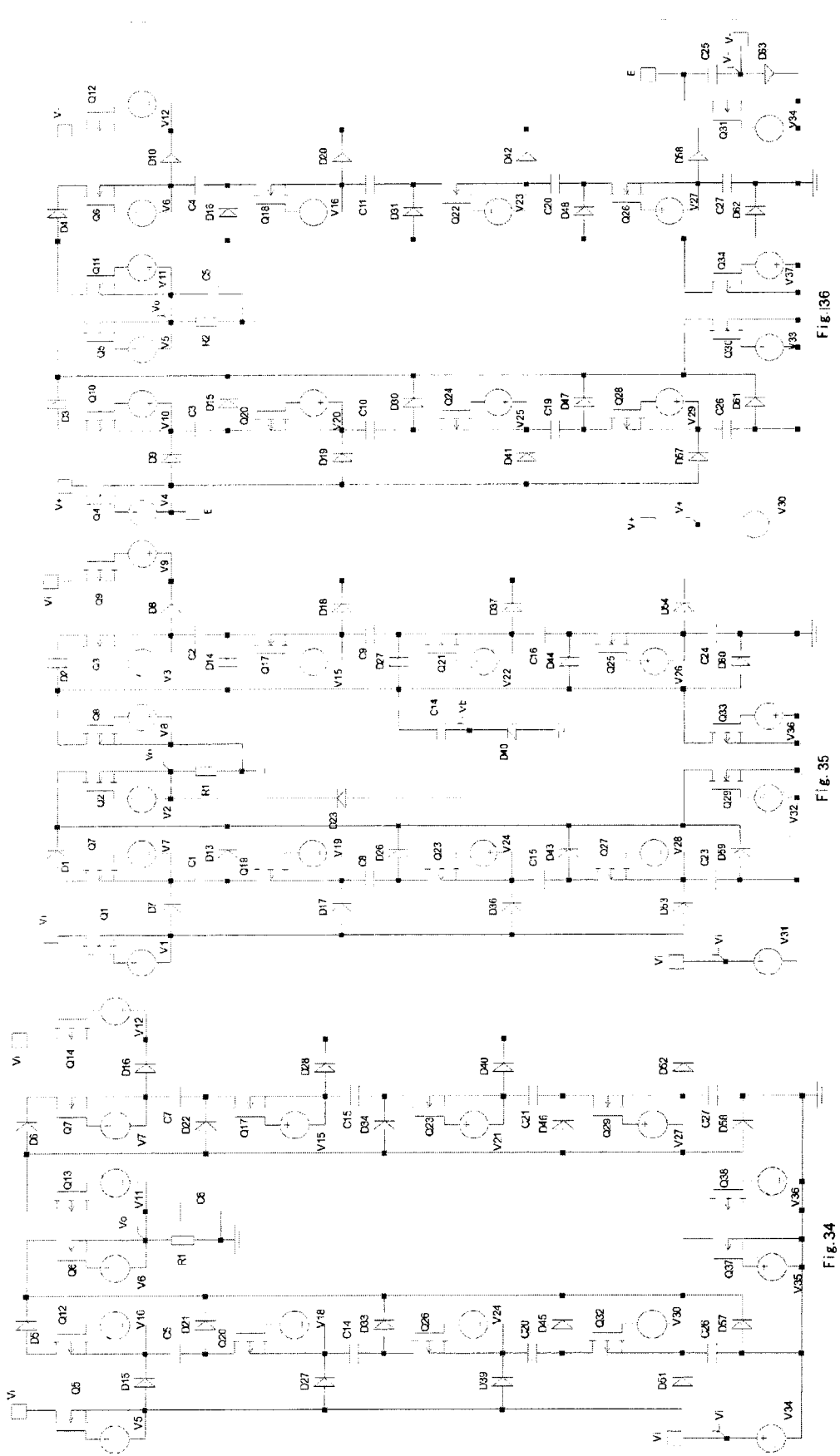
FIG. 34: Embodiment 16: AC-AC NN-stage Step-Up Power Source.
FIG. 35: Embodiment 17: AC-AC N-stage High-Frequency High-Voltage Power Source.
FIG. 36: Embodiment 18: AC-DC N-stage High-Frequency High-Voltage Power Source.

FIG. 34 is an AC-AC N-stage step-up high-frequency high-voltage power source. The two differences from the AC-AC four-stage step-up power source are as follows: 1) 2 MOS tubes are used for replacing 2 diodes at the charging end, and a fully-controlled device MOS tube must be used for controlling the time of charging in order to control the charging efficiency; and 2) the operating frequency is increased from 50 Hz to 1 KHz, the operating frequency is optional, and the operating frequency is the output voltage frequency outputting high-frequency high-voltage power source. FIG. 89 is the simulation waveform of the output voltage, the middle sine wave is an input voltage Vi with 250V amplitude, and the 1000V symmetrical square wave is the output high-frequency high voltage Vo.

Embodiment 17

AC-DC N-Stage Step-Up High-Frequency High-Voltage Power Source

FIG. 35 is an AC-DC N-stage step-up high-frequency high-voltage power source. The two differences from the AC-DC four-stage step-up power source are as follows: 1) 2 MOS tubes are used for replacing 2 diodes at the charging end, and a fully-controlled device MOS tube must be used for controlling the time of charging in order to control the charging efficiency; and 2) the operating frequency is increased from 50 Hz to 1 KHz, the operating frequency is optional, and the operating frequency is the output voltage frequency outputting high-frequency high-voltage power source. FIG. 90 is the simulation waveform of the output voltage, the right sine wave is an input voltage Vi with 250V amplitude, and the left 1000V square wave is the output high-frequency DC high voltage Vo.

Embodiment 18

DC-AC N-Stage Step-Up High-Frequency High-Voltage Power Source

FIG. 36 is a DC-AC N-stage step-up high-frequency high-voltage power source. Compared with the DC-AC four-stage step-up power source in FIG. 52, the DC-AC N-stage step-up high-frequency high-voltage power source has completely identical circuit structure, operating process and operating environment. FIG. 91 is the simulation waveform of the output voltage and is identical to the waveform in FIG. 88, and only the frequency is increased by 20 times.

Embodiment 19

AC-AC N*N-Stage Step-Up Power Source

FIG. 37 is an AC-AC N*N-stage step-up power source. In fact, the AC-AC N*N-stage step-up power source is formed by splicing two AC-AC four-stage step-up power sources with completely identical circuit topologies, the input voltage of the left power source is 80V AC voltage Vi, the output voltage is a square-wave voltage Vo about 300V, the input voltage of the right power source is Vo, and the output voltage is 1200V square-wave voltage Vb. FIG. 92 is the simulation waveform of the output voltage, from top to bottom: 80V input voltage Vo, output voltage Va about 300V generated by the first 4-stage step-up power source and output voltage Vb about 1200V generated by the second 4-stage step-up power source. A four-stage step-up power source needs 12 MOS tubes, an 8-stage needs 20 tubes, 16-stage needs 36 tubes, and only 24 tubes are needed for a 16-stage step-up power source after adopting N*N stage.

Embodiment 20

AC-AC N-Stage Step-Up Voltage-Stabilized Power Source

FIG. 38 is an AC-AC N-stage step-up voltage-stabilized power source. MOS tubes Q4, Q10 form a type C basic circuit, namely voltage cutting circuit, the cutting signal is generated by the basic circuit (2.1) composed of Q3 and Q7 and is applied between the grid electrodes of Q4 and Q10 and ground, and the output voltage of the source electrodes of Q4 and Q10 remains constant. The constant voltage is applied to an AC-AC N-stage step-up network, and the output voltage Vo of the step-up network must also be constant. The rest voltage after voltage cutting undergoes traditional power conversion by the transformer TX1 to output a DC voltage Vob. The cutting signal generating circuit composed of Q3 and Q7 is connected with the mains supply via the amplitude height modulation equivalent resistor AHM20 k(Vo)1, a square-wave signal enveloped as sine wave is generated on the source electrode resistor R2, the amplitude is one grid source voltage Vgs higher than the output voltage Vo, the adjustable range of AHM20 k(Vo)1 is 20 k, and the detection and stabilization object is the output voltage Vo. The amplitude of a DC voltage Vob generated at the TX1 secondary side is roughly adjusted by the transformation ratio of TX1 and is finely adjusted by the pulse width of the cutting signal. FIG. 93 is the simulation wave of voltage at each point, from top to bottom: input mains supply Vi, cutting signal Vc, output voltage Vo, TX1 secondary side voltage Vs and transformer output DC voltage Vob.

The output voltage of the AC-AC N-stage step-up voltage-stabilized power source can be manually set and is a stable AC or DC output voltage, and the voltage stabilizing grade is controlled by the DC reference voltages V1, V2 in the amplitude height modulation circuit (4). Refer to the voltage cutting circuit for detailed operating process. Different step-up networks are connected on the voltage cutting circuit to become different voltage-stabilized power sources. The AC-DC N-stage step-up power source, the DC-AC N-stage step-up power source, the AC-AC N*N-stage step-up power source, the DC-AC N-stage step-up high-frequency high-voltage power source, etc. can become voltage-stabilized power sources by applying the voltage cutting circuit to the output end.

Embodiment 21

AC-AC N-Stage Step-Down Power Source

Figure 39:
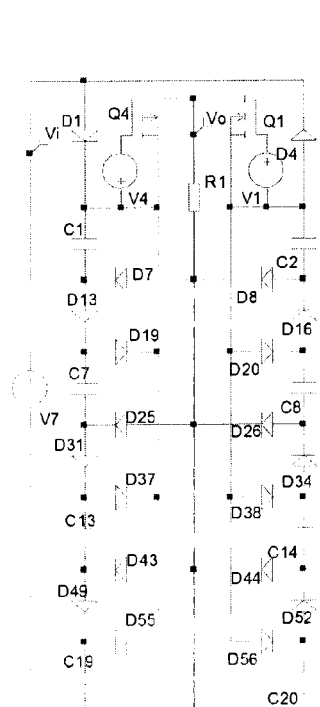
FIG. 39: Embodiment 21: AC-AC N-stage Step-Down Power Source.

FIG. 39 is an AC-AC N-stage step-down power source, the left circuit and the right circuit are completely symmetrical, and N=4 is now taken as an example. MOS tubes Q4, Q1 form a type A unit circuit, the common source electrode is connected with the N-stage step-down power capacitor DNnet, the drain electrode is connected with the output resistor R1. For the left circuit, during the positive half cycle, V7 charges the capacitors C1, C7, C13, C19 via the diodes D1, D13 D31, Q49, Q2 is also conducted, the capacitors C2, C8, C14, C20 discharge in parallel, and a negative voltage is generated on the resistor R1; during the negative half cycle, V7 charges the capacitors C2, C8, C14, C20 via the diodes D4, D16, D34, D52, Q4 is also conducted, the capacitors C1, C7, C13, C19 discharge in parallel, and a positive voltage is generated on the resistor R1. During charging, four capacitors are connected in series; during discharging, four capacitors are connected in parallel. Therefore, the voltage Vo on the resistor R1 is a quarter of the input voltage V7. FIG. 94 is the simulation waveform of the output voltage, the sine wave is the waveform of a 311 mains supply, and the middle part is a square-wave output voltage already dropped to 77V.

The efficiency of the power source can be estimated as follows:

The load resistor R1 is 77 ohm, the output voltage is 77V, so the output current is 1V. The positive saturation voltage drop of the diode is 1.2V, the saturation conduction resistance of the MOS tube is 0.75 ohm, each charging channel has four diodes, and the voltage loss is:

$U1=1.2*4=4.8V$

Because the circuits for charging capacitor are connected in series, the currents are equal, the calculation efficiency can be replaced by voltage, and the efficiency η1 during charging is:

$\eta 1=(Vi-U1)/Vi=(311-4.8)/311=98.46\%$

The discharging channel has one MOS tube and two diodes, and the voltage loss is:

$U2=0.75*1+1.2*2=1.95V$

The voltage during discharging is:

$U3=(311-4.8)/4=76.55$

Similarly, the discharging efficiency η2 is:

$\eta 2=(U3-U2)/U3=(76.55-1.95)/76.55=97.45\%$

Therefore, the overall efficiency η=η1*η2=98.46%*97.45%=95.94%.

Embodiment 22

AC-DC N-Stage Step-Down Power Source

Figure 40:
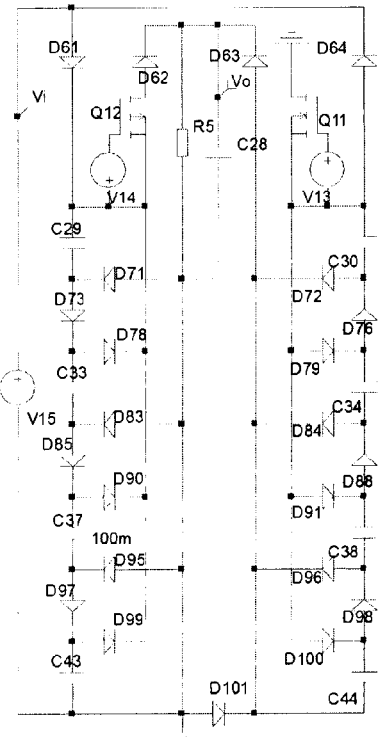
FIG. 40: Embodiment 22: AC-DC N-stage Step-Down Power Source.

FIG. 40 is an AC-DC N-stage step-down power source. Compared with the AC-AC N-stage step-up power source, the left capacitor step-down network operates normally, the right capacitor step-down network can be considered as a capacitor and is grounded via a diode D101, the anode of D101 is grounded, Q11 is not connected with the load resistor but is directly grounded, the output voltage is connected with the load via the diode D63, which is a polarity reversing circuit for converting the negative voltage to the positive voltage. FIG. 95 is the simulation waveform of the output voltage, the sine wave is a mains supply voltage with 311V amplitude, and the middle part is the waveform of an output voltage on the resistor R5.

Embodiment 23

DC-AC N-Stage Step-Down Power Source

Figure 41:
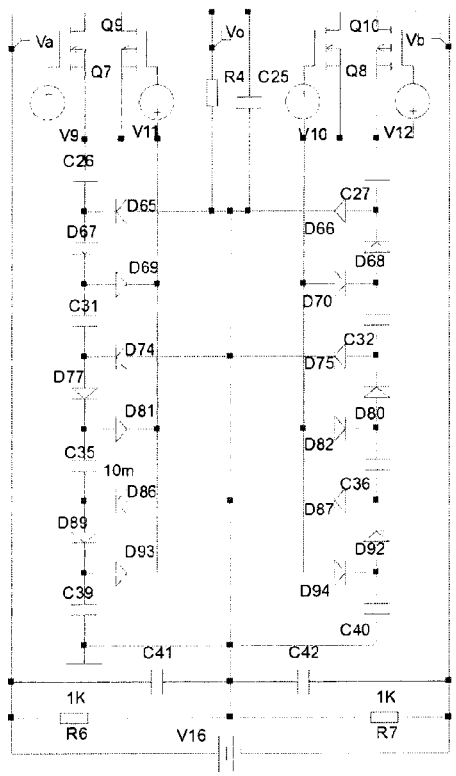
FIG. 41: Embodiment 23: DC-AC N-stage Step-Down Power Source.

FIG. 41 is a AC-DC N-stage step-down power source, the left and right circuits are completely symmetrical, and N=4 is now taken as an example. The MOS tubes Q7, Q9 and Q6, Q10 form a type A unit circuit SBPA, and the common source electrode is connected with the capacitor step-down network DNnet. The differences from the AC-AC N-stage step-down power source are as follows: 1) the input DC voltage is equally divided by R8, C41 and R7, C42, the center is grounded, the positive electrode point is connected with the drain electrode of Q7, and the negative electrode is connected with the drain electrode of Q10. The subsequent operating process is completely identical to that of the AC-AC N-stage step-down power source. FIG. 96 is the simulation waveform of the output voltage, the upper part is equally divided voltage +160V, the middle part is equally divided voltage −160V, and the lower part is the output voltage Vo on the resistor R1.

The input voltage Vi is an AC voltage with 320V amplitude, the output voltage Vo is a 40V square-wave voltage, and the power source is actually a DC-AC 2*N-stage step-down power source.

Embodiment 24

AC-AC N*N-Stage Step-Down Power Source

Figure 42:
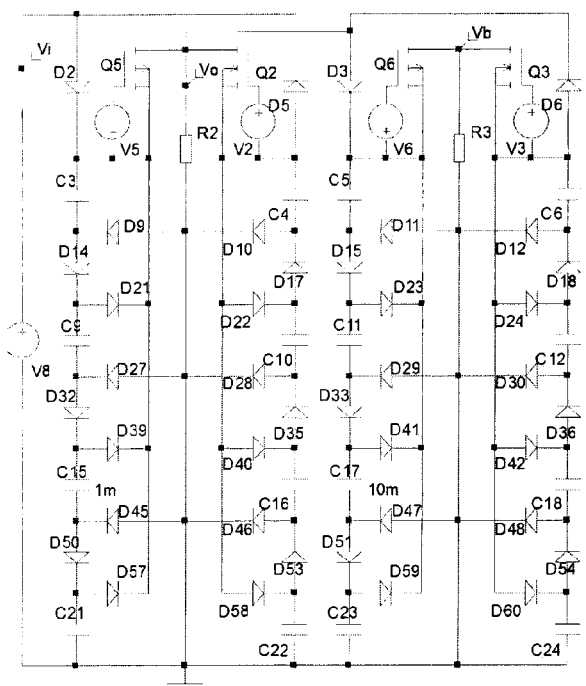
FIG. 42: Embodiment 24: AC-AC NN-stage Step-Down Power Source.

FIG. 42 is an AC-AC N*N-stage step-down power source. In fact, the AC-AC N*N-stage step-down power source is formed by splicing two AC-AC four-stage step-down power sources with completely identical circuit topologies, the input voltage of the left power source is 620V AC voltage Vi, the output voltage is a square-wave voltage V0 about 160V, the input voltage of the right power source is Vo, and the output voltage is a square-wave voltage Vb about 40V. FIG. 97 is the simulation waveform of the output voltage, from top to bottom: 620V input voltage Vi, output voltage Vo about 160V generated by the first 4-stage step-down power source and output voltage Vb about 40V generated by the second 4-stage step-down power source.

Embodiment 25

AC-AC N-Stage Step-Down Fully-Isolated Power Source

Figure 43:
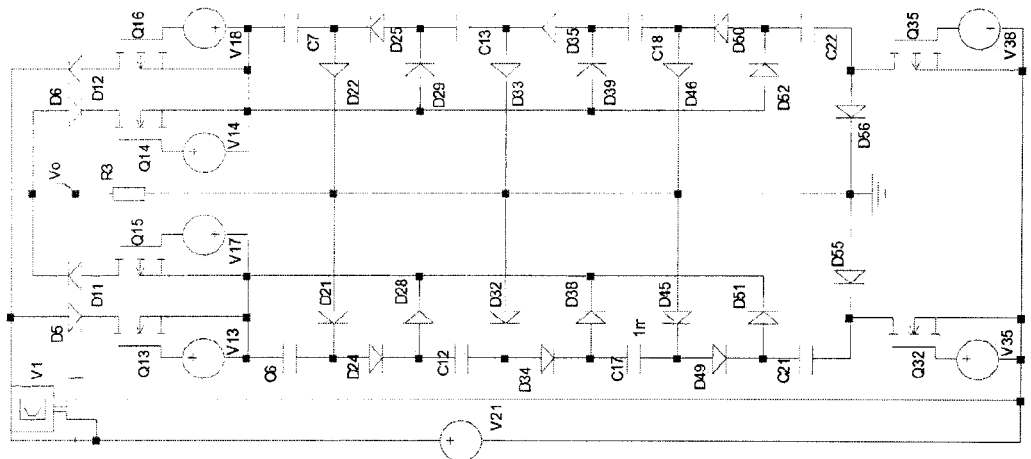
FIG. 43: Embodiment 25: AC-AC N-stage Fully-Isolated Step-Down Power Source.

FIG. 43 is an AC-AC N-stage step-down fully-isolated power source. Compared with the AC-AC N-stage step-down power source, charging and discharging are fully isolated, the MOS tubes Q13, Q32 are added to the left circuit, Q16, Q38 are added to the right circuit, and the conduction and cut-off of the added MOS tube is synchronous to the mains supply. FIG. 98 is the simulation waveform of the output voltage, the upper part is the waveform of the input voltage Vi, and the lower part is the output waveform of the output voltage Vo.

Embodiment 26

AC-AC N-Stage Step-Down Voltage-Stabilized Power Source

Figure 44:
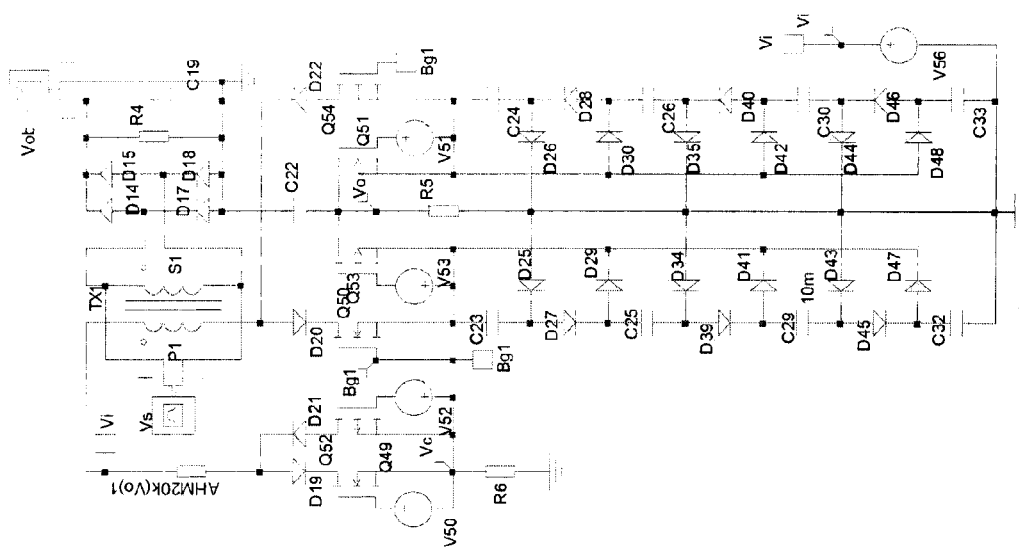
FIG. 44: Embodiment 26: AC-AC N-stage Step-Down Voltage-Stabilized Power Source.

FIG. 44 is an AC-AC N-stage step-down voltage-stabilized power source. Compared with the AC-AC N-stage step-up voltage-stabilized power source, only the step-down capacitor network is used for replacing the step-up capacitor network, and the operating principle and the operating process are completely identical. FIG. 99 is the simulation waveform of the output voltage, from top to bottom: input voltage Vi, cutting voltage Vc, output voltage Vo, TX1 secondary side voltage Vs and output voltage Vob.

Embodiment 27

DC-DC N-Stage Ultralow-Voltage Large-Current Power Source

Figure 45:
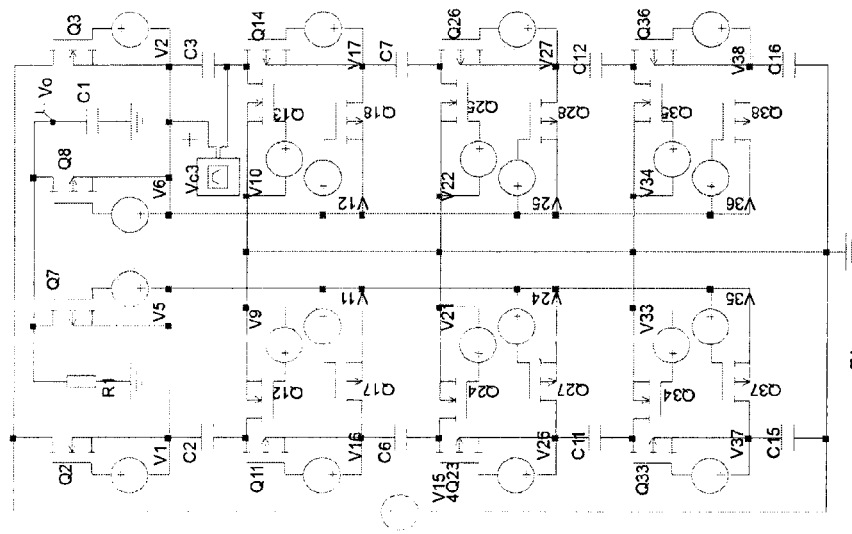
FIG. 45: Embodiment 27: DC-DC N-stage Step-Down Ultralow-Voltage Power Source.

FIG. 45 is a DC-DC N-stage ultralow-voltage large-current power source, the left and right circuits are completely identical, and only the phases fall 10 ms behind. When the left circuit is charged, the right circuit is discharged, vice versa. Compared with the AC-AC N-stage step-down power source, D1, D2 at the power source input end are replaced by the MOS tubes Q1, Q2, because the on and off of the voltage 20 ms cycle must be controlled when a DC is input, Q1, Q2 connected with the resistor R1 by the output end are unchanged, the rest all diodes are replaced by MOS tubes, and the principle for deciding the polarities and the directions of the MOS tubes is to make the direction of diodes within the MOS tube to be identical to the direction of the original diodes. When the MOS tubes are not conducted, the whole circuit can also operate, only the saturation voltage drop of the diodes within the MOS tubes is 1.2V and is relatively large. When the MOS tubes are conducted at right time, the saturation voltage drop of the diodes is short-circuit, and the overall efficiency is greatly improved. The operating current of IRF4004 is 350 A, the positive saturation resistance is only 0.00135 ohm, and the saturation voltage drop is only 0.135V after passing through 100 A current. FIG. 100 is the output voltage simulation waveform of the DC-DC N-stage ultralow-voltage large-current power source, the upper curve is a voltage on the capacitor C3, and the lower curve is an output voltage Vo. From the simulation waveform, the input DC voltage V15=4V, four-time step-down charging is carried out, and the voltage obtained on the capacitor is close to 1V, which indicates that the charging loss is very small. The output voltage is 0.97V, which indicates that the overall loss of four-time voltage discharge is only about 1.2V during discharging. Assuming that the input current is Ii and the output current is 4Ii, the overall efficiency can be estimated as follows:

$$\eta = Wo/Wi = (Vo*Io)/(Vi*Ii) = 97*4*Ii/4*Ii = 0.97*4/4 = 97\%$$

Embodiment 28

Microcomputer Power Source

Figure 46:
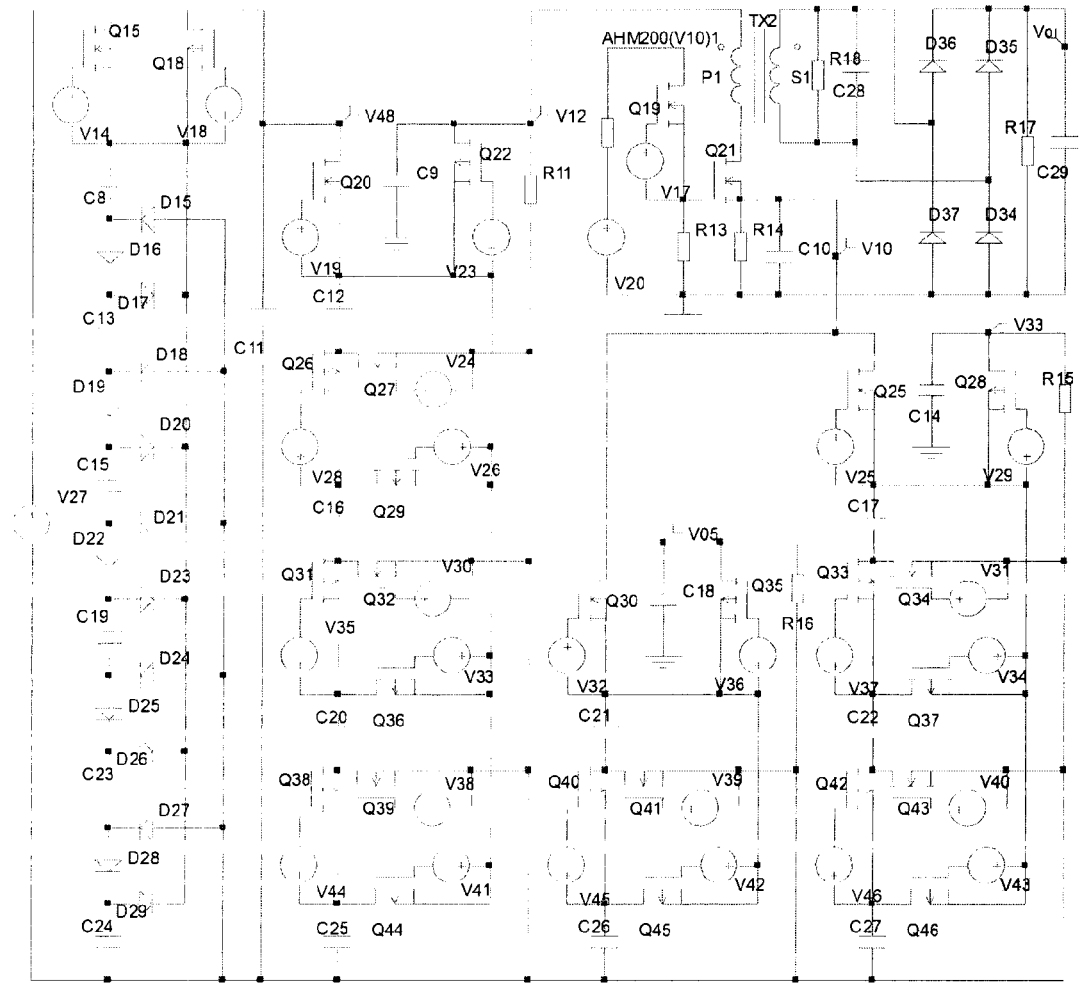
FIG. 46: Embodiment 29: Microcomputer Power Source.

FIG. 46 is a microcomputer power source. The circuit is divided into left and right parts, the left part is an AC 220V-50V circuit and a 50V-12V circuit, and the right part is 12V-5V and 12V-3.3V circuits. The input voltage V27 is a 288V DC voltage generated by a DC voltage-stabilized power source in FIG. 21 and is applied to the positive half cycle circuit of the AC-AC 6-stage step-down power source, and the output voltage is V48. The voltage V48 is applied to the input end of the DC-DC 4-stage ultralow voltage power source, a voltage V12 is obtained at the output end, the adjustment object of AHM equivalent resistor can be changed to V12, and V12 is the stabilized 12V DC voltage.

Figure 47:
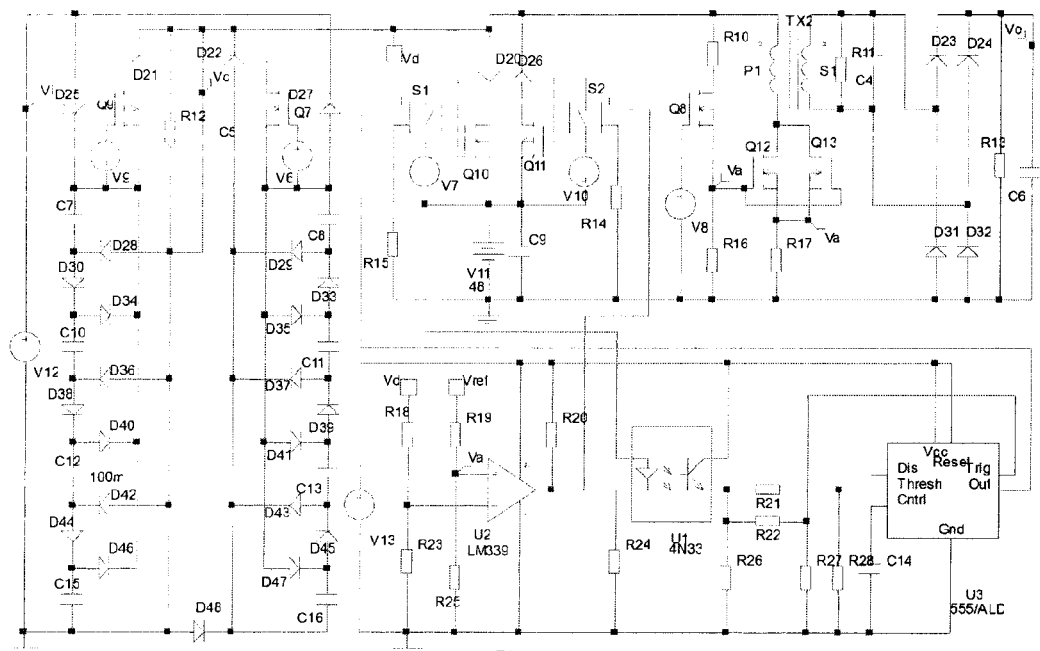
FIG. 47: Embodiment 30: Communication Power Source.

The input voltage of the right circuit is V12, and the upper part is a voltage cutting circuit. Because the input voltage is a DC, the cutting voltage generating circuit and the voltage cutting circuit per se only need the positive half cycle part of the circuit, the MOS tube Q19 form a cutting driving signal generating circuit, a uniform-amplitude square-wave signal with amplitude one Vgs higher than that of the output voltage V10, the amplitude of the signal is controlled by the amplitude height modulation equivalent resistor AHM200(V10)1, and the labeling has the following meanings: the adjustable range of the amplitude height modulation equivalent resistor is 200 ohm, and the detection object is the voltage V10. Q21 and TX1 form a voltage cutting circuit, and the voltage V10 with 10V is output on the source electrode resistor R4. When the output voltage V10 varies due to the input voltage V12 or varies due to the load R4, the output voltage V10 also varies, and the amplitude height modulation circuit (4) automatically adjusts the amplitude of the grid electrode driving signal of Q21 so as to keep the amplitude of V10 to be constant. The amplitude of the secondary output voltage Vob can be roughly adjusted by changing the transformation ratio of TX1, the amplitude of the output voltage Vob can be finely adjusted by adjusting the duty ratio of the uniform-amplitude cutting square-wave signal, the amplitude of Vob is equal to that, of V10, and Vob and V10 are output in parallel. The right lower part of FIG. 47 is two independent DC-DC N-stage ultralow voltage power source, the left circuit is N=2, the voltage V10 is decreased to 5V, the right circuit is N=3, and the voltage V10 is decreased to 3.3V.

FIG. 101 is the simulation waveform of the output voltage, from top to bottom: a voltage V48 about 50V generated by the 220V mains supply, a stable +12V voltage V12 generated by V48, a stable +5V voltage V05 generated by 12V voltage and a stable +3.3V voltage V33 generated by V12. The simulation waveform in FIG. 102 displays each voltage in the same space, so that the details can be seen more clearly.

Embodiment 29

Communication Power Source

FIG. 47 is a communication power source. The circuit is divided into three parts, the left first part is a complete AC-DC 4-stage step-down power source, the input voltage is a mains supply Vi, and the output voltage Vo is a DC voltage about 70V and is slightly higher than the battery charging voltage with 48V nominal voltage.

The second part is a complete uninterrupted power source without power consumption composed of MOS tubes Q10, Q11, the charging and discharging control, voltage detection and battery detection circuits are completely the same. Here, the input voltage is not the rectified steamed bun wave voltage but is a DC voltage Vo output from the AC-DC 4-stage step-down power source, and the detection signal of LM339 is an DC signal in stead of a AC signal.

The third part is a DC cutting circuit and is identical to the DC cutting circuit of the microcomputer power source.

The input mains supply outputs a DC voltage Vo about 70V after passing through the first part AC-DC 4-stage step-down power source, and the voltage is applied to the input end of the uninterrupted voltage without power consumption composed of Q10 and Q11. When the battery voltage is lower than the rated value, the battery detection circuit outputs a high level, the switch S1 is closed, the driving signal V7 enables Q10 to be conducted, and Vo charges the battery via the diode D20. When the battery voltage is higher than the rated value, the battery detection circuit outputs a low level, the switch S1 is opened, Q10 is cut off, and the battery stops charging. Meanwhile, the voltage Vo is applied to the DC cutting circuit composed of Q12 and Q13, a stable 48V DC voltage Va is output from the source electrode resistor, the rest voltage of the cut Vo is applied to the transformer TX2 for traditional power conversion, the DC voltage Vb output by the transformer secondary side circuit has the same amplitude to voltage Va, and the DC voltage Vb and voltage Va are output in parallel. When the mains supply is cut off or is lower than the rated value, LM339 in the voltage detection circuit outputs a high level, the switch S2 is closed, the driving signal V10 enables Q11 to be conducted, the battery voltage is applied to the DC cutting circuit composed of Q12 and Q13 via the diode D26, and the following operating process is identical to the condition when the mains supply is not cut off. When the mains supply is restored to normal, a voltage V0 is generated, the operating process is identical to the condition before power off. At the moment, LM339 in the voltage detection circuit outputs a low level, the switch S1 is opened, Q10 is cut off, and the battery voltage is cut off.

FIG. 103 is the simulation waveform of output voltage and current of the AC-DC 4-stage step-down power source, the output current Io is about 40 A, and the output voltage is about 70V. FIG. 104 is the simulation waveform of the output voltage Va generated by the DC cutting circuit and the transformer secondary side output voltage Vb, and Va and Vb are basically identical.

Embodiment 30

Zero-Power-Consumption Photovoltaic Grid-Connected Inverter

Figure 48:
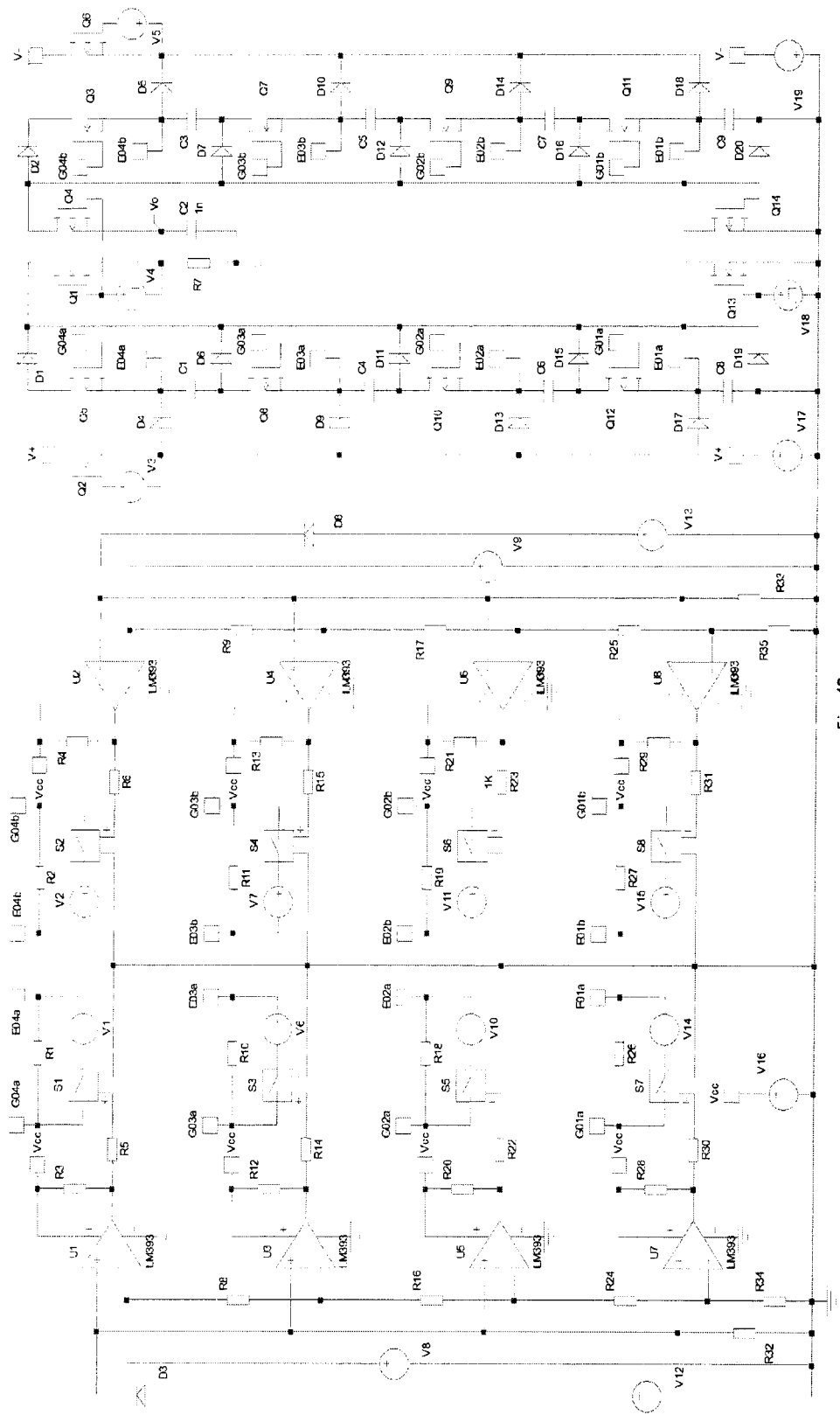
FIG. 48: Embodiment 31: Zero-Power-Consumption Photovoltaic Grid-Connected Inverter.

FIG. 48 is a zero-power-consumption photovoltaic grid-connected inverter. The circuit is divided into three parts, the first part is a positive half-cycle driving signal, the second part a negative half-cycle driving signal, and the third part is an inverter main circuit.

For the left circuit in FIG. 48, the positive half-cycle signal V12 of the mains supply is applied to the same-phase ends of U1, U3, U5 and U7 via the diode D3, a DC signal with equal interval is applied to the opposite-phase ends, and the DC signal with equal interval is composed of the DC voltage V8 and four resistors R8, R16, R24 R34 with equal resistances. During the positive half cycle, when the input AC voltage rises to be greater than the voltage on the resistor R34, the comparator U7(LM339) outputs a high level, and so on. When the input AC voltage rises to be greater than the voltages on the resistors R24, R16, R8, the comparators U5, U3, U1 output high levels. When the input AC voltage drops to be smaller than the voltage on the resistor R8, the comparator U1 outputs a low level, and so on. When the input AC voltage varies to be smaller than the voltages on the resistors R16, R24, R34, the comparators U3, U5, U7 output low levels. After the positive half cycle of the input AC voltage, square-wave signals varying according to the sine law and having gradually increased pulse width is obtained at the output ends of the comparators U1, U3, U5, U7, these square-wave signals respectively conduct the switches S1, S3, S5, S7 via the resistors R5, R14, R22, R30, and DC voltages V1, V6, V10, V14 are applied to the grid electrodes of the MOS tubes Q5, Q8, Q10, Q12.

For the middle circuit in FIG. 48, the negative half-cycle signal V12 of the mains supply is applied to the same-phase ends of U2, U4, U6 and U8 via the diode D8, and the operating process is the same to that during the positive half cycle.

The right circuit of FIG. 48 is a complete DC-AC 4-stage step-up power source, the input voltages V17, V19 are photovoltaic voltages generated by a solar cell panel, and the amplitude of the input photovoltaic voltage is decided by the output AC voltage and the stage of the capacitor step-up network. For example, if the output AC voltage is 220V and the stage of the capacitor step-up network is 4, the amplitude of the input photovoltaic voltage is U=220*1.4/4=77. The circuit is the same to the ordinary step-up circuit during charging and is slightly different during discharging, and the conducting moment of the MOS tubes in the capacitor step-up network is controlled by the driving signal generated by the left circuit.

FIG. 105 is the simulation waveform of a 16-stage control signal. From top to bottom, the pulse width of the square-wave signal generated by the comparator LM339 gradually varies from small to large according to the sine law; FIG. 106, FIG. 107 and FIG. 108 respectively are the output voltage simulation waveforms of 4-stage, 8-stage and 16-stage zero-power-consumption photovoltaic grid-connected inverters.

Embodiment 31

Power Factor Corrector PFC

FIG. 49 is a power factor corrector and is actually an AC-AC 5-stage step-up power source. The difference is to replace all charging diodes with MOS tubes so as to control the charging moment of capacitors in the step-up network.

When the input current and the input voltage are completely synchronous, the power factor is defined as 1. The more the input current and the input voltage are not synchronous, the lower the power factor is. The power factor of the rectified and filtered capacitive load is low, because the rectified steamed bun voltage charges the capacitor, the DC voltage on the capacitor is charged to the amplitude close to the steamed bun wave, the input voltage does not have the opportunity of charging the capacitor at the moments when a major part of the amplitude is smaller than the DC voltage on the capacitor, and the input current is zero at the moments. The input voltage has the opportunity of charging the capacitor at the moments only when the amplitude is greater than the DC voltage on the capacitor. Within short time, the average current of full cycle needs to be provided, so that the peak of the input current is very large, the input current and the input voltage are not synchronous, and the power factor is very low.

In order to increase the power factor, the input current and the input voltage must be synchronous, the input voltage has the opportunity of charging the capacitor no matter what magnitude the amplitude is at each moment, and the input current can only be generated during charging.

The power factor correction method using the AC-AC 5-stage step-up power source is as follows: the positive and negative half cycles are divided into five equal parts, during the positive half cycle of the mains supply, Q2 charges the capacitor C1 for 2 ms via D7, Q11 charges the capacitor C4 for 2 ms via D11, and so on; during the negative half cycle of the mains supply, Q8 charges the capacitor C3 for 2 ms via D6, Q14 charges the capacitor C5 for 2 ms via D12, and so on. Therefore, in the whole cycle, no matter what magnitude the amplitude is, the input voltage has the opportunity of charging the capacitor. The positive half cycle for charging is completed, and the voltage on the capacitor is overlapped and output in the negative half cycle. The negative half cycle for charging is completed, and the voltage on the capacitor is overlapped and output in the positive half cycle. The voltages on each capacitor in the capacitor network are unequal and are relevant to the amplitude of the input voltage at the charging end moment of the capacitors. FIG. 109 is the simulation waveform of the output voltage, the input AC voltage is 220V, and the output DC voltage is close to 1000V.

In order to make the input current and the input voltage to be more synchronous, the stage number can be increased. The larger the stage number is, the more synchronous the input current and the input voltage are. FIG. 110 is the input current waveform when N=0 i.e. power factor correction is not applied. FIG. 111 is the input current waveform when N=5, FIG. 112 is the input current waveform when N=10, and FIG. 113 is the input current waveform when N=20.

Embodiment 32

High-Frequency High-Voltage High-Power-Factor Power Source

Figure 50:
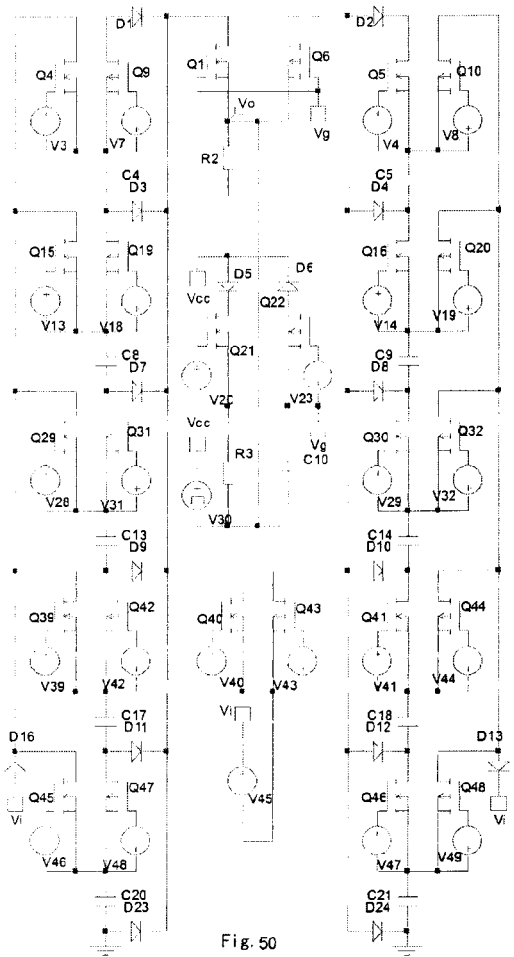
FIG. 50: Embodiment 28: High-Frequency High-Pressure High-Power-Factor Power Source.

FIG. 50 is a high-frequency high-voltage high-power-factor power source. On the basis of a 5-stage power factor corrector, a cutting signal generating circuit composed of MOS tubes Q21, Q22 is added, and the generated cutting signal is Vg. V12 is a 50 Hz square wave, the time delay is 10 ms, and the driving signals of Q21 and Q22 are V9 and V10 and are 18V, 1 kHz square-wave signals (the purpose of low frequency is to easily observe during simulation). Therefore, the waveform of the cutting signal Vg generated by Q21 and Q22 is a square-wave signal with 1 kHz modulation frequency enveloped as 50 Hz.

The output stage of a 5-stage power factor corrector is composed of Q1 and Q4, the driving signal is originally a square wave with 10 ms time delay and 50 Hz, and the output voltage Vo obtained on the common source electrode resistor R1 is a square-wave voltage with amplitude of 1000V and 50 Hz. Now, the square-wave signal Vg is applied to the grid electrodes of Q11 and Q12 with 50 Hz square-wave envelop and 1 kHz modulation efficiency, and a square-wave voltage Vo with 1000V output voltage amplitude, 50 Hz square-wave envelop and 1 kHz modulation efficiency is obtained on the common source electrode resistor R1. FIG. 114 is the output voltage simulation waveform, the waveform is from low to high and is stabilized around 1000V, the frequency of envelop square wave is 50 Hz, each square wave comprises ten modulation square waves, and the waveform of the output voltage Vo is completely identical to that of the driving signal Vg. FIG. 115 is the waveform of the amplified output voltage Vo, and the details can be seen more clearly. FIG. 116 is the simulation waveforms of the input voltage and the input current, and here the input voltage is displayed as −Sinx so as to better observe and compare the synchronization degree. From the simulation diagram, we can see that the input current and the input voltage are completely synchronous, and the power factor can reach more than 99%.

Embodiment 33

General Inverter without High-Frequency Conversion

Figure 51:
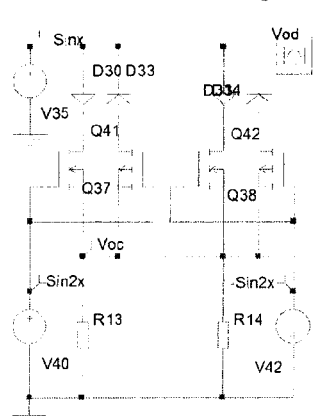
FIG. 51: Embodiment 33: General Inverter 1 without High-Frequency Conversion.

FIG. 51 is a general inverter without high-frequency conversion. The MOS tubes Q37, Q41, Q38, Q42, Q43, Q44 form three basic circuits (2.1), the MOS tubes Q35, Q36, Q39, Q40, Q45, Q46, Q49, Q50 form dynamic rectification circuits (3.4), the input voltage Sinx with 311V amplitude is applied to the input ends of the first and second basic circuits (2.1), a voltage cutting signal Sin2x with 311V amplitude is applied to the common grid electrode of the first basic circuit (2.1), and the common part Voa is cut off from the input voltage Sinx. A voltage cutting signal −Sin2x with 311V amplitude is applied to the common grid electrode of the second basic circuit (2.1), the common part Vob is cut off from the input voltage Sinx, and the cut Voa and Vob are output in parallel to obtain the output voltage Voc. After Voc passes through the dynamic rectification circuit (3.4), the voltage Vod is output, Vod and one compensating voltage V36 are overlapped, the third basic circuit (2.1) undergoes voltage compensation (the driving signal applied to the common grid electrode is Sin2x), and the voltage VSin2x is finally output. The resistor R12 and the capacitor C14 play smoothing effect.

FIG. 117 is the simulation waveform of dynamic rectification output voltage, the cycles of all driving signals in the dynamic rectification circuit are 10 ms, the voltage of first 5 ms in one cycle is turned to the upper part, the voltage of last 5 ms is turned to the lower part, and a voltage Vod is obtained after the voltage Voc passes through dynamic rectification. FIG. 118 is the simulation waveform of voltage compensation, the inner-layer curve is a voltage Vod obtained through dynamic rectification, and the outer-layer sine wave is the compensated output voltage VSin2x. FIG. 119 is the simulation waveform of the voltage at each point of circuit in FIG. 51, from top to bottom: input voltage Sinx, grid electrode cutting voltage Sin2x, grid electrode cutting voltage −Sin2x, merging voltage Voc after cutting, dynamic rectification output voltage Vod, and 2-frequency-multiplying final output voltage VSin2x.

Figure 52:
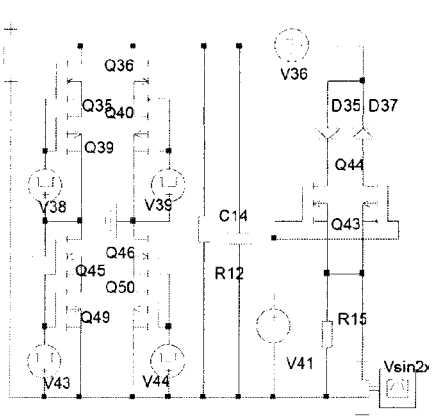
FIG. 52: Embodiment 33: General Inverter 2 without High-Frequency Conversion.

FIG. 52 is the demonstration circuit of voltage cutting and is one part of a circuit in FIG. 51, but the cutting driving signals sin2x, −sin2x cut the voltages Voa, Vob, which are separated, from the input voltage Sinx. FIG. 120 is the simulation waveform of Sinx cut by Sin2x, the upper part is the cut common part voltage Voa, and the lower part is the actual waveform of cutting. FIG. 121 is the simulation waveform of Sinx cut by −Sin2x, the upper part is the cut common part voltage Vob, and the lower part is the actual waveform of cutting.

Figure 53:
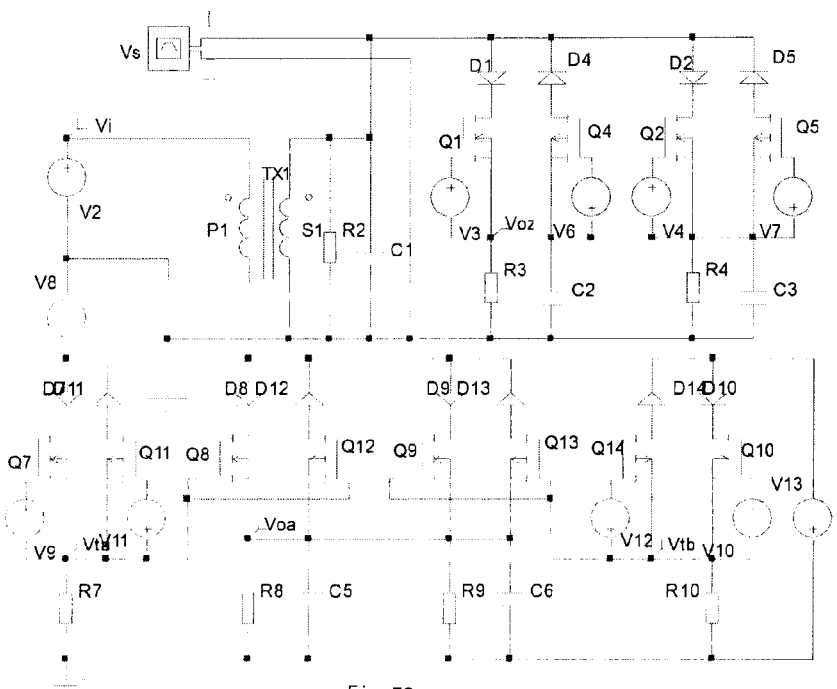
FIG. 53: Embodiment 33: General Inverter 3 without High-Frequency Conversion.

FIG. 53 uses the basic circuit (2.3) to replace the basic circuit (2.1), i.e. the transformer TX1 is added between the cutting circuit and the input voltage, so that the rest voltage after cutting undergoes traditional power conversion in the transformer. The grid electrode driving signals of first and second basic circuits (2.1) in FIG. 51 are not sin2x and −sin2x any more, but are cutting driving signals Vta, Vtb enveloped as sin2x and −sin2x and generated by the cutting voltage generating circuit (basic circuit (2.1)) composed of Q7, Q11, Q14 and Q10, Vx is obtained after TX1 secondary side passes through type B dynamic rectification, and the waveform of the voltage is completely identical to that of the output voltage Vod of the dynamic rectification circuit. FIG. 122 is the simulation waveform of the voltage at each point, from top to bottom: input voltage Sinx, cutting driving signals Vta, Vtb, common part voltage Voc of cutting, transformer secondary side voltage Vs and transformer output voltage Voz.

Figure 54:
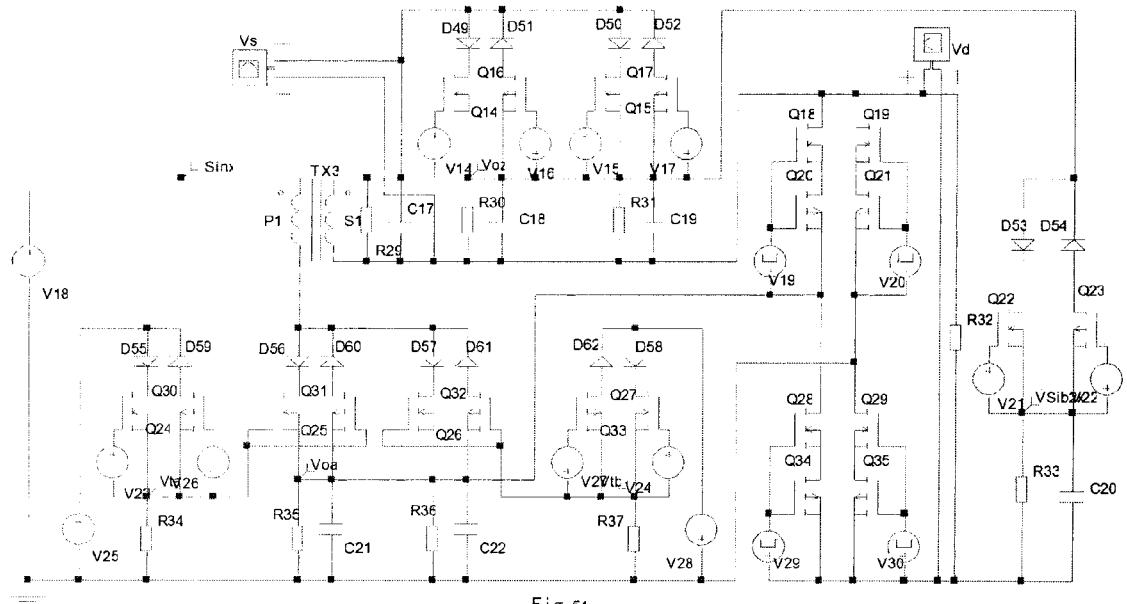
FIG. 54: Embodiment 33: General Inverter 4 without High-Frequency Conversion.

FIG. 54 is the complete circuit diagram of the general inverter without high-frequency conversion. The output voltages Voz, Vod on the resistors R6, R7 are connected in series and are applied to a compensating circuit composed of Q22 and Q23, and the final frequency-multiplying voltage VSin2x is output from the common source electrode. All power devices of the inverter operate at operating frequency, all power devices are realized by the unit circuit SBP, only waveform per se is operated, the input voltage in the Figure is Sinx, and the frequency conversion output frequency multiplying is Sin2x.

It can be proved that when the input voltage and the output voltage have the same amplitude, no external energy needs to be supplemented, and the insufficient part of the output voltage is just supplemented after the rest part of Sin2x and −Sin2x with Sinx cut undergoing traditional power conversion via a transformer.

It can also be proved that the operating processes of frequency division and frequency multiplying are completely identical, but the cutting part and the compensating part are exchanged, and the input voltage and the cutting voltage are exchanged. In the frequency multiplying and frequency division example, the frequencies of the input voltage and the output voltage are integral multiples of the example. When the input frequency and the output frequency are not integral multiples, the operating processes are completely identical, and adjustment and change of the frequency of the output voltage of the general inverter without high-frequency conversion are continuous.

Embodiment 34

Three-Phase AC Voltage-Stabilized Power Source

Figure 55:
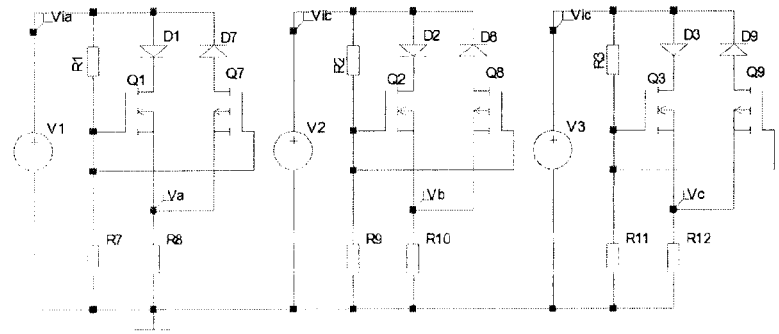
FIG. 55: Embodiment 34: Three-Phase AC Voltage-Stabilized Power Source.

FIG. 55 is a three-phase AC voltage-stabilized power source. The MOS tubes Q1, Q7, Q2, Q8, Q3, Q9 form three basic circuits (2.1), the input three-phase voltages Via, Vib, Vic are respectively connected with the input ends thereof, the grid electrode operating points are respectively decided by the resistors R1, R7, R2, R9, R3, R11, stable three-phase AC output voltages Va, Vb, Vc are obtained on the source electrode resistors R8, R10, R12 thereof, and the voltage stabilizing principle of each phase of circuit is described above. FIG. 123 is the output voltage simulation waveform of the three-phase AC voltage-stabilized power source. The outer layer is the input voltage waveform, the inner layer is the output voltage waveform, and the adjusting resistors R1, R2, R3 can adjust the amplitude of the output voltage.

When the voltage-stabilized accuracy is high, amplitude height modulation AHM equivalent resistors are used for replacing R1, R2 and R3, and the output voltage can be automatically adjusted directly. When the difference Vm between the input voltage and the output voltage is too large, the basic circuit (2.3) can be used for replacing the basic circuit (2.1), and the voltage difference Vm undergoes traditional power conversion and is fed back to the input end or directly output.

Embodiment 35

Three-Phase AC Inverter Power Source

Figure 56:
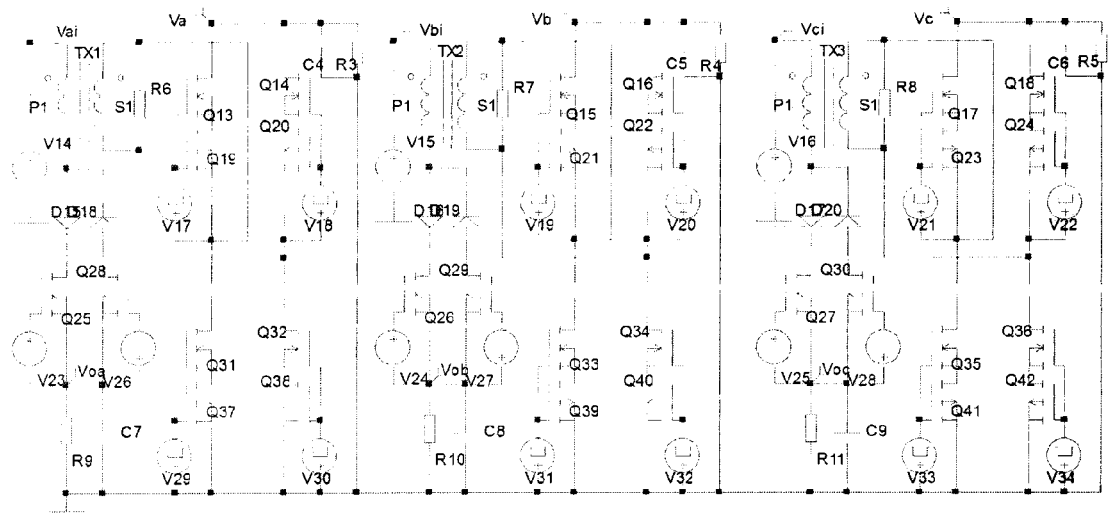
FIG. 56: Embodiment 35: Three-Phase AC Inverter Power Source.

FIG. 56 is a three-phase AC inverter power source, and the circuit of each phase is completely identical to the AC inverter power source in FIG. 31. Because a three-phase voltage is input, the grid electrode driving signal in each phase of dynamic rectification has the same phase to the input voltage in this phase, the output voltages Vca, Vcb, Vcc of each phase of dynamic rectification circuit (3.4) are connected with the mains supply input voltages Via, Vib, Vic in this phase in series, and the serially connected and overlapped voltages are output voltages Ac, Bc, Cc of the AC inverter power source. FIG. 124 is the simulation waveform of the output voltage. FIG. 124 has three groups of curves, the most inner-layer one group of three curves are the compensating voltage curves Vca, Vcb, Vcc, the most outer-layer one group of three curves are the output voltages Ac, Bc, Cc after overlapping the input voltage and the compensating voltages, and the middle one group of three curves are the input voltages Via, Vib, Vic.

The input-phase voltage of the three-phase AC inverter power source is too low (amplitude is 280V), and the output rated-phase voltage (amplitude is 311V) is subject to AC inverter compensation. The embodiment is also called as a three-phase AC compensating power source, the compensating voltages Vca, Vcb, Vcc can be independently output, and three-phase AC compensation is carried out on other circuits.

Embodiment 36

Three-Phase DC Inverter Power Source

Figure 57:
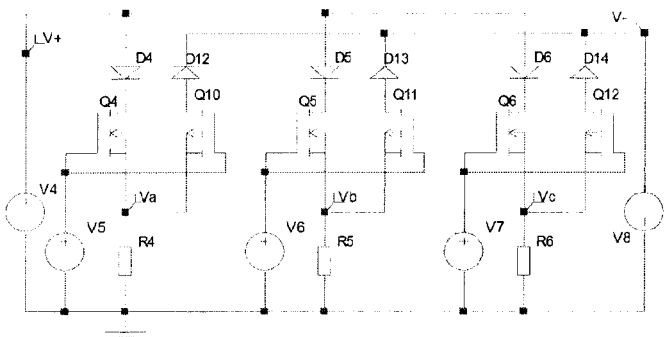
FIG. 57: Embodiment 36: Three-Phase DC Inverter Power Source.

FIG. 57 is a three-phase DC inverter power source, the MOS tubes Q4, Q10, Q5, Q11, Q6, Q12 form three basic circuits (2.1), a DC input positive voltage V+ respectively enters into Q4, Q5, Q6 via D4, D5, D6, a DC input negative voltage V− respectively enters into Q10, Q11, Q12 via D12, D13, D14, the grid electrodes of the three basic circuits are respectively connected with sine-wave driving signals with 120 degrees lag successively, and the amplitude of the signal is one Vgs higher than the output voltage. According to the voltage cutting principle, three-phase sine-wave voltages Va, Vb, Vc successively lagging 120 degrees are obtained on the source electrode resistors R4, R5, R6 of the three basic circuits. FIG. 125 is the simulation waveform of the output voltage of the three-phase DC inverter power source, the amplitude of the three-phase sine-wave voltage is close to the input DC voltage, the DC input voltage is inverted to a three-phase AC voltage only via one link, namely voltage cutting, the inverter circuit has high efficiency and small loss, and the embodiment is also called as a DC cutting power source. In order to further improve the efficiency, the basic circuit (2.3) can be used for replacing the basic circuit (2.1), and the rest voltage after cutting undergoes traditional power conversion and is fed back to the input end or directly output.

Embodiment 37

Three-Phase AC Cutting Power Source

Figure 58:
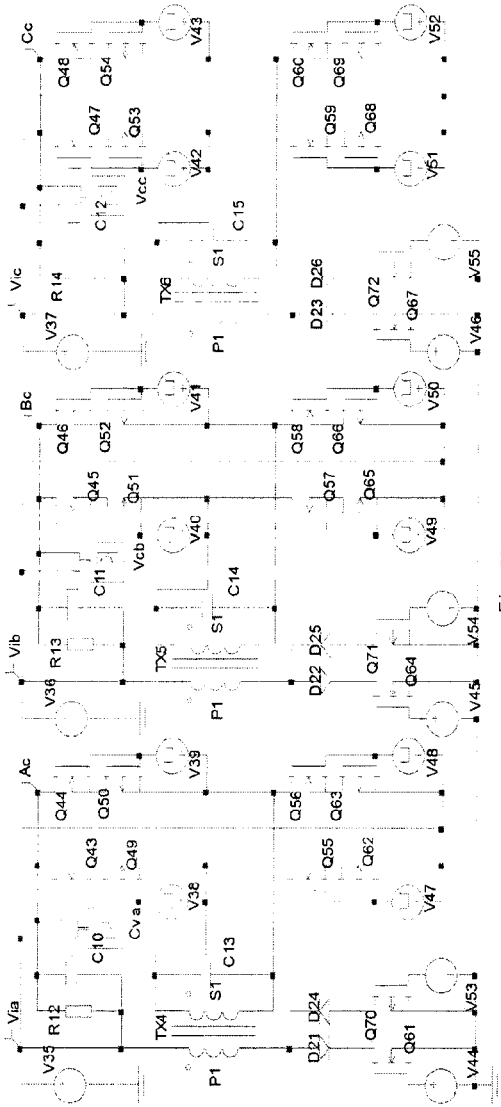
FIG. 58: Embodiment 37: Three-Phase AC Voltage Cutting Power Sauce.

FIG. 58 is a three-phase AC cutting power source, and the circuit of each phase is completely identical to the AC cutting circuit in FIG. 35. Because a three-phase voltage is input, the grid electrode driving signal in each phase of dynamic rectification (3.4) has the same phase to the input voltage in this phase. FIG. 126 is the simulation waveform of the output voltage and has three groups of curves, the most outer-layer one group of three curves are input voltage curves Vai, Vib, Vic, and the inner-layer two groups of six curves respectively are cutting sine-wave voltages Voa, Vob, Voc and output voltages Va, Vb, Vc subject to traditional power conversion via the transformer TX1 and after dynamic rectification. Because the amplitudes of the cutting sine-wave voltages and the transformer secondary side output voltages are very close, two groups of curves basically coincide, and the curves look thicker than the curves of the input three-phase voltage.

Embodiment 38

Three-Phase AC Uninterrupted Power Source Ups

Figure 59:
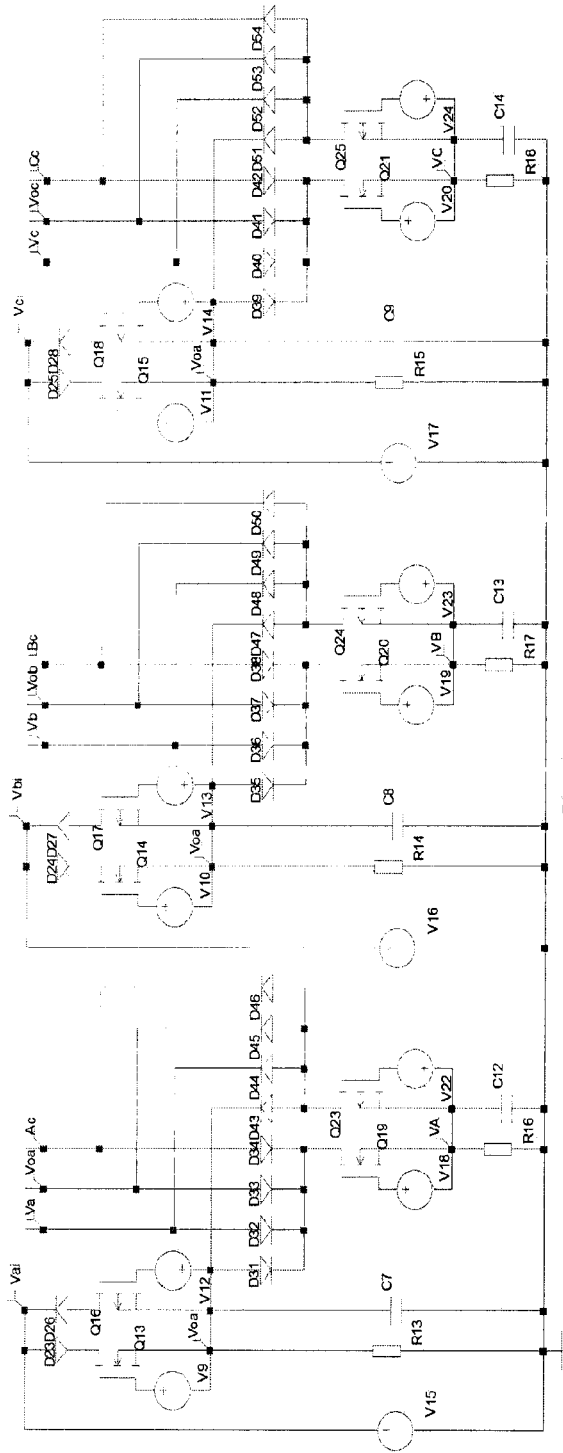
FIG. 59: Embodiment 38: Three-Phase AC Uninterrupted Power Source (UPS)

FIG. 59 is a three-phase uninterrupted power source UPS. The circuit in FIG. 59 is divided into three parts, each part is one phase, three phases of circuits are completely identical, and there are four types of input voltages: mains supply input voltages Vai, Vbi, Vci, DC-AC voltages Va, Vb, Vc, cut voltages Voa, Vob, Voc when the input voltages are high, and compensated voltages Ac, Bc, Cc when the input voltages are too low, as well as one type of output voltage: VA, VB, VC. The function of the basic circuit (2.1) composed of the MOS tubes Q13, Q16 is to connect the phase-A voltage of the AC mains supply, and the function of the basic circuit (2.1) composed of Q19 and Q23 is to be used as a main switch of the phase A of the three-phase uninterrupted power source. The positive half cycles of four types of voltages are connected with the drain electrode of the MOS tube Q19 via the diodes D31-D34, and the negative half cycle is connected with the drain electrode of the MOS tube Q23 via the diodes D43-D46. Because the positive and negative half cycles are separated, the voltages of the positive half cycles can not interfere with each other at the drain electrode of Q19, and the voltages of the negative half cycles can not interfere with each other at the drain electrode of Q23. When the mains supply is normal, Q13 and Q16 are conducted, and the mains supply outputs a phase-A voltage VA on the resistor R16 via D31 and D43; when the mains supply is too low, the voltage Ac outputs a phase-A voltage VA on the resistor R16 via D34 and D46, and meanwhile, the output channel diodes D31, D43 of the mains supply are blocked; when the mains supply is too high, Q13 and Q16 are cut off, and the voltage Voa outputs a phase-A voltage VA on the resistor R16 via D33 and D45; and when the mains supply is cut off, the DC inverter voltage Va outputs a phase-A voltage VA on the resistor R16 via D32 and D44. The MOS tubes Q10, Q13 are open during the overall operating process of the uninterrupted power source and are cut off only when the three-phase uninterrupted power source UPS is completely not used or an external load is short-circuit.

The operating processes of phase-B and phase-C circuits are completely identical to phase-A.

FIG. 59 is the complete circuit diagram of the three-phase AC uninterrupted power source and includes a compensating voltage namely three-phase AC compensating power source generated when the mains supply voltage is too low, a cutting voltage namely three-phase cutting power source generated when the mains supply voltage is too high, and a DC inverter voltage namely three-phase DC inverter power source generated when the mains supply is cut off. If the circuit in FIG. 59 does not include the DC inverter voltage generated when the mains supply is cut off and all diodes connected with the DC inverter voltage, the three-phase AC uninterrupted power source UPS becomes a complete three-phase AC voltage-stabilized power source. If the circuit in FIG. 59 only comprises one phase of circuit, the three-phase AC uninterrupted power source UPS becomes a single-phase AC uninterrupted power source UPS.

Statements: All circuit diagrams in the drawings attached to the specifications are from power electronics simulation software SIMetrix/SIMPLIS 5.60, and identical output waveform can be obtained through direct simulation without modification.

What is claimed is:

1. A power converter, comprising:
a first basic circuit comprising a first unit circuit with a first end point A and a second end point B, wherein the first end point A of the first unit circuit is connected with the fire wire of an input voltage ($V_{in}$), and a first resistor or capacitor element is connected between the zero wire of the input voltage and the second end point B of the first unit circuit, wherein the first resistor or capacitor element comprises a first resistor or a first step-up capacitor network and step-down capacitor network;
a second basic circuit comprising a second unit circuit with a first end point A and a second end point B, and a first transformer with a primary side and a secondary side, wherein the first end point A of the second unit circuit is connected with the primary side of the first transformer, and the second end point B of the second unit circuit is connected to the negative electrode or zero wire of the input voltage;
a third basic circuit comprising a third unit circuit with a first end point A and a second end point B, and a second transformer with a primary side and a secondary side, wherein the first end point A of the third unit circuit is connected with the primary side of the second transformer, and a second resistor or capacitor element is connected between the zero wire of the input voltage and the second end point B of the third unit circuit, wherein the second resistor or capacitor element comprises a second resistor or a second step-up capacitor network and step-down capacitor network;
wherein the secondary sides of the first and second transformers are connected to corresponding dynamic rectification circuits;
further wherein the first unit circuit, second unit circuit, and third unit circuit each comprise one of the following two forms:
a first form comprising a first and a second field effect tube, and a first and second diode, wherein the unit circuit end point A is formed by connection of the positive electrode of the first diode with the negative electrode of the second diode, and the unit circuit endpoint B is formed by the source electrode of the second field-effect tube, further wherein the drain electrode of the first field effect tube is connected with the negative electrode of the first diode, the source electrode of the first field effect tube is connected to the unit circuit end point B, the drain electrode of the second field effect tube is connected with the positive electrode of the second diode, the source electrode of the second field effect tube is connected to the unit circuit end point B, the grid electrode of the first field effect tube is connected to the positive electrode of a first driving voltage, the grid electrode of the second field effect tube is connected to the negative electrode of a second driving voltage, and the negative electrode of the first driving voltage and the positive electrode of the second driving voltage are connected to the unit circuit end point B; or a second form comprising a first and a second field tube, wherein the unit circuit end point A is the drain electrode of the first field effect tube, and the unit circuit end point B is the source electrode of the second field effect tube, further wherein the source electrode of the first field effect tube is connected to the drain electrode of the second field effect tube, the grid electrode of the first field effect tube is connected to the grid electrode of the second field effect tube, the grid electrode of the first field effect tube is connected to the positive electrode of a first driving voltage, and the negative electrode of the first driving voltage is connected to the unit circuit end point B;

further wherein the first and second driving voltages are generated by a high-frequency driving signal generator (VDrvh) and a synchronous driving signal generator (VDrvs);

wherein the high-frequency driving signal generator (VDrvh) comprises an integrated circuit NE555 and a signal conversion circuit (SPrs), wherein a third and fourth DC power sources (V3, V4) are connected in series, the middle is grounded, the negative electrode of the third DC voltage (V3) is connected with a pin (GND) of NE555 and one end of a first and second capacitors (C1, C2), the positive electrode of the fourth DC voltage (V4) is connected with pins (Vcc, Reset) of NE555 and one end of a seventh resistor (R7), the other end of the first capacitor (C1) is connected with a pin (Thresh) of NE555, the other end of the second capacitor (C2) is connected with a pin (Cntrl) of NE555, the other end of the seventh resistor is connected with a pin (Dis) of NE555, the positive electrode of a first diode (D1) is connected with a pin (Dis) of NE555, the negative electrode is connected with a pin (Trig) of NE555, the second diode (D2) and a sixth resistor (R6) are connected in series, the positive electrode of the second diode (D2) is connected with a pin (Thresh) of NE555, the other end of a sixth diode (D6) is connected with a pin (Dis) of NE555, a pin (Out) of NE555 is connected with an end point (IN) of a signal conversion circuit (SPrs) via a third resistor (R3), and the end point (GND) of the signal conversion circuit (SPrs) is grounded; and wherein the synchronous driving signal generator (VDrvs) comprises an integrated circuit LM339 and a signal conversion circuit (SPrs), a fourth and fifth DC power sources (V4, V5) are connected in series, the middle is grounded, the negative electrode of the fourth DC voltage (V4) is connected with the power pin (−) of LM339, the positive electrode of the fifth DC voltage (V5) is connected with the power pin (+) of LM339 and one end of an eighth resistor (R8), the other end of the eighth resistor (R8) is connected with an output end point (Gc) of LM339, the negative electrode of the third power source (V3) and one end of the sixth resistor (R6) are grounded, the other end of the sixth resistor (R6) is connected with the same-phase input pin (+) of LM339, the positive electrode of the third power source (V3) is connected with the same-phase input pin (+) of LM339 via a seventh resistor (R7), the opposite-phase input pin (−) of MP339 is grounded, the output end point (Gc) of LM339 is connected with the end point (IN) of the signal conversion circuit (SPrs) via the third resistor (R3), and the end point (GND) of the signal conversion circuit (SPrs) is grounded;

further wherein the signal conversion circuit (SPrs) comprises first and second optical couplers (U1, U2), wherein the cathode of the diode part of the first optical coupler (U1) is connected with an input end point (IN), the anode is connected with an end point (GND), the emitting electrode of the triode part of the first optical coupler (U1) is connected with the negative electrode of the second power source (V2) via a first resistor and is also connected with the collecting electrode of a second triode (Q2), the collecting electrode of the triode part of the first optical coupler (U1) is connected with the positive electrode of the first power source (V1) and is also connected with the collecting electrode of a first triode (Q1), and the emitting electrodes of the first and second triodes (Q1, Q2) are connected together to form an output end point (Gb) and are also connected with the end point (GND) via a second resistor (R2); and the anode of the diode part of the second optical coupler (U2) is connected with the input end point (IN), the cathode is connected with the end point (GND), the emitting electrode of the triode part of the second optical coupler (U2) is connected with the negative electrode of the second power source (V2) via a fourth resistor and is also connected with the collecting electrode of a fourth triode (Q4), the collecting electrode of the triode part of the second optical coupler (U2) is connected with the positive electrode of the first power source and is also connected with the collecting electrode of the third triode (Q3), and the emitting electrodes of the third and fourth triodes (Q3, Q4) are connected together to form an output end point (Ga) and are also connected with the end point (GND) via a fifth resistor (R5).

2. The power converter of claim 1, further comprising an amplitude height modulation circuit.

3. The power converter of claim 1, wherein the respective step-up capacitor network and the step-down capacitor network comprise N stages of capacitor networks, wherein each stage comprises a left arm and a right arm.

* * * * *